US008603232B2

United States Patent
Tsuzaka et al.

(10) Patent No.: US 8,603,232 B2
(45) Date of Patent: Dec. 10, 2013

(54) WATER-BASED INK SET FOR INK-JET RECORDING, INK-JET RECORDING METHOD, AND INK-JET RECORDING APPARATUS

(75) Inventors: Yuka Tsuzaka, Nagoya (JP); Kazuma Goto, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 294 days.

(21) Appl. No.: 13/233,462

(22) Filed: Sep. 15, 2011

(65) Prior Publication Data
US 2012/0081453 A1 Apr. 5, 2012

(30) Foreign Application Priority Data

Sep. 30, 2010 (JP) ................................. 2010-223243

(51) Int. Cl.
*C09D 11/02* (2006.01)

(52) U.S. Cl.
USPC .................. 106/31.47; 106/31.48; 106/31.49

(58) Field of Classification Search
USPC ............ 106/31.47, 31.48, 31.49; 347/20, 100
See application file for complete search history.

(56) References Cited

U.S. PATENT DOCUMENTS

| | | | |
|---|---|---|---|
| 3,336,285 A | 8/1967 | Towne et al. | |
| 3,950,321 A | 4/1976 | Dehnert et al. | |
| 4,068,085 A | 1/1978 | Ramanathan et al. | |
| 4,090,487 A | 5/1978 | Stumpp et al. | |
| 6,444,807 B1 | 9/2002 | Wolleb et al. | |
| 6,488,751 B1 | 12/2002 | Takemoto | |
| 7,611,571 B2* | 11/2009 | Yamashita et al. | 106/31.47 |
| 7,727,321 B2* | 6/2010 | Goto et al. | 106/31.48 |
| 7,854,797 B2* | 12/2010 | Fujii et al. | 106/31.47 |
| 7,871,464 B2* | 1/2011 | Ono et al. | 106/31.47 |
| 8,062,412 B2* | 11/2011 | Aoyama et al. | 106/31.89 |
| 8,226,222 B2* | 7/2012 | Kajiura et al. | 347/100 |
| 8,430,953 B2* | 4/2013 | Hayashida et al. | 106/31.47 |
| 8,449,664 B2* | 5/2013 | Maeda et al. | 106/31.47 |
| 8,460,449 B2* | 6/2013 | Goto et al. | 106/31.48 |
| 2007/0186806 A1 | 8/2007 | Goto et al. | |
| 2007/0186807 A1 | 8/2007 | Goto et al. | |
| 2008/0241398 A1 | 10/2008 | Kato et al. | |
| 2009/0165672 A1 | 7/2009 | Ogura et al. | |
| 2011/0128333 A1 | 6/2011 | Goto et al. | |
| 2011/0143106 A1* | 6/2011 | Patel | 106/31.49 |
| 2012/0081452 A1* | 4/2012 | Maeda et al. | 106/31.47 |
| 2012/0081454 A1* | 4/2012 | Ito et al. | 106/31.47 |

FOREIGN PATENT DOCUMENTS

| | | | |
|---|---|---|---|
| JP | 49-074718 A | 7/1974 | |
| JP | 51-083631 A | 7/1976 | |
| JP | 52-046230 A | 4/1977 | |
| JP | 06-019036 A | 1/1994 | |
| JP | 2000-178491 A | 6/2000 | |
| JP | 2000-303009 A | 10/2000 | |
| JP | 2002-526589 A | 8/2002 | |
| JP | 2007-217523 A | 8/2007 | |
| JP | 2007-217531 A | 8/2007 | |
| JP | 2008-246821 A | 10/2008 | |
| JP | 2009-155596 A | 7/2009 | |
| JP | 2009-155605 A | 7/2009 | |
| JP | 2010-037505 A | 2/2010 | |
| JP | 2011111611 A | 6/2011 | |
| WO | 00/17275 | 3/2000 | |

* cited by examiner

*Primary Examiner* — Helene Klemanski
(74) *Attorney, Agent, or Firm* — Banner & Witcoff, Ltd.

(57) ABSTRACT

There is provided a water-based ink set for ink-jet recording, including: a water-based yellow ink which contains water, a water-soluble organic solvent and a yellow colorant containing a yellow dye (Y-1) and a yellow dye (Y-2) indicated below; a water-based magenta ink which contains water, a water-soluble organic solvent and a magenta colorant containing a magenta dye (M-1) and a magenta dye (M-2) indicated below; a water-based cyan ink which contains water, a water-soluble organic solvent and a cyan colorant containing a cyan dye (C-1) indicated below; and a water-based black ink which contains water, a water-soluble organic solvent and a black colorant containing carbon black.
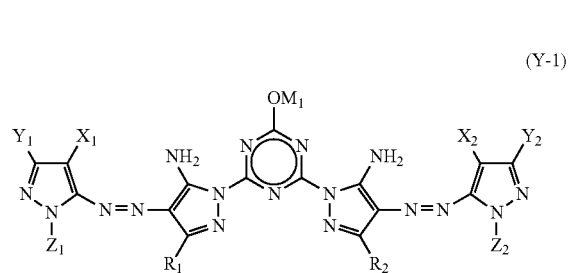
(Y-1)
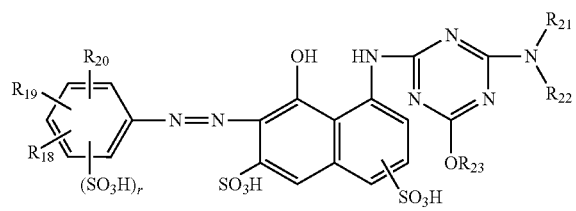
-continued
(M-2b)
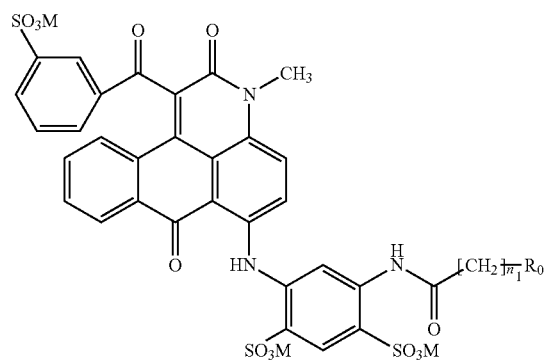
(M-1)
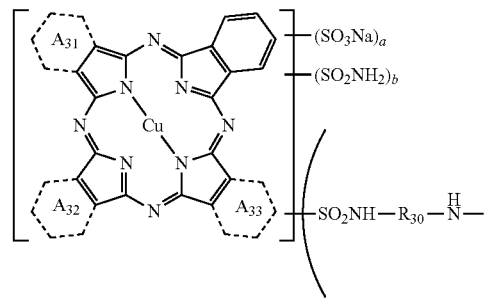
(C-1)
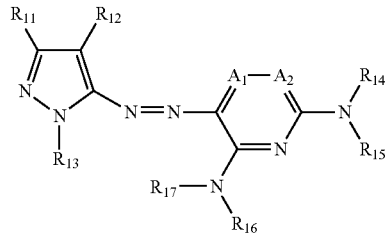
(M-2a)
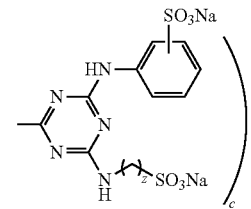
17 Claims, 1 Drawing Sheet

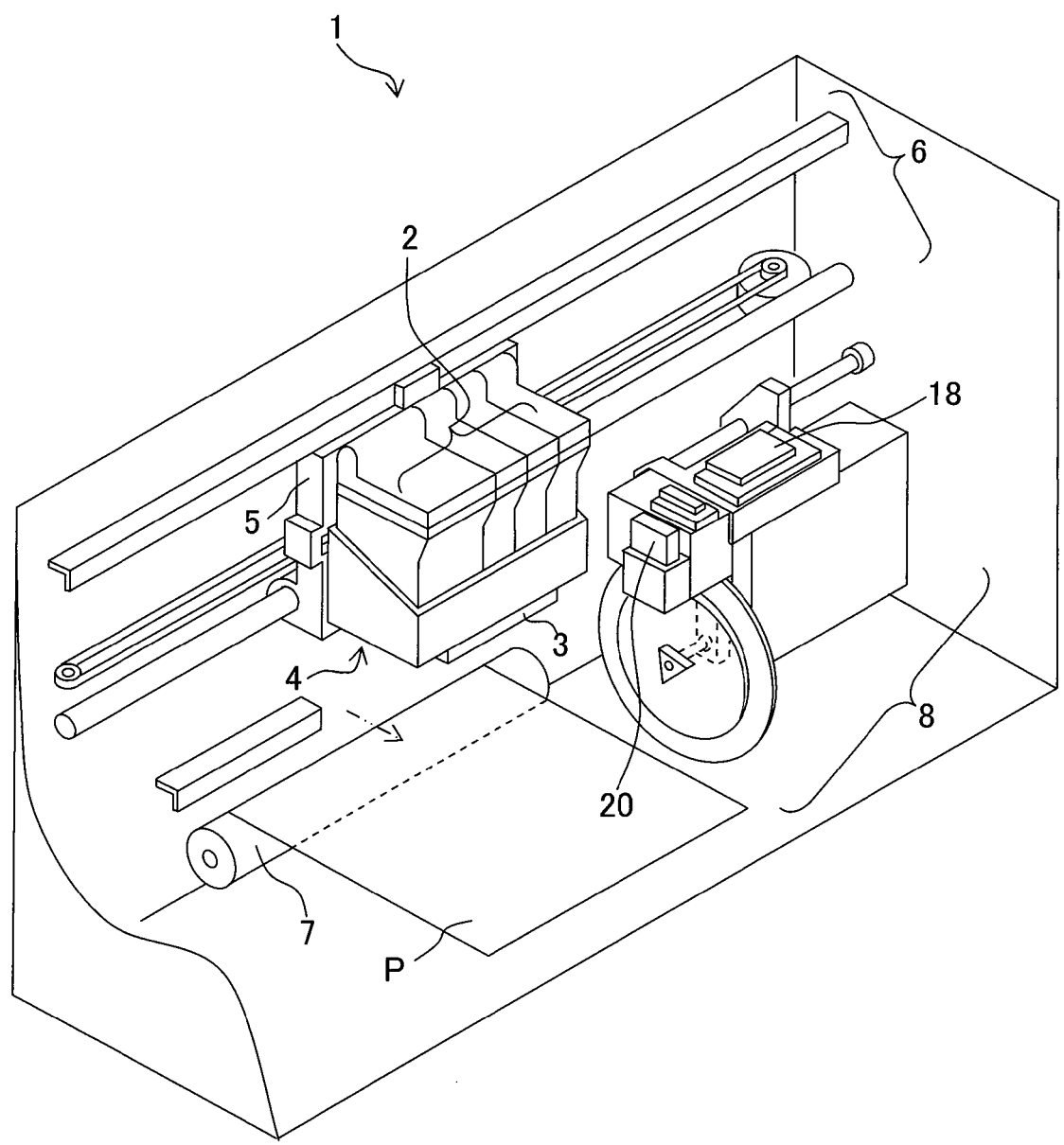

WATER-BASED INK SET FOR INK-JET RECORDING, INK-JET RECORDING METHOD, AND INK-JET RECORDING APPARATUS

CROSS REFERENCE TO RELATED APPLICATION

The present application claims priority from Japanese Patent Application No. 2010-223243, filed on Sep. 30, 2010, the disclosure of which is incorporated herein by reference in its entirety.

BACKGROUND OF THE INVENTION

1. Field of the Invention

The present invention relates to a water-based ink set for ink-jet recording, an ink-jet recording method, and an ink-jet recording apparatus.

2. Description of the Related Art

A water-based ink set for ink-jet recording is required (1) to have superior vividness or brightness of color inks; (2) to have superior light resistance/ozone resistance of the color inks; (3) to have superior jetting stability of each color ink and a black ink; (4) to have superior storing stability of the color inks; and (5) to hardly cause bleeding between each color ink and the black ink. In addition to the five capabilities described above, it is important for the water-based ink set for ink-jet recording (6) to have superior hues in balance after fading of the color inks. That is, it is important that degrees of fading of the respective color inks (a water-based yellow ink, a water-based magenta ink, and a water-based cyan ink) which constitute the water-based ink set for ink-jet recording are the same. Therefore, an ink set for ink-jet recording, which is configured in view of the hues in balance, is suggested.

SUMMARY OF THE INVENTION

However, a conventional water-based ink set fails to meet all of the capabilities of the above (1) to (6).

An object of the present teaching is to provide a water-based ink set for ink-jet recording (1) which has superior vividness or brightness of color inks (superior color developing properties); (2) which has superior light resistance/ozone resistance of the color inks; (3) which has superior jetting stability of each color ink and a black ink; (4) which has superior storing stability of the color inks; (5) which hardly causes bleeding between each color ink and the black ink; and (6) which has superior hues in balance after fading of the color inks.

According to a first aspect of the present teaching, there is provided a water-based ink set for ink-jet recording, including:

a water-based yellow ink which contains water, a water-soluble organic solvent and a yellow colorant containing a yellow dye (Y-1) and a yellow dye (Y-2) indicated below;

a water-based magenta ink which contains water, a water-soluble organic solvent and a magenta colorant containing a magenta dye (M-1) and a magenta dye (M-2) indicated below;

a water-based cyan ink which contains water, a water-soluble organic solvent and a cyan colorant containing a cyan dye (C-1) indicated below; and a water-based black ink which contains water, a water-soluble organic solvent and a black colorant containing carbon black, wherein;

the yellow dye (Y-1) is a dye represented by the general formula (Y-1);

the yellow dye (Y-2) is at least one dye selected from the group consisting of C.I. Direct Yellow 86, C.I. Direct Yellow 132, and C.I. Direct Yellow 142;

the magenta dye (M-1) is a dye represented by the general formula (M-1);

the magenta dye (M-2) is at least one dye selected from the group consisting of dyes represented by the general formula (M-2a), dyes represented as the general formula (M-2b) or a salt thereof, C.I. Acid Red 1, and C.I. Acid Red 254; and the cyan dye (C-1) is a dye represented by the general formula (C-1);

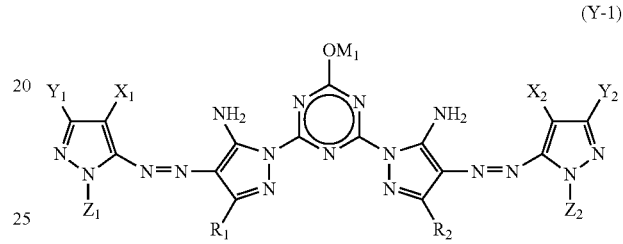

in the general formula (Y-1), $R_1$, $R_2$, $Y_1$, and $Y_2$ each represent a monovalent group, and are identical to or different from each other;

$X_1$ and $X_2$ each represent an electron attractive group, and are identical to or different from each other;

$Z_1$ and $Z_2$ each represent a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, and are identical to or different from each other; and $M_1$ represents a hydrogen atom or a cation,

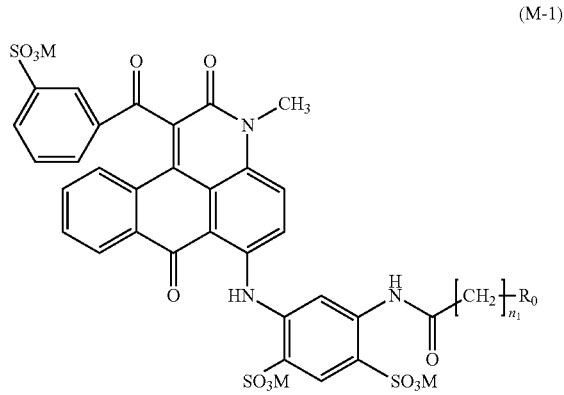

in the general formula (M-1), $n_1$ is 1 or 2;

Ms each represent sodium or ammonium, and are identical to or different from each other; and $R_0$ represents a monoalkylamino group having 1 to 8 carbon atoms, substituted with a carboxyl group,

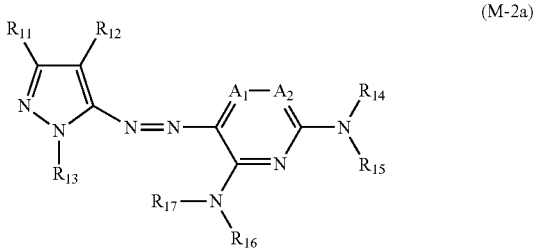

(M-2a)

in the general formula (M-2a), $R_{11}$ represents a hydrogen atom, a substituted or unsubstituted alkyl group, or a substituted or unsubstituted aryl group;

$R_{12}$ represents a hydrogen atom, a halogen atom, or a cyano group;

$R_{13}$ represents a hydrogen atom, a substituted or unsubstituted alkyl group, a substituted or unsubstituted aryl group, or a substituted or unsubstituted heterocyclic group;

$R_{14}$, $R_{15}$, $R_{16}$, and $R_{17}$ each represent a hydrogen atom, a substituted or unsubstituted alkyl group, a substituted or unsubstituted aryl group, a substituted or unsubstituted heterocyclic group, a substituted or unsubstituted sulfonyl group, or a substituted or unsubstituted acyl group, and are identical to or different from each other, not both of $R_{14}$ and $R_{15}$ are hydrogen atoms, and not both of $R_{16}$ and $R_{17}$ are hydrogen atoms; and $A_1$ and $A_2$ are both substituted or unsubstituted carbon atoms, or one of $A_1$ and $A_2$ is a substituted or unsubstituted carbon atom and the other is a nitrogen atom,

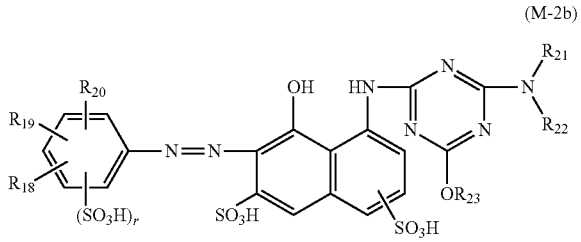

(M-2b)

in the general formula (M-2b), r is 0, 1, or 2;

$R_{18}$, $R_{19}$, and $R_{20}$ each represent a substituted or unsubstituted alkyl group, a substituted or unsubstituted alkoxy group, a halogen atom, a hydrogen atom, a hydroxyl group, a substituted or unsubstituted carbamoyl group, a substituted or unsubstituted sulfamoyl group, a substituted or unsubstituted amino group, a nitro group, a sulfonic acid ester group, a substituted or unsubstituted alkylsulfonyl group, a substituted or unsubstituted arylsulfonyl group, a carboxyl group, or a carboxylic acid ester group, and are identical to or different from each other; and $R_{21}$, $R_{22}$, and $R_{23}$ each represent a hydrogen atom, a substituted or unsubstituted alkyl group, a substituted or unsubstituted alkenyl group, a substituted or unsubstituted aryl group, a substituted or unsubstituted aralkyl group, a substituted or unsubstituted alicyclic group, or a substituted or unsubstituted heterocyclic group, and are identical to or different from each other,

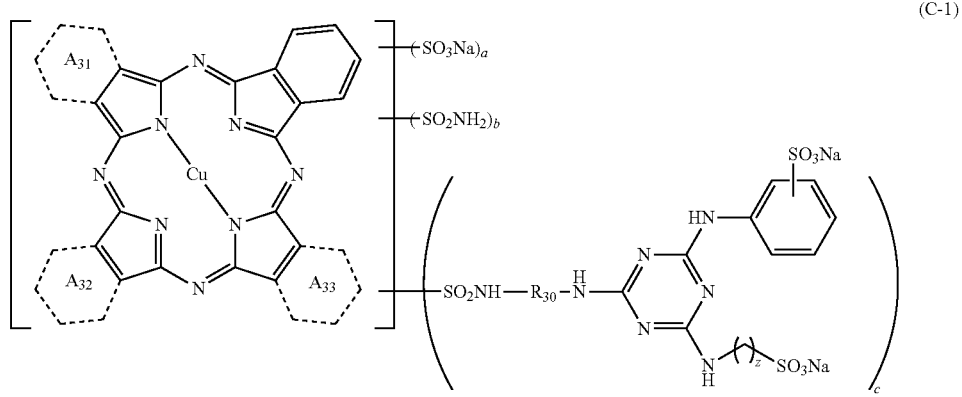

(C-1)

in the general formula (C-1), rings $A_{31}$, $A_{32}$, and $A_{33}$ each represent any of a benzene ring, a 2,3-pyridine ring, and a 3,2-pyridine ring; at least one of rings $A_{31}$, $A_{32}$, and $A_{33}$ represents a 2,3-pyridine ring or a 3,2-pyridine ring; and the rings $A_{31}$, $A_{32}$, and $A_{33}$ are identical to or different from each other;

a satisfies $0 \le a \le 4$; b satisfies $0 \le b \le 4$; c satisfies $0 \le c \le 4$; a, b, and c satisfy $0 \le a+b+c \le 4$;

z is an integer satisfying $1 \le z \le 3$; and $R_{30}$ represents a straight chain alkyl group having 1 to 6 carbon atoms.

According to a second aspect of the present teaching, there is provided an ink-jet recording method for performing recording on a recording medium including discharging, onto the recording medium, the water-based yellow ink, the water-based magenta ink, the water-based cyan ink and the water-based black ink of the water-based ink set for ink-jet recording of the first aspect.

According to a third aspect of the present teaching, there is provided an ink-jet recording apparatus which performs recording on a recording medium including: an ink-set accommodating section which accommodates the water-based ink set for ink-jet recording of the first aspect; and an ink discharge mechanism which discharges, onto the recording medium, each of the water-based yellow ink, the water-based magenta ink, the water-based cyan ink and the water-based black ink of the water-based ink set for ink-jet recording.

BRIEF DESCRIPTION OF THE DRAWINGS

FIG. 1 is a schematic perspective view showing an exemplary construction of an ink-jet recording apparatus of the present teaching.

DESCRIPTION OF THE PREFERRED EMBODIMENTS

An explanation will be made about the water-based ink set for ink-jet recording of the present teaching (hereinafter, this may also be referred to simply as the "water-based ink set" or "ink-set"). The water-based ink set of the present teaching includes a water-based yellow ink, a water-based magenta ink, a water-based cyan ink, and a water-based black ink.
(Water-Based Yellow Ink)

As mentioned above, the water-based yellow ink contains a yellow colorant, water, and a water-soluble organic solvent. The yellow colorant contains the yellow dye (Y-1) and the yellow dye (Y-2).

As mentioned above, the yellow dye (Y-1) is a dye represented by the general formula (Y-1).

In the general formula (Y-1), $R_1$, $R_2$, $Y_1$, and $Y_2$ each represent a monovalent group, and may be identical to or different from each other. The monovalent group is a hydrogen atom, or a monovalent substituent. The monovalent substituent includes a halogen atom, an alkyl group, a cycloalkyl group, an aralkyl group, an alkenyl group, an alkynyl group, an aryl group, a heterocyclic group, a cyano group, a hydroxyl group, a nitro group, an alkoxy group, an aryloxy group, a silyloxy group, a heterocyclic oxy group, an acyloxy group, a carbamoyloxy group, an alkoxy carbonyloxy group, an aryloxycarbonyloxy group, an amino group such as an alkylamino group or an arylamino group, an amide group, an acylamino group, an ureido group, an amino carbonyl amino group, an alkoxy carbonyl amino group, an aryloxycarbonyl amino group, a sulfamoyl amino group, an alkyl sulfonyl amino group, an aryl sulfonyl amino group, an alkylthio group, an arylthio group, a heterocyclic thio group, a sulfamoyl group, an alkyl sulfinyl group, an aryl sulfinyl group, an alkyl sulfonyl group, an aryl sulfonyl group, an acyl group, an aryloxycarbonyl group, an alkoxy carbonyl group, a carbamoyl group, a phosphino group, a phosphinyl group, a phosphinyloxy group, a phosphinyl amino group, a silyl group, an azo group, an imide group, and the like. Each may further have a substituent. Out of these, the monovalent substituent is preferably a hydrogen atom, a halogen atom, an alkyl group, an aryl group, a heterocyclic group, a cyano group, an alkoxy group, an amide group, an ureido group, an alkyl sulfonyl amino group, an aryl sulfonyl amino group, a sulfamoyl group, an alkyl sulfonyl group, an aryl sulfonyl group, a carbamoyl group, or an alkoxy carbonyl group. Further, the monovalent substituent is more preferably a hydrogen atom, an alkyl group, an aryl group, a cyano group, or an alkyl sulfonyl group.

In the general formula (Y-1), the halogen atom is a chlorine atom, a bromine atom, or an iodine atom. Out of these, the halogen atom is preferably a chlorine atom or a bromine atom.

In the general formula (Y-1), the alkyl group includes a substituted or unsubstituted alkyl group. The substituted or unsubstituted alkyl group is preferably an alkyl group having 1 to 30 carbon atoms. The alkyl group includes a methyl group, an ethyl group, a butyl group, a tert-butyl group, a n-octyl group, an eicoxy group, a 2-chloroethyl group, a hydroxyethyl group, a cyano ethyl group, a 4-sulfobutyl group, and the like. The substituent of the substituted alkyl group includes a straight or branched chain alkyl group having 1 to 12 carbon atoms such as a methyl group, an ethyl group, a propyl group, an isopropyl group, a sec-butyl group, a tert-butyl group, a 2-ethylhexyl group, a 2-methyl sulfonyl ethyl group, a 3-phenoxypropyl group, a trifluoromethyl group, or the like; a straight or branched chain aralkyl group having 7 to 18 carbon atoms; a straight or branched chain alkenyl group having 2 to 12 carbon atoms; a straight or branched chain alkynyl group having 2 to 12 carbon atoms; a straight or branched chain cycloalkyl group having 3 to 12 carbon atoms such as a cyclopentyl group or the like; a straight or branched chain cycloalkenyl group having 3 to 12 carbon atoms; a halogen atom such as a chlorine atom, a bromine atom, or the like; an aryl group such as a phenyl group, a 4-tert-butylphenyl group, a 2,4-di-tert-amyl phenyl group, or the like; a heterocyclic group such as an imidazolyl group, a pyrazolyl group, a triazolyl group, a 2-furyl group, a 2-thienyl group, a 2-pyrimidinyl group, a 2-benzothiazolyl group, or the like; a cyano group; a hydroxyl group; a nitro group; a carboxyl group; an amino group; an alkoxy group such as a methoxy group, an ethoxy group, a 2-methoxyethoxy group, a 2-methyl sulfonyl ethoxy group, or the like; an aryloxy group such as a phenoxy group, a 2-methyl phenoxy group, a 4-tert-butyl phenoxy group, a 3-nitro phenoxy group, a 3-tert-butyloxy carbonyl phenoxy group, a 3-methoxy carbonylphenyloxy group, or the like; an acylamino group such as an acetamide group, a benzamide group, a 4-(3-tert-butyl-4-hydroxy phenoxy)butaneamide group, or the like; an alkylamino group such as a methylamino group, a butylamino group, a diethylamino group, a methyl butylamino group, or the like; an aryl amino group such as a phenyl amino group, a 2-chloroanilino group, or the like; an ureido group such as a phenylureido group, a methylureido group, an N,N-dibutylureido group, or the like; a sulfamoyl amino group such as an N,N-dipropyl sulfamoyl amino group or the like; an alkyl thio group such as a methyl thio group, an octyl thio group, a 2-phenoxyethyl thio group, or the like; an aryl thio group such as a phenyl thio group, a 2-butoxy-5-tert-octylphenyl thio group, a 2-carboxy phenyl thio group, or the like; an alkoxy carbonyl amino group such as a methoxy carbonyl amino group or the like; an alkyl sulfonyl amino group such as a methyl sulfonyl amino group or the like; an aryl sulfonyl amino group such as a phenyl sulfonyl amino group, a p-toluene sulfonyl amino group, or the like; a carbamoyl group such as an N-ethyl carbamoyl group, an N,N-dibutyl carbamoyl group, or the like; a sulfamoyl group such as an N-ethyl sulfamoyl group, an N,N-dipropyl sulfamoyl group, an N-phenyl sulfamoyl group, or the like; a sulfonyl group such as a methyl sulfonyl group, an octyl sulfonyl group, a phenyl sulfonyl group, a p-toluene sulfonyl group, or the like; an alkoxy carbonyl group such as a methoxy carbonyl group, a butyloxy carbonyl group, or the like; a heterocyclic oxy group such as a 1-phenyltetrazol-5-oxy group, a 2-tetrahydropyranyloxy group, or the like; an azo group such as a phenylazo group, a 4-methoxyphenyl azo group, a 4-pivaloylamino phenylazo group, a 2-hydroxy-4-propanoyl phenylazo group, or the like; an acyloxy group such as an acetoxy group or the like; a carbamoyloxy group such as an N-phenylcarbamoyloxy group or the like; a silyloxy group such as a trimethyl silyloxy group, a dibutyl methyl silyloxy group, or the like; an aryloxy carbonyl amino group such as a phenoxy carbonyl amino group or the like; an imide group such as an N-succinimide group, an N-phthalimide group, or the like; a heterocyclic thio group such as a 2-benzothiazolyl thio group, a 2,4-di-phenoxy-1,3,5-triazole-6-thio group, a 2-pyridylthio group, or the like; a sulfinyl group such as a 3-phenoxypropyl sulfinyl group or the like; a phosphonyl group such as a phenoxy phosphonyl group, an octyloxy phosphonyl group, a phenyl phosphonyl group, or the like; an aryloxy carbonyl group such as a phenoxy carbonyl group or the like; an acyl group such as an acetyl group, a 3-phenyl propanoyl group, a benzoyl group, or the like; and an ionic hydrophilic group such as a carboxyl group, a sulfo group, a phosphono group, a quaternary ammonium group, or the like; and the like. The alkyl group, the aralkyl group, the alkenyl group, the alkynyl group, the cycloalkyl group, and the cycloalkenyl group, which are the substituents of the substituted alkyl group, are preferably those having branched chains, and especially preferably those having asymmetric carbons, from the view point of improving the solubility of the dye and the stability of the water-based yellow ink. Out of these, a hydroxy group, an alkoxy group, a cyano group, a halogen atom, a sulfo group (which may also be in the form of a salt), or a carboxyl group (which may also be in the form of a salt) is preferably used as the substituent of the substituted alkyl group.

In the general formula (Y-1), the cycloalkyl group includes a substituted or unsubstituted cycloalkyl group. The substituted or unsubstituted cycloalkyl group is preferably a cycloalkyl group having 5 to 30 carbon atoms. The substituent of the substituted cycloalkyl group includes, for example, the substituents described for the substituted alkyl group. The cycloalkyl group includes a cyclohexyl group, a cyclopentyl group, a 4-n-dodecyl cyclohexyl group, and the like.

In the general formula (Y-1), the aralkyl group includes a substituted or unsubstituted aralkyl group. The substituted or unsubstituted aralkyl group is preferably an aralkyl group having 7 to 30 carbon atoms. The substituent of the substituted aralkyl group includes, for example, the substituents described for the substituted alkyl group. The aralkyl group includes a benzyl group, a 2-phenethyl group, and the like.

In the general formula (Y-1), the alkenyl group is a straight chain, branched, or cyclic substituted or unsubstituted alkenyl group. The alkenyl group is preferably a substituted or unsubstituted alkenyl group having 2 to 30 carbon atoms. The substituent of the substituted alkenyl group includes, for example, the substituents described for the substituted alkyl group. The alkenyl group includes a vinyl group, an allyl group, a prenyl group, a geranyl group, an oleyl group, a 2-cyclopentene-1-yl group, a cyclohexene-1-yl group, and the like.

In the general formula (Y-1), the alkynyl group is a substituted or unsubstituted alkynyl group having 2 to 30 carbon atoms. The substituent of the substituted alkynyl group includes, for example, the substituents described for the substituted alkyl group. The alkynyl group includes an ethynyl group, a propargyl group, and the like.

In the general formula (Y-1), the aryl group is a substituted or unsubstituted aryl group having 6 to 30 carbon atoms. The aryl group includes a phenyl group, a p-tolyl group, a naphthyl group, a m-chlorophenyl group, an o-hexadecanoyl aminophenyl group, and the like. The substituent of the substituted aryl group includes, for example, the substituents described for the substituted alkyl group.

In the general formula (Y-1), the heterocyclic group is a monovalent group obtained by removing one hydrogen atom from a 5- or 6-membered substituted or unsubstituted, aromatic or nonaromatic heterocyclic compound, which may also be further condensed. The heterocyclic group is preferably a 5- or 6-membered aromatic heterocyclic group having 3 to 30 carbon atoms. The substituent of the substituted heterocyclic group includes, for example, the substituents described for the substituted alkyl group. The heterocyclic group includes, with no limitation on a substitution site, a pyridine group, a pyrazine group, a pyridazine group, a pyrimidine group, a triazine group, a quinoline group, an isoquinoline group, a quinazoline group, a cinnoline group, a phthalazine group, a quinoxaline group, a pyrrole group, an indole group, a furan group, a benzofuran group, a thiophene group, a benzothiophene group, a pyrazole group, an imidazole group, a benzimidazole group, a triazole group, an oxazole group, a benzoxazole group, a thiazole group, a benzothiazole group, an isothiazole group, a benzisothiazole group, a thiadiazole group, an isoxazole group, a benzisoxazole group, a pyrrolidine group, a piperidine group, a piperazine group, an imidazolidine group, a thiazoline group, and the like.

In the general formula (Y-1), the alkoxy group includes a substituted or unsubstituted alkoxy group. The substituted or unsubstituted alkoxy group is preferably an alkoxy group having 1 to 30 carbon atoms. The substituent of the substituted alkoxy group includes, for example, the substituents described for the substituted alkyl group. The alkoxy group includes a methoxy group, an ethoxy group, an isopropoxy group, a n-octyloxy group, a methoxyethoxy group, a hydroxyethoxy group, a 3-carboxy propoxy group, and the like.

In the general formula (Y-1), the aryloxy group is preferably a substituted or unsubstituted aryloxy group having 6 to 30 carbon atoms. The substituent of the substituted aryloxy group includes, for example, the substituents described for the substituted alkyl group. The aryloxy group includes a phenoxy group, a 2-methyl phenoxy group, a 4-tert-butyl phenoxy group, a 3-nitro phenoxy group, a 2-tetradecanoyl amino phenoxy group, and the like.

In the general formula (Y-1), the silyloxy group is preferably a silyloxy group having 3 to 20 carbon atoms. The silyloxy group includes a trimethyl silyloxy group, a tert-butyldimethyl silyloxy group, and the like.

In the general formula (Y-1), the heterocyclic oxy group is preferably a substituted or unsubstituted heterocyclic oxy group having 2 to 30 carbon atoms. The substituent of the substituted heterocyclic oxy group includes, for example, the substituents described for the substituted alkyl group. The heterocyclic oxy group includes a 1-phenyltetrazol-5-oxy group, a 2-tetrahydropyranyloxy group, and the like.

In the general formula (Y-1), the acyloxy group is preferably a formyloxy group, a substituted or unsubstituted alkyl carbonyloxy group having 2 to 30 carbon atoms, or a substituted or unsubstituted aryl carbonyloxy group having 6 to 30 carbon atoms. The substituents of the substituted alkyl carbonyloxy group and the substituted aryl carbonyloxy group include, for example, the substituents described for the substituted alkyl group. The acyloxy group includes a formyloxy group, an acetyloxy group, a pivaloyloxy group, a stearoyloxy group, a benzoyloxy group, a p-methoxyphenyl carbonyloxy group, and the like.

In the general formula (Y-1), the carbamoyloxy group is preferably a substituted or unsubstituted carbamoyloxy group having 1 to 30 carbon atoms. The substituent of the substituted carbamoyloxy group includes, for example, the substituents described for the substituted alkyl group. The carbamoyloxy group includes an N,N-dimethyl carbamoyloxy group, an N,N-diethyl carbamoyloxy group, a morpholino carbonyloxy group, an N,N-di-n-octyl amino carbonyloxy group, an N-n-octyl carbamoyloxy group, and the like.

In the general formula (Y-1), the alkoxy carbonyloxy group is preferably a substituted or unsubstituted alkoxy carbonyloxy group having 2 to 30 carbon atoms. The substituent of the substituted alkoxy carbonyloxy group includes, for example, the substituents described for the substituted alkyl group. The alkoxy carbonyloxy group includes a methoxy carbonyloxy group, an ethoxy carbonyloxy group, a tert-butoxy carbonyloxy group, a n-octyl carbonyloxy group, and the like.

In the general formula (Y-1), the aryloxy carbonyloxy group is preferably a substituted or unsubstituted aryloxy carbonyloxy group having 7 to 30 carbon atoms. The substituent of the substituted aryloxy carbonyloxy group includes, for example, the substituents described for the substituted alkyl group. The aryloxy carbonyloxy group includes a phenoxy carbonyloxy group, a p-methoxyphenoxy carbonyloxy group, a p-n-hexadecyloxy phenoxy carbonyloxy group, and the like.

In the general formula (Y-1), the amino group is preferably a substituted or unsubstituted alkylamino group having 1 to 30 carbon atoms, or a substituted or unsubstituted arylamino group having 6 to 30 carbon atoms. The substituents of the substituted alkylamino group and the substituted arylamino group include, for example, the substituents described for the substituted alkyl group. The amino group includes an amino group, a methylamino group, a dimethylamino group, an anilino group, an N-methyl-anilino group, a diphenyl amino group, a hydroxyethylamino group, a carboxyethylamino group, a sulfoethylamino group, a 3,5-dicarboxy anilino group, and the like.

In the general formula (Y-1), the acylamino group is preferably a formyl amino group, a substituted or unsubstituted alkyl carbonyl amino group having 1 to 30 carbon atoms, or a substituted or unsubstituted aryl carbonyl amino group having 6 to 30 carbon atoms. The substituents of the substituted alkyl carbonyl amino group and the substituted aryl carbonyl amino group include, for example, the substituents described for the substituted alkyl group. The acylamino group includes a formylamino group, an acetylamino group, a pivaloylamino group, a lauroylamino group, a benzoylamino group, a 3,4,5-tri-n-octyloxyphenyl carbonyl amino group, and the like.

In the general formula (Y-1), the amino carbonyl amino group is preferably a substituted or unsubstituted amino carbonyl amino group having 1 to 30 carbon atoms. The substituent of the substituted amino carbonyl amino group includes, for example, the substituents described for the substituted alkyl group. The amino carbonyl amino group includes a carbamoylamino group, an N,N-dimethylamino carbonyl amino group, an N,N-diethylamino carbonyl amino group, a morpholino carbonyl amino group, and the like.

In the general formula (Y-1), the alkoxy carbonyl amino group is preferably a substituted or unsubstituted alkoxy carbonyl amino group having 2 to 30 carbon atoms. The substituent of the substituted alkoxy carbonyl amino group includes, for example, the substituents described for the substituted alkyl group. The alkoxy carbonyl amino group includes a methoxy carbonyl amino group, an ethoxy carbonyl amino group, a tert-butoxy carbonyl amino group, a n-octadecyloxy carbonyl amino group, an N-methyl-methoxy carbonyl amino group, and the like.

In the general formula (Y-1), the aryloxy carbonyl amino group is preferably a substituted or unsubstituted aryloxy carbonyl amino group having 7 to 30 carbon atoms. The substituent of the substituted aryloxy carbonyl amino group includes, for example, the substituents described for the substituted alkyl group. The aryloxy carbonyl amino group includes a phenoxy carbonyl amino group, a p-chlorophenoxy carbonyl amino group, a m-n-octyloxy phenoxy carbonyl amino group, and the like.

In the general formula (Y-1), the sulfamoyl amino group is preferably a substituted or unsubstituted sulfamoyl amino group having 0 to 30 carbon atoms. The substituent of the substituted sulfamoyl amino group includes, for example, the substituents described for the substituted alkyl group. The sulfamoyl amino group includes a sulfamoyl amino group, an N,N-dimethylamino sulfonyl amino group, an N-n-octylamino sulfonylamino group, and the like.

In the general formula (Y-1), the alkyl sulfonyl amino group is preferably a substituted or unsubstituted alkyl sulfonyl amino group having 1 to 30 carbon atoms. The substituent of the substituted alkyl sulfonyl amino group includes, for example, the substituents described for the substituted alkyl group. The alkyl sulfonyl amino group includes a methyl sulfonyl amino group, a butyl sulfonyl amino group, and the like.

In the general formula (Y-1), the aryl sulfonyl amino group is preferably a substituted or unsubstituted aryl sulfonyl amino group having 6 to 30 carbon atoms. The substituent of the substituted aryl sulfonyl amino group includes, for example, the substituents described for the substituted alkyl group. The aryl sulfonyl amino group includes a phenyl sulfonyl amino group, a 2,3,5-trichlorophenyl sulfonyl amino group, a p-methyl phenyl sulfonyl amino group, and the like.

In the general formula (Y-1), the alkyl thio group is preferably a substituted or unsubstituted alkyl thio group having 1 to 30 carbon atoms. The substituent of the substituted alkyl thio group includes, for example, the substituents described for the substituted alkyl group. The alkyl thio group includes a methyl thio group, an ethyl thio group, a n-hexylthio group, and the like.

In the general formula (Y-1), the aryl thio group is preferably a substituted or unsubstituted aryl thio group having 6 to 30 carbon atoms. The substituent of the substituted aryl thio group includes, for example, the substituents described for the substituted alkyl group. The aryl thio group includes a phenyl thio group, a p-chlorophenyl thio group, a m-methoxyphenyl thio group, and the like.

In the general formula (Y-1), the heterocyclic thio group is preferably a substituted or unsubstituted heterocyclic thio group having 2 to 30 carbon atoms. The substituent of the substituted heterocyclic thio group includes, for example, the substituents described for the substituted alkyl group. The heterocyclic thio group includes a 2-benzothiazolyl thio group, a 1-phenyltetrazole-5-yl thio group, and the like.

In the general formula (Y-1), the sulfamoyl group is preferably a substituted or unsubstituted sulfamoyl group having 0 to 30 carbon atoms. The substituent of the substituted sulfamoyl group includes, for example, the substituents described for the substituted alkyl group. The sulfamoyl group includes an N-ethyl sulfamoyl group, an N-(3-dodecyloxy propyl)sulfamoyl group, an N,N-dimethyl sulfamoyl group, an N-acetyl sulfamoyl group, an N-benzoyl sulfamoyl group, an N—(N-phenyl carbamoyl)sulfamoyl group, and the like.

In the general formula (Y-1), the alkyl sulfinyl group is preferably a substituted or unsubstituted alkyl sulfinyl group having 1 to 30 carbon atoms. The substituent of the substituted alkyl sulfinyl group includes, for example, the substituents described for the substituted alkyl group. The alkyl sulfinyl group includes a methyl sulfinyl group, an ethyl sulfinyl group, and the like.

In the general formula (Y-1), the aryl sulfinyl group is preferably a substituted or unsubstituted aryl sulfinyl group having 6 to 30 carbon atoms. The substituent of the substituted aryl sulfinyl group includes, for example, the substituents described for the substituted alkyl group. The aryl sulfinyl group includes a phenyl sulfinyl group, a p-methyl sulfinyl group, and the like.

In the general formula (Y-1), the alkyl sulfonyl group is preferably a substituted or unsubstituted alkyl sulfonyl group having 1 to 30 carbon atoms. The substituent of the substituted alkyl sulfonyl group includes, for example, the substituents described for the substituted alkyl group. The alkyl sulfonyl group includes a methyl sulfonyl group, an ethyl sulfonyl group, and the like.

In the general formula (Y-1), the aryl sulfonyl group is preferably a substituted or unsubstituted aryl sulfonyl group having 6 to 30 carbon atoms. The substituent of the substituted aryl sulfonyl group includes, for example, the substituents described for the substituted alkyl group. The aryl sulfonyl group includes a phenyl sulfonyl group, a p-toluene sulfonyl group, and the like.

In the general formula (Y-1), the acyl group is preferably a formyl group, a substituted or unsubstituted alkyl carbonyl group having 2 to 30 carbon atoms, a substituted or unsubstituted aryl carbonyl group having 7 to 30 carbon atoms, or a substituted or unsubstituted heterocyclic carbonyl group having 4 to 30 carbon atoms, bound to a carbonyl group through a carbon atom. The substituents of the substituted alkyl carbonyl group, the substituted aryl carbonyl group, and the substituted heterocyclic carbonyl group include, for example, the substituents described for the substituted alkyl group. The acyl group includes an acetyl group, a pivaloyl group, a 2-chloroacetyl group, a stearoyl group, a benzoyl group, a p-n-octyloxy phenyl carbonyl group, a 2-pyridyl carbonyl group, a 2-furyl carbonyl group, and the like.

In the general formula (Y-1), the aryloxy carbonyl group is preferably a substituted or unsubstituted aryloxy carbonyl group having 7 to 30 carbon atoms. The substituent of the substituted aryloxy carbonyl group includes, for example, the substituents described for the substituted alkyl group. The aryloxy carbonyl group includes a phenoxy carbonyl group, an o-chlorophenoxy carbonyl group, a m-nitrophenoxy carbonyl group, a p-tert-butyl phenoxy carbonyl group, and the like.

In the general formula (Y-1), the alkoxy carbonyl group is preferably a substituted or unsubstituted alkoxy carbonyl group having 2 to 30 carbon atoms. The substituent of the substituted alkoxy carbonyl group includes, for example, the substituents described for the substituted alkyl group. The alkoxy carbonyl group includes a methoxy carbonyl group, an ethoxy carbonyl group, a tert-butoxy carbonyl group, a n-octadecyloxy carbonyl group, and the like.

In the general formula (Y-1), the carbamoyl group is preferably a substituted or unsubstituted carbamoyl group having 1 to 30 carbon atoms. The substituent of the substituted carbamoyl group includes, for example, the substituents described for the substituted alkyl group. The carbamoyl group includes a carbamoyl group, an N-methyl carbamoyl group, an N,N-dimethyl carbamoyl group, an N,N-di-n-octyl carbamoyl group, an N-(methylsulfonyl)carbamoyl group, and the like.

In the general formula (Y-1), the phosphino group is preferably a substituted or unsubstituted phosphino group having 2 to 30 carbon atoms. The substituent of the substituted phosphino group includes, for example, the substituents described for the substituted alkyl group. The phosphino group includes a dimethyl phosphino group, a diphenyl phosphino group, a methyl phenoxy phosphino group, and the like.

In the general formula (Y-1), the phosphinyl group is preferably a substituted or unsubstituted phosphinyl group having 2 to 30 carbon atoms. The substituent of the substituted phosphinyl group includes, for example, the substituents described for the substituted alkyl group. The phosphinyl group includes a phosphinyl group, a dioctyloxy phosphinyl group, a diethoxy phosphinyl group, and the like.

In the general formula (Y-1), the phosphinyloxy group is preferably a substituted or unsubstituted phosphinyloxy group having 2 to 30 carbon atoms. The substituent of the substituted phosphinyloxy group includes, for example, the substituents described for the substituted alkyl group. The phosphinyloxy group includes a diphenoxy phosphinyloxy group, a dioctyloxy phosphinyloxy group, and the like.

In the general formula (Y-1), the phosphinyl amino group is preferably a substituted or unsubstituted phosphinyl amino group having 2 to 30 carbon atoms. The substituent of the substituted phosphinyl amino group includes, for example, the substituents described for the substituted alkyl group. The phosphinyl amino group includes a dimethoxy phosphinyl amino group, a dimethylamino phosphinyl amino group, and the like.

In the general formula (Y-1), the silyl group is preferably a substituted or unsubstituted silyl group having 3 to 30 carbon atoms. The substituent of the substituted silyl group includes, for example, the substituents described for the substituted alkyl group. The silyl group includes a trimethyl silyl group, a tert-butyldimethyl silyl group, a phenyldimethyl silyl group, and the like.

In the general formula (Y-1), the azo group includes a phenyl azo group, a 4-methoxyphenyl azo group, a 4-pivaloylamino phenyl azo group, a 2-hydroxy-4-propanoyl phenyl azo group, and the like.

In the general formula (Y-1), the imide group includes an N-succinimide group, an N-phthalimide group, and the like.

In the general formula (Y-1), $X_1$ and $X_2$ each represent an electron attractive group, and may be identical to or different from each other. The $X_1$ and $X_2$ include an acyl group, an acyloxy group, a carbamoyl group, an alkoxy carbonyl group, an aryloxy carbonyl group, a cyano group, a nitro group, a dialkyl phosphono group, a diaryl phosphono group, a diaryl phosphinyl group, an alkyl sulfinyl group, an aryl sulfinyl group, an alkyl sulfonyl group, an aryl sulfonyl group, a sulfonyloxy group, an acyl thio group, a sulfamoyl group, a thiocyanate group, a thiocarbonyl group, a halogenated alkyl group, a halogenated alkoxy group, a halogenated aryloxy group, a halogenated alkylamino group, a halogenated alkylthio group, an aryl group substituted with another electron attractive group, a heterocyclic group, a halogen atom, an azo group, a selenocyanate group, and the like.

In the general formula (Y-1), $X_1$ and $X_2$ each preferably represent an acyl group having 2 to 12 carbon atoms, an acyloxy group having 2 to 12 carbon atoms, a carbamoyl group having 1 to 12 carbon atoms, an alkoxy carbonyl group having 2 to 12 carbon atoms, an aryloxy carbonyl group having 7 to 18 carbon atoms, a cyano group, a nitro group, an alkyl sulfinyl group having 1 to 12 carbon atoms, an aryl sulfinyl group having 6 to 18 carbon atoms, an alkyl sulfonyl group having 1 to 12 carbon atoms, an aryl sulfonyl group having 6 to 18 carbon atoms, a sulfamoyl group having 0 to 12 carbon atoms, a halogenated alkyl group having 1 to 12 carbon atoms, a halogenated alkoxy group having 1 to 12 carbon atoms, a halogenated alkylthio group having 1 to 12 carbon atoms, a halogenated aryloxy group having 7 to 18 carbon atoms, an aryl group having 7 to 18 carbon atoms, substituted with two or more electron attractive groups other than the aryl group, or a 5- to 8-membered heterocyclic group having 1 to 18 carbon atoms and having a nitrogen atom, an oxygen atom, or a sulfur atom.

In the general formula (Y-1), $Z_1$ and $Z_2$ each represent a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, and may be identical to or different from each other. Examples of the alkyl group, the alkenyl group, the alkynyl group, the aralkyl group, the aryl group, and the heterocyclic group are the same as those described for $R_1$, $R_2$, $Y_1$, and $Y_2$.

In the general formula (Y-1), $M_1$ represents a hydrogen atom or a cation. The cation is an alkali metal ion, an ammonium ion, or a quaternary ammonium ion. The cation is preferably Li, Na, K, $NH_4$, or $NR_4$. $R_4$ represents an alkyl group or an aryl group, and examples thereof are the same as those described for $R_1$, $R_2$, $Y_1$, and $Y_2$. Out of these, the cation is preferably Li, Na, K, or $NH_4$.

As for a preferred combination of the substituents of the dye represented by the general formula (Y-1), at least one of various substituents is preferably one of the aforementioned preferred groups. More preferably, a larger number of various substituents are the aforementioned preferred groups. Most preferably, all of the substituents are the aforementioned preferred groups.

Particularly preferred combinations of the substituents of the dye represented by the general formula (Y-1) include the following (I) to (V).

(I) $R_1$ and $R_2$ may be identical to or different from each other, and preferably represent a substituted or unsubstituted alkyl group having 1 to 12 carbon atoms in total, a substituted or unsubstituted aryl group having 6 to 18 carbon atoms in total, or a substituted or unsubstituted heterocyclic group having 4 to 12 carbon atoms in total. $R_1$ and $R_2$ more preferably represent a straight or branched chain alkyl group having 1 to 8 carbon atoms in total, still more preferably represent a secondary or tertiary alkyl group, and most preferably represent a tert-butyl group.

(II) $X_1$ and $X_2$ each represent an electron attractive group, and may be identical to or different from each other. $X_1$ and $X_2$ preferably represent a cyano group, an alkyl sulfonyl group having 1 to 12 carbon atoms, an aryl sulfonyl group having 6 to 18 carbon atoms, or a sulfamoyl group having 0 to 12 carbon atoms. $X_1$ and $X_2$ more preferably represent a cyano group or an alkyl sulfonyl group having 1 to 12 carbon atoms.

(III) $Y_1$ and $Y_2$ may be identical to or different from each other, and preferably represent a hydrogen atom, a substituted or unsubstituted alkyl group having 1 to 12 carbon atoms in total, a substituted or unsubstituted aryl group having 6 to 18 carbon atoms in total, or a substituted or unsubstituted heterocyclic group having 4 to 12 carbon atoms in total. $Y_1$ and $Y_2$ more preferably represent a hydrogen atom or a substituted or unsubstituted alkyl group. $Y_1$ and $Y_2$ most preferably represent a hydrogen atom.

(IV) $Z_1$ and $Z_2$ may be identical to or different from each other, and preferably represent a substituted or unsubstituted alkyl group having 1 to 12 carbon atoms in total, a substituted or unsubstituted aryl group having 6 to 18 carbon atoms in total, or a substituted or unsubstituted heterocyclic group having 4 to 12 carbon atoms in total. $Z_1$ and $Z_2$ more preferably represent a substituted or unsubstituted aryl group or a substituted or unsubstituted heterocyclic group. $Z_1$ and $Z_2$ still more preferably represent a substituted aryl group.

(V) $M_1$ preferably represents a hydrogen atom, an alkali metal ion, an ammonium ion, or a quaternary ammonium ion. $M_1$ more preferably represents a hydrogen atom, Li, Na, K, or $NH_4$.

Preferred examples of the dye (Y-1) include compounds represented by the following chemical formulae (Y-1a) to (Y-1e).

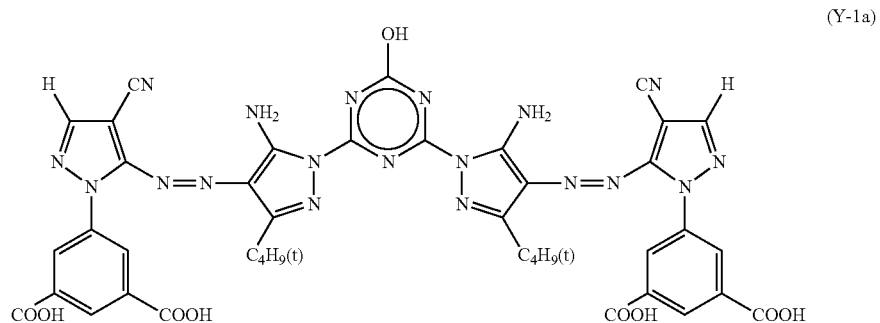

(Y-1a)

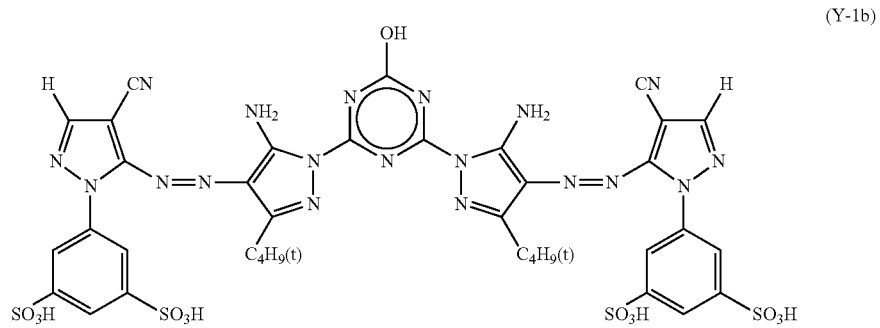

(Y-1b)

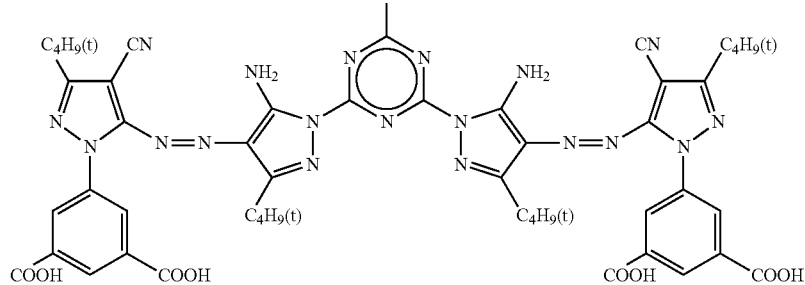
(Y-1c)

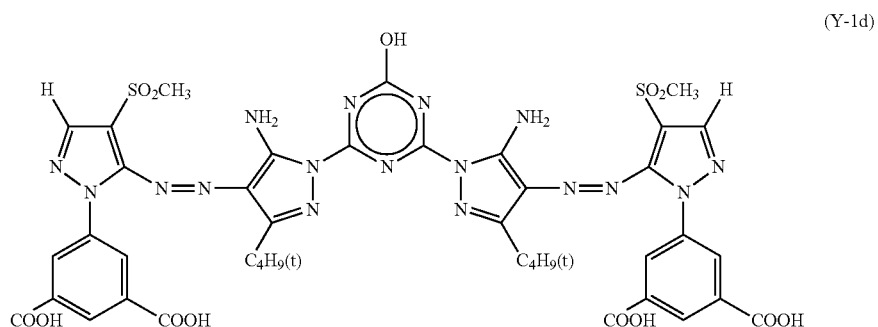
(Y-1d)

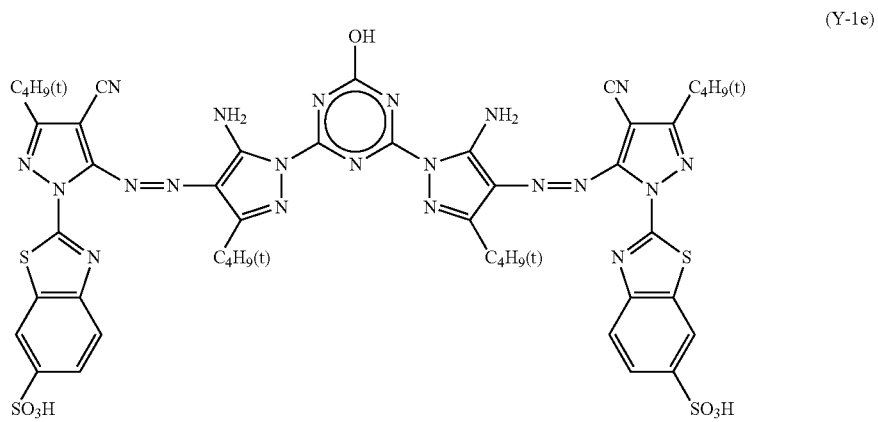
(Y-1e)

The blending amount of the yellow dye (Y-1) is not particularly limited. By containing the yellow dye (Y-1) in the water-based yellow ink, ozone resistance and light resistance can be improved. The blending amount of the yellow dye (Y-1) is, for example, in the range of 0.1% by weight to 10% by weight, preferably in the range of 0.8% by weight to 4.8% by weight, and more preferably in the range of 1.6% by weight to 4.8% by weight with respect to the entire amount of the water-based yellow ink.

As mentioned above, the yellow dye (Y-2) is at least one dye selected from the group consisting of C.I. Direct Yellow 86, C.I. Direct Yellow 132, and C.I. Direct Yellow 142.

C.I. Direct Yellow 86 is a dye represented by the structural formula (Y-2a).

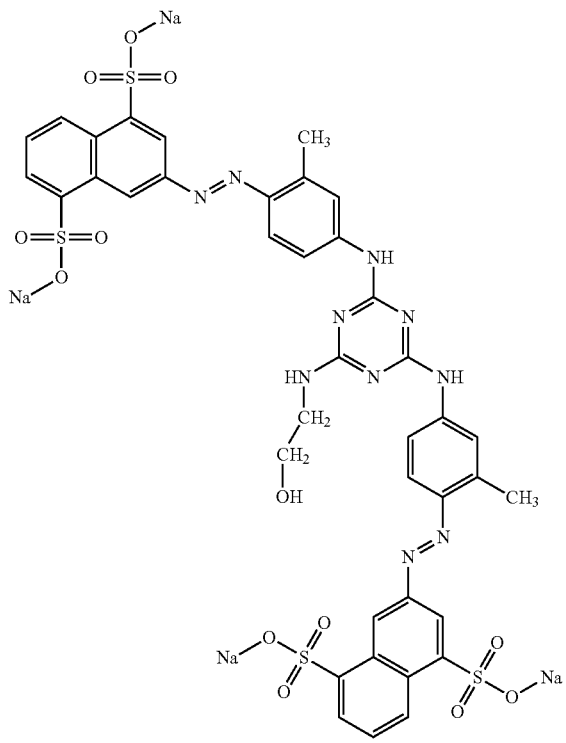

C.I. Direct Yellow 132 is a dye represented by the structural formula (Y-2b).

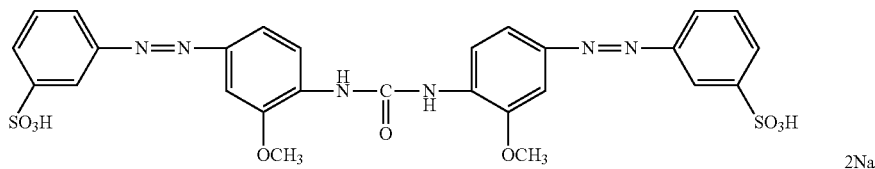

C.I. Direct Yellow 142 is a dye represented by the structural formula (Y-2c).

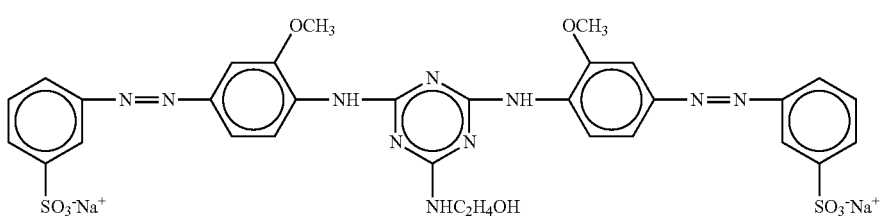

The blending amount of the yellow dye (Y-2) is not particularly limited. By containing the yellow dye (Y-2) in the water-based yellow ink, storing stability can be improved. The blending amount of the yellow dye (Y-2) is, for example, in the range of 0.1% by weight to 10% by weight, preferably in the range of 0.2% by weight to 3.2% by weight, and more preferably in the range of 0.2% by weight to 1.6% by weight, with respect to the entire amount of the water-based yellow ink.

The weight ratio of the yellow dye (Y-1) to the yellow dye (Y-2) in the water-based yellow ink is preferably in the range of 60:40 to 98:2 (yellow dye (Y-1):yellow dye (Y-2)), and more preferably in the range of 60:40 to 95:5 (yellow dye (Y-1):yellow dye (Y-2)). By setting the weight ratio to be in the aforementioned range, storing stability, ozone resistance, and light resistance can be further improved.

The entire blending amount of the yellow dye (Y-1) and the yellow dye (Y-2) is not particularly limited, and is preferably in the range of 2% by weight to 6% by weight with respect to the entire amount of the water-based yellow ink. By setting the entire blending amount to be in the aforementioned range, color vividness or brightness, ozone resistance, light resistance, jetting stability, and storing stability can be further improved, and bleeding between the yellow ink and other color inks can be further suppressed.

The yellow colorant may further contain, for example, other dyes and pigments, besides the yellow dye (Y-1) and the yellow dye (Y-2).

The water is preferably ion-exchange water or purified water. The blending amount of the water with respect to the entire amount of the water-based yellow ink (the proportion of the water in the water-based yellow ink) is, for example, in the range of 10% by weight to 90% by weight, and preferably in the range of 40% by weight to 80% by weight. The proportion of the water in the water-based yellow ink may be, for example, a balance of the other components.

The water-soluble organic solvent includes, for example, a humectant which prevents the water-based yellow ink from drying at a nozzle tip portion of an ink-jet head and a penetrant which adjusts a drying rate of the water-based yellow ink on a recording medium.

The humectant is not particularly limited, and includes lower alcohols such as methyl alcohol, ethyl alcohol, n-propyl alcohol, isopropyl alcohol, n-butyl alcohol, sec-butyl alcohol, tert-butyl alcohol, and the like; amides such as dimethylformamide, dimethylacetamide, and the like; ketones such as acetone and the like; ketoalcohols such as diacetone alcohol and the like; ethers such as tetrahydrofuran, dioxane, and the like; polyalcohols such as polyalkylene glycol, alkylene glycol, glycerin, and the like; 2-pyrrolidone; N-methyl-2-pyrrolidone; 1,3-dimethyl-2-imidazolidinone; and the like.

The polyalkylene glycol includes polyethylene glycol, polypropylene glycol, and the like. The alkylene glycol includes ethylene glycol, propylene glycol, butylene glycol, diethylene glycol, triethylene glycol, dipropylene glycol, tripropylene glycol, thiodiglycol, hexylene glycol, and the like. These humectants may be used alone or in a combination of two or more of them. Out of these, the humectant is preferably polyalcohol such as alkylene glycol, glycerin, or the like.

The blending amount of the humectant with respect to the entire amount of the water-based yellow ink is, for example, in the range of 0% by weight to 95% by weight, preferably in the range of 5% by weight to 80% by weight, and more preferably in the range of 5% by weight to 50% by weight.

The penetrant includes glycol ethers and the like. The glycol ethers includes ethylene glycol methyl ether, ethylene glycol ethyl ether, ethylene glycol-n-propyl ether, diethylene glycol methyl ether, diethylene glycol ethyl ether, diethylene glycol-n-propyl ether, diethylene glycol-n-butyl ether, diethylene glycol-n-hexyl ether, triethylene glycol methyl ether, triethylene glycol ethyl ether, triethylene glycol-n-propyl ether, triethylene glycol-n-butyl ether, propylene glycol methyl ether, propylene glycol ethyl ether, propylene glycol-n-propyl ether, propylene glycol-n-butyl ether, dipropylene glycol methyl ether, dipropylene glycol ethyl ether, dipropylene glycol-n-propyl ether, dipropylene glycol-n-butyl ether, tripropylene glycol methyl ether, tripropylene glycol ethyl ether, tripropylene glycol-n-propyl ether, tripropylene glycol-n-butyl ether, and the like. The penetrants may be used alone or in a combination of two or more of them.

The blending amount of the penetrant with respect to the entire amount of the water-based yellow ink is, for example, in the range of 0% by weight to 20% by weight, preferably in the range of 0.1% by weight to 15% by weight, and more preferably in the range of 0.5% by weight to 10% by weight.

The water-based yellow ink may further contain a conventionally known additive as required. The additive includes a surfactant, a pH adjuster, a viscosity modifier, a surface tension modifier, a mildew proofing agent, and the like. The viscosity modifier includes polyvinyl alcohol, cellulose, a water-soluble resin, and the like.

The water-based yellow ink can be prepared, for example, by uniformly mixing a yellow colorant, water, a water-soluble organic solvent with other addition components as required by a conventionally known method, and then removing sediments with a filter etc.

(Water-Based Magenta Ink)

As mentioned above, the water-based magenta ink contains a magenta colorant, water, and a water-soluble organic solvent. The magenta colorant contains the magenta dye (M-1) and the magenta dye (M-2).

As mentioned above, the magenta dye (M-1) is a dye represented by the general formula (M-1).

A compound represented by the general formula (M-1) may be a compound in which all of the three Ms are sodium (sodium salts), a compound in which all of the three Ms are ammonium (ammonium salts), or a compound in which one or two of the three Ms are sodium and the other(s) is(are) ammonium. The magenta dye (M-1) may be composed of one of the aforementioned compounds or may be a mixture containing two or more of the aforementioned compounds. Each of the Ms may be ionized in a water-based magenta ink to become an ion (at least one of $Na^+$ and $NH_4^+$).

Preferred examples of the magenta dye (M-1) include compounds represented by the magenta dyes (M-1a) to (M-1e) that are summarized in TABLE 1.

TABLE 1

| | $n_1$ | M | $R_0$ |
|---|---|---|---|
| Magenta dye (M-1a) | 1 | Mixture of Na and $NH_4$ | —$NHCH_2COOH$ |
| Magenta dye (M-1b) | 1 | Mixture of Na and $NH_4$ | —$NH(CH_2)_5COOH$ |
| Magenta dye (M-1c) | 1 | Mixture of Na and $NH_4$ | —$NH(CH_2)_7COOH$ |
| Magenta dye (M-1d) | 2 | Mixture of Na and $NH_4$ | —$NHCH_2COOH$ |
| Magenta dye (M-1e) | 2 | Mixture of Na and $NH_4$ | —$NH(CH_2)_5COOH$ |

The dye (M-1) can be produced according to a conventionally known method. An example of the method for producing the dye (M-1) is as follows.

That is, first, a compound represented by the structural formula (M-1-b) is obtained by reaction of 1 mol of an anthraquinone compound represented by the structural formula (M-1-a) and 1.1 mol to 3 mol of benzoic acetic acid ethyl ester in a polar solvent such as xylene or the like in the presence of a basic compound such as sodium carbonate or the like at a temperature from 130° C. to 180° C. for 5 hours to 15 hours.

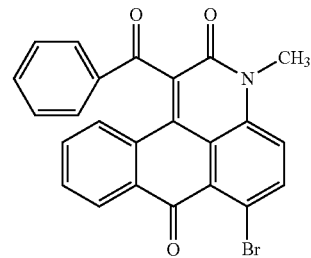

(M-1-a)

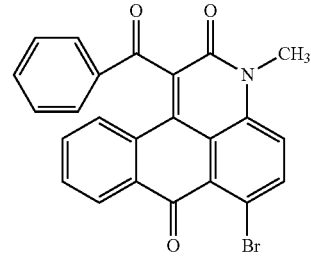

(M-1-b)

Next, 1 mol of the compound represented by the structural formula (M-1-b) obtained as above and 1 mol to 5 mol of meta aminoacetamido are condensed by the Ullmann reaction in an aprotic polar organic solvent such as N,N-dimethylformamide or the like in the presence of a base such as sodium carbonate or the like and a copper catalyst such as copper acetate or the like at a temperature from 110° C. to 150° C. for 2 hours to 6 hours, and thereby a compound represented by the structural formula (M-1-c) is obtained.

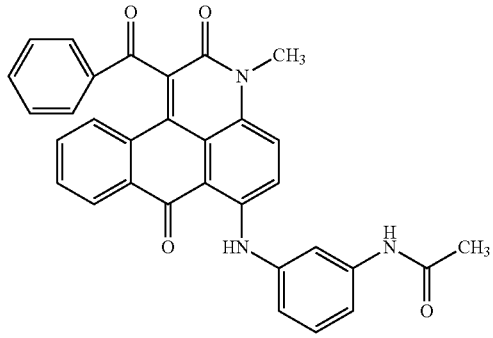

(M-1-c)

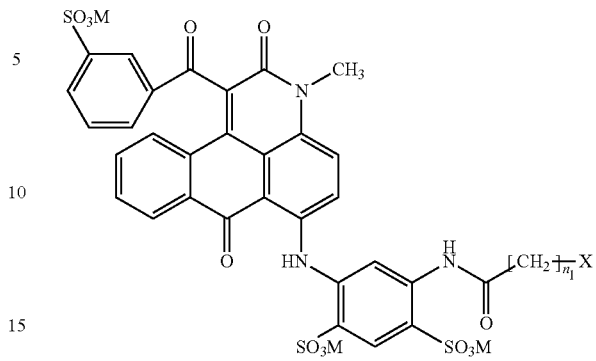

(M-1-f)

Then, a compound represented by the structural formula (M-1-d) is obtained by performing sulfonation of the compound represented by the structural formula (M-1-c) obtained as above in fuming sulfuric acid of 8% to 15% at a temperature from 50° C. to 120° C. and performing hydrolysis reaction of an acetylamino group simultaneously.

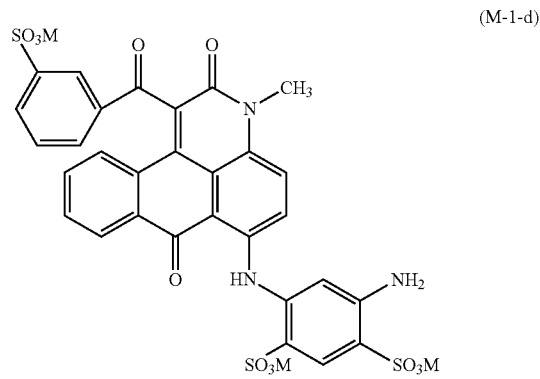

(M-1-d)

Then, a compound represented by the structural formula (M-1-f) is obtained by reaction of 1 mol of the compound represented by the structural formula (M-1-d) obtained as above and 2 mol to 2.5 mol of a compound represented by the structural formula (M-1-e) in water under reaction conditions in which the pH is from 2 to 9, the temperature is from 2° C. to 15° C., and the reaction time is from 30 minutes to 1 hour. The compound represented by the structural formula (M-1-f) obtained as above is reacted with 2 mol to 5 mol of a compound corresponding to $R_0$ (i.e., a compound represented by "$R_0$—H" or the like) under reaction conditions in which the pH is from 7 to 10, the temperature is from 20° C. to 90° C., and the reaction time is from 10 minutes to 10 hours. Thereby, a leaving group X in the structural formula (M-1-f) is substituted by $R_0$ and thus the dye (1) is obtained.

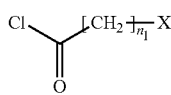

(M-1-e)

As mentioned above, the magenta dye (M-2) is at least one dye selected from the group consisting of dyes represented by the general formula (M-2a), dyes represented by the general formula (M-2b), C.I. Acid Red 1, and C.I. Acid Red 254.

In the general formula (M-2a), the substituted or unsubstituted alkyl group is preferably an alkyl group having 1 to 6 carbon atoms. The substituted or unsubstituted alkyl group includes a methyl group, an ethyl group, a n-butyl group, an isopropyl group, a tert-butyl group, a hydroxyethyl group, a methoxyethyl group, a cyanoethyl group, a trifluoromethyl group, a 3-sulfopropyl group, a 4-sulfobutyl group, and the like. A substituent of the substituted alkyl group includes a hydroxyl group; an alkoxy group such as a methoxy group, an ethoxy group, or the like; a cyano group; a halogen atom such as a fluorine atom, a chlorine atom, a bromine atom, an iodine atom, or the like; an ionic hydrophilic group such as a carboxylate, a sulfonate, or the like; and the like.

In the general formula (M-2a), the substituted or unsubstituted aryl group is preferably an aryl group having 6 to 12 carbon atoms. However, in the case of the substituted aryl group, the number of carbon atoms does not include the number of carbon atoms of its substituent(s). The substituted or unsubstituted aryl group includes a phenyl group, a naphthyl group, a p-tolyl group, a p-octylphenyl group, a mesityl group, a p-methoxyphenyl group, an o-chlorophenyl group, a m-(3-sulfopropylamino)phenyl group, and the like. The substituent of the substituted aryl group includes an alkyl group such as a methyl group, an ethyl group, an isopropyl group, a tert-butyl group, a n-octyl group, or the like; the same alkoxy group as that described above; the same halogen atom as that described above; an alkylamino group such as a methylamino group, a dimethylamino group, or the like; an amide group; a carbamoyl group; a sulfamoyl group; a sulfoamide group; a hydroxyl group; an ester group such as a methoxycarbonyl group, an ethoxycarbonyl group, or the like; the same ionic hydrophilic group as that described above; and the like.

In the general formula (M-2a), the halogen atom includes a fluorine atom, a chlorine atom, a bromine atom, an iodine atom, and the like.

In the general formula (M-2a), the substituted or unsubstituted heterocyclic group is preferably a 5- or 6-membered heterocyclic group. The substituted or unsubstituted heterocyclic group includes a 2-pyridyl group, a 2-thienyl group, a 2-thiazolyl group, a 2-benzothiazolyl group, a 2-furyl group, a 6-sulfobenzothiazolyl group, a 6-sulfonate benzothiazolyl group, and the like. The substituent of the substituted heterocyclic group includes an amide group, a carbamoyl group, a sulfamoyl group, a sulfoamide group, a hydroxyl group, the same ester group as that described above, the same ionic hydrophilic group as that described above, and the like.

In the general formula (M-2a), the substituted or unsubstituted sulfonyl group includes a methylsulfonyl group, a phenylsulfonyl group, and the like. The substituent of the substituted sulfonyl group includes the same substituted or unsubstituted alkyl group as that described above, the same substituted or unsubstituted aryl group as that described above, and the like.

In the general formula (M-2a), the substituted or unsubstituted acyl group is preferably an acyl group having 1 to 12 carbon atoms. However, in the case of the substituted acyl group, the number of carbon atoms does not include the number of carbon atoms of its substituent(s). The substituted or unsubstituted acyl group includes an acetyl group, a benzoyl group, a chloroacetyl group, and the like. The substituent of the substituted acyl group includes, for example, the same ionic hydrophilic group as that described above.

As described above, in the general formula (M-2a), $A_1$ and $A_2$ are both substituted or unsubstituted carbon atoms, or one of $A_1$ and $A_2$ is a substituted or unsubstituted carbon atom and the other is a nitrogen atom. $A_1$ and $A_2$ are both preferably carbon atoms, in view of the fact that better performance can be obtained. The substituent bonded to the carbon atoms $A_1$ and $A_2$ includes an alkyl group having 1 to 3 carbon atoms, a carboxyl group, a carbamoyl group, a cyano group, and the like.

As described above, in the general formula (M-2a), $R_{14}$ and $R_{15}$ are not both hydrogen atoms and $R_{16}$ and $R_{17}$ are not both hydrogen atoms. Moreover, in the general formula (M-2a), the water solubility of the dye tends to be improved as the number of substitutions by a sulfo group or a carboxyl group is increased. Therefore, the number of these substitutions is preferably adjusted in accordance with needs.

One preferred magenta dye (M-2a) is, for example, a magenta dye (M-2a) wherein, in the general formula (M-2a), $R_{11}$ is an alkyl group; $R_{12}$ is a cyano group; $R_{13}$ is a hydrogen atom or a substituted or unsubstituted heterocyclic group; $R_{14}$ is a hydrogen atom, a substituted or unsubstituted heterocyclic group or a substituted aryl group; $R_{15}$ and $R_{16}$ each are a substituted heterocyclic group or a substituted aryl group; $R_{17}$ is a hydrogen atom; $A_1$ is a substituted carbon atom; and $A_2$ is a substituted or unsubstituted carbon atom.

A more preferred magenta dye (M-2a) is, for example, a magenta dye (M-2a) wherein, in the general formula (M-2a), $R_{11}$ is a tert-butyl group; $R_{12}$ is a cyano group; $R_{13}$ is a hydrogen atom or a benzothiazolyl group (preferably, a benzothiazole-2-yl group) optionally substituted by a sulfo group or an alkali metal sulfonate group; $R_{14}$ is a hydrogen atom, a benzothiazolyl group (preferably, a benzothiazole-2-yl group) optionally substituted by a sulfo group or an alkali metal sulfonate group, or a trialkylphenyl group (preferably, a mesityl group) substituted by a sulfo group or an alkali metal sulfonate group; $R_{15}$ and $R_{16}$ each are a monoalkylphenyl group, a dialkylphenyl group, or a trialkylphenyl group (preferably, a p-octylphenyl group or a mesityl group) optionally substituted by a sulfo group or an alkali metal sulfonate group or a benzothiazolyl group (preferably, a benzothiazole-2-yl group) substituted by a sulfo group or an alkali metal sulfonate group; $R_{17}$ is a hydrogen atom; $A_1$ is a carbon atom substituted by an alkyl group; and $A_2$ is a carbon atom optionally substituted by a cyano group.

Preferred examples of the magenta dye (M-2a) include compounds represented by the chemical formulae (M-2a-1) to (M-2a-6).

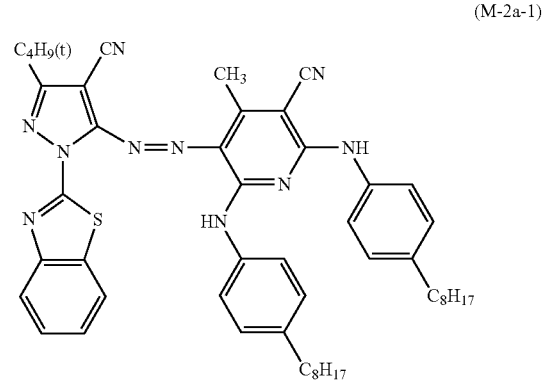

(M-2a-1)

The compound represented by the chemical formula (M-2a-1) is a compound, wherein, in the general formula (M-2a), $R_{11}$ is a tert-butyl group; $R_{12}$ is a cyano group; $R_{13}$ is a benzothiazole-2-yl group; $R_{14}$ is a hydrogen atom; $R_{15}$ and $R_{16}$ each are a p-octylphenyl group; $R_{17}$ is a hydrogen atom; $A_1$ is a carbon atom substituted by a methyl group; and $A_2$ is a carbon atom substituted by a cyano group.

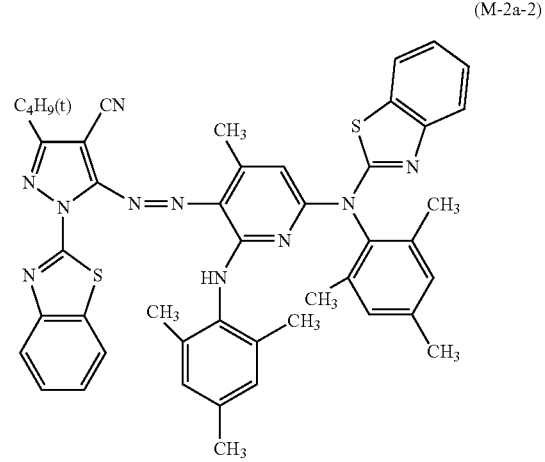

(M-2a-2)

The compound represented by the chemical formula (M-2a-2) is another compound, wherein, in the general formula (M-2a), $R_{11}$ is a tert-butyl group; $R_{12}$ is a cyano group; $R_{13}$ and $R_{14}$ each are a benzothiazole-2-yl group; $R_{15}$ and $R_{16}$ each are a mesityl group; $R_{17}$ is a hydrogen atom; $A_1$ is a carbon atom substituted by a methyl group; and $A_2$ is a carbon atom.

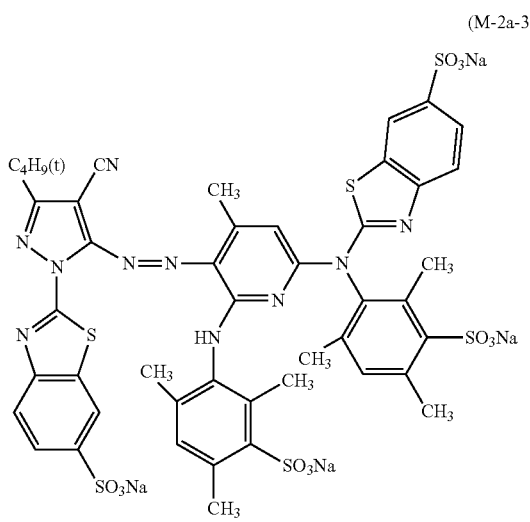

(M-2a-3)

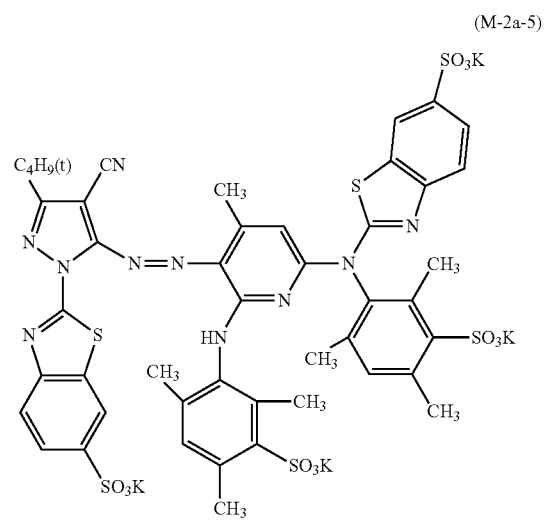

(M-2a-5)

The compound represented by the chemical formula (M-2a-3) is still another compound, wherein, in the general formula (M-2a), $R_{11}$ is a tert-butyl group; $R_{12}$ is a cyano group; $R_{13}$ and $R_{14}$ each are a 6-sodium sulfonate benzothiazole-2-yl group; $R_{15}$ and $R_{16}$ each are a 3-sodium sulfonate mesityl group; $R_{17}$ is a hydrogen atom; $A_1$ is a carbon atom substituted by a methyl group; and $A_2$ is a carbon atom.

The compound represented by the chemical formula (M-2a-5) is yet another compound, wherein, in the general formula (M-2a), $R_{11}$ is a tert-butyl group; $R_{12}$ is a cyano group; $R_{13}$ and $R_{14}$ each are a 6-potassium sulfonate benzothiazole-2-yl group; $R_{15}$ and $R_{16}$ each are a 3-potassium sulfonate mesityl group; $R_{17}$ is a hydrogen atom; $A_1$ is a carbon atom substituted by a methyl group; and $A_2$ is a carbon atom.

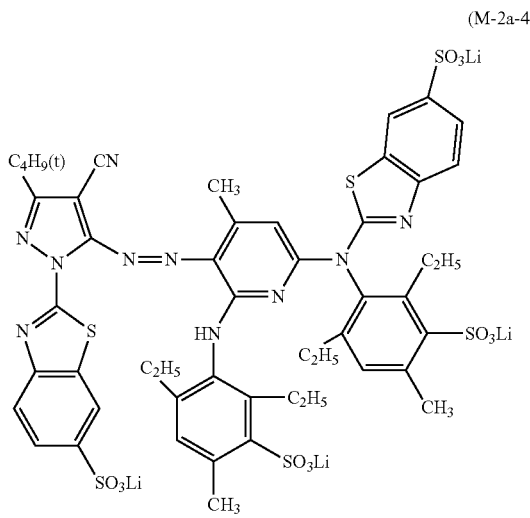

(M-2a-4)

(M-2a-6) [image on right]

The compound represented by the chemical formula (M-2a-4) is yet another compound, wherein, in the general formula (M-2a), $R_{11}$ is a tert-butyl group; $R_{12}$ is a cyano group; $R_{13}$ and $R_{14}$ each are a 6-lithium sulfonate benzothiazole-2-yl group; $R_{15}$ and $R_{16}$ each are a 2,6-diethyl-4-methyl-3-lithium sulfonate phenyl group, $R_{17}$ is a hydrogen atom; $A_1$ is a carbon atom substituted by a methyl group; and $A_2$ is a carbon atom.

The compound represented by the chemical formula (M-2a-6) is yet another compound, wherein, in the general formula (M-2a), $R_{11}$ is a tert-butyl group; $R_{12}$ is a cyano group; $R_{13}$ and $R_{14}$ each are a 6-lithium sulfonate benzothiazole-2-yl group; $R_{15}$ and $R_{16}$ each are a 2,6-diethyl-4-lithium sulfonate phenyl group; $R_{17}$ is a hydrogen atom; $A_1$ is a carbon atom substituted by a methyl group; and $A_2$ is a carbon atom.

The dye (M-2a) can be produced, for example, according to the following steps (A) to (C).

Step (A)

Aminopyrazole represented by the chemical formula (M-2a-a) is reacted with a diazotizating agent to form a diazonium salt. As the diazotizating agent, a dilute hydrochloric acid solution of sodium nitrite is preferable, and isopentyl nitrite, nitrosylsulfuric acid, and the like may also be employed.

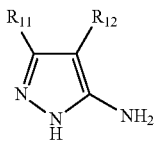

(M-2a-a)

Each of the substituents $R_{11}$ and $R_{12}$ in the chemical formula (M-2a-a) is the same as that described for the general formula (M-2a). The aminopyrazole represented by the chemical formula (M-2a-a) may be synthesized according to a method described in U.S. Pat. No. 3,336,285; "Heterocycles", 20, 519, (1983); Japanese Patent Publication No. 6 (1994)-19036 B; and the like.

Step (B)

Next, the diazonium salt formed in the step (A) is reacted with a pyridine-based coupling agent represented by the chemical formula (M-2a-b) to form a compound represented by the chemical formula (M-2a-c).

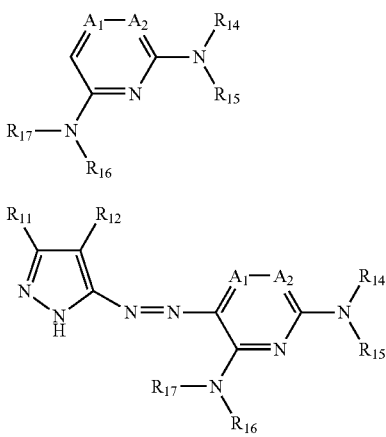

Each of the substituents $R_{14}$ to $R_{17}$ in the chemical formula (M-2a-b) and each of the substituents $R_{14}$ to $R_{17}$ in the chemical formula (M-2a-c) are the same as those described for the general formula (M-2a). The pyridine-based coupling agent represented by the chemical formula (M-2a-b) may be synthesized according to a method described in Japanese Patent Application Laid-open No. 51(1976)-83631, Japanese Patent Application Laid-open No. 49 (1974)-74718, Japanese Patent Publication No. 52 (1977)-46230, and the like.

Step (C)

The compound formed in the step (B) is reacted with an alkylating agent, an arylating agent or a heterylating agent in the presence of a base, and thereby the dye represented by the general formula (M-2a) is obtained. As the base employed in this step, an organic base such as diisopropylethylamine or the like; an inorganic base such as potassium carbonate, sodium carbonate, sodium hydrogen carbonate, potassium hydrogen carbonate, sodium hydroxide, potassium hydroxide, or the like; and the like can be employed. The alkylating agent is a compound represented by "R—X". Here, R is an optionally substituted alkyl group. X is a halogen atom or $OSO_2R'$, wherein R' is an alkyl group or an aryl group such as a phenyl group or the like. The arylating agent is a compound represented by "Ar—X". Here, Ar is a phenyl group substituted by an electron attractive group (preferably, substituted by a substituent having a total Hammett's σp value of 0.2 or more). The heterylating agent is a compound represented by "Het-X". Here, Het is a hetero ring, and examples thereof include a 2-pyridyl group, a 2-thienyl group, a 2-thiazolyl group, a 2-benzothiazolyl group, a triazyl group, a 2-furyl group, and the like.

In a case that the magenta dye (M-2) is the magenta dye (M-2a), ozone resistance, light resistance, and jetting stability can be improved by containing the magenta dye (M-1) in the water-based magenta ink, and color vividness or brightness, ozone resistance, and light resistance can be improved by containing the magenta dye (M-2) in the water-based magenta ink. The blending amount of the magenta dye (M-1) is not particularly limited, and is, for example, in the range of 0.1% by weight to 10% by weight, preferably in the range of 0.4% by weight to 3.6% by weight, and more preferably in the range of 0.8% by weight to 3.6% by weight, with respect to the entire amount of the water-based magenta ink. The blending amount of the magenta dye (M-2) is not particularly limited, and is, for example, in the range of 0.1% by weight to 10% by weight, preferably in the range of 0.5% by weight to 3.6% by weight, and more preferably in the range of 1.0% by weight to 3.2% by weight, with respect to the entire amount of the water-based magenta ink.

In a case that the magenta dye (M-2) is the magenta dye (M-2a), the weight ratio of the magenta dye (M-1) to the magenta dye (M-2) in the water-based magenta ink is preferably in the range of 70:30 to 10:90 (magenta dye (M-1): magenta dye (M-2)), and more preferably in the range of 60:40 to 20:80 (magenta dye (M-1):magenta dye (M-2)). By setting the weight ratio to be in the aforementioned range, color vividness or brightness and jetting stability can be further improved.

In the general formula (M-2b), the substituted or unsubstituted alkyl group of each of $R_{18}$, $R_{19}$, and $R_{20}$ is preferably an alkyl group having 1 to 9 carbon atoms in total. The substituted or unsubstituted alkyl group includes a methyl group, an ethyl group, a n-propyl group, an isopropyl group, a n-butyl group, a trifluoromethyl group, a dimethylaminomethyl group, and the like. The substituent of the substituted alkyl group includes a hydroxyl group; an alkoxy group such as a methoxy group, an ethoxy group, or the like; a cyano group; a halogen atom such as a fluorine atom, a chlorine atom, a bromine atom, an iodine atom, or the like; an ionic hydrophilic group such as a carboxylate, a sulfonate, or the like; and the like.

In the general formula (M-2b), the substituted or unsubstituted alkoxy group of each of $R_{18}$, $R_{19}$, and $R_{20}$ is preferably an alkoxy group having 1 to 9 carbon atoms in total. The substituted or unsubstituted alkoxy group includes a methoxy group, an isopropoxy group, a n-butoxy group, and the like.

In the general formula (M-2b), the halogen atom of $R_{18}$, $R_{19}$, and $R_{20}$ includes a fluorine atom, a chlorine atom, a bromine atom, an iodine atom, and the like.

In the general formula (M-2b), the substituted or unsubstituted carbamoyl group of $R_{18}$, $R_{19}$, and $R_{20}$ includes a carbamoyl group, an N,N-dimethylcarbamoyl group, a phenylcarbamoyl group, and the like.

In the general formula (M-2b), the substituted or unsubstituted sulfamoyl group of $R_{18}$, $R_{19}$, and $R_{20}$ includes a sulfamoyl group, an N-methylsulfamoyl group, an N-ethylsulfamoyl group, an N-ethyl-N-phenylsulfamoyl group, an N,N-dimethylsulfamoyl group, a p-carboxyphenylsulfamoyl group, and the like.

In the general formula (M-2b), the substituted or unsubstituted amino group of $R_{18}$, $R_{19}$, and $R_{20}$ includes an N-methylamino group, a carbamoylamino group, an N,N-diethylamino group, an acetylamino group, and the like.

In the general formula (M-2b), the sulfonate ester group of $R_{18}$, $R_{19}$, and $R_{20}$ includes a phenoxysulfonyl group and the like.

In the general formula (M-2b), the substituted or unsubstituted alkylsulfonyl group of $R_{18}$, $R_{19}$, and $R_{20}$ is preferably an alkylsulfonyl group having 1 to 9 carbon atoms in total. The substituted or unsubstituted alkylsulfonyl group includes a hydroxysulfonyl group and the like.

In the general formula (M-2b), the substituted or unsubstituted arylsulfonyl group of $R_{18}$, $R_{19}$, and $R_{20}$ is preferably an arylsulfonyl group having 6 to 15 carbon atoms in total. The substituted or unsubstituted arylsulfonyl group includes a benzylsulfonyl group and the like.

In the general formula (M-2b), the carboxylate ester group of $R_{18}$, $R_{19}$, and $R_{20}$ includes a methoxycarbonyl group and the like.

In the general formula (M-2b), the substituted or unsubstituted alkyl group of $R_{21}$, $R_{22}$, and $R_{23}$ is preferably an alkyl group having 1 to 18 carbon atoms in total. The substituted or unsubstituted alkyl group includes an ethyl group, a n-butyl group, a n-octyl group, an ethylhexyl group, a hydroxyethyl group, a carboxypropyl group, a carboxycyclohexylmethyl group, a 1-carboxy-2-mercaptoethyl group, a 1-carboxy-2-carbamoyl-ethyl group, a 1-isopropyl-1-carboxymethyl group, a 1,2-dicarboxypropyl group, and the like. The substituent of the substituted alkyl group includes a hydroxyl group; an alkoxy group such as a methoxy group, an ethoxy group, or the like; a cyano group; a halogen atom such as a fluorine atom, a chlorine atom, a bromine atom, an iodine atom, or the like; an ionic hydrophilic group such as a carboxylate, a sulfonate, or the like; and the like.

In the general formula (M-2b), the substituted or unsubstituted alkenyl group of $R_{21}$, $R_{22}$, and $R_{23}$ is preferably an alkenyl group having 2 to 18 carbon atoms in total. The substituted or unsubstituted alkenyl group includes a 2-methyl-1-propenyl group, a vinyl group, an allyl group, and the like.

In the general formula (M-2b), the substituted or unsubstituted aryl group of $R_{21}$, $R_{22}$, and $R_{23}$ includes a 3,4-dicarboxyphenyl group, a 4-butylphenyl group, a 4-carboxyphenyl group, and the like. The substituent of the substituted aryl group includes, for example, the substituents described for the substituted alkyl group.

In the general formula (M-2b), the substituted or unsubstituted aralkyl group of $R_{21}$, $R_{22}$, and $R_{23}$ includes a benzyl group, a 1-carboxy-2-phenyl-ethyl group, a 1-carboxy-2-hydroxyphenylethyl group, a 4-carboxybenzyl group, and the like.

In the general formula (M-2b), the substituted or unsubstituted alicyclic group of $R_{21}$, $R_{22}$, and $R_{23}$ includes a cyclohexyl group, a 4-carboxycyclohexyl group, and the like.

In the general formula (M-2b), the substituted or unsubstituted heterocyclic group of $R_{21}$, $R_{22}$, and $R_{23}$ includes a pyridyl group, a thiadiazolyl group, a benzothiazolyl group, a 2,2,6,6-tetramethylpiperidinyl group, and the like. The substituent of the substituted heterocyclic group includes, for example, the substituents described for the substituted alkyl group.

In the general formula (M-2b), at least one of $R_{21}$, $R_{22}$, and $R_{23}$ may be an alkyl group, an alkenyl group, an aryl group, an alicyclic group, an aralkyl group, or a heterocyclic group substituted by one to four carboxyl group(s) or sulfamoyl group(s).

In the general formula (M-2b), $R_{21}$ and $R_{22}$ may each be a hydrogen atom or a tri-substituted phenyl group, and may be identical to or different from each other. Here, three substituents of the tri-substituted phenyl group each are a hydrogen atom, a halogen atom, a hydroxyl group, a substituted or unsubstituted alkyl group having 1 to 9 carbon atoms in total, a substituted or unsubstituted alkoxy group having 1 to 9 carbon atoms in total, a substituted or unsubstituted carbamoyl group, a substituted or unsubstituted sulfamoyl group, a substituted or unsubstituted amino group, a nitro group, a sulfonate ester group, or a carboxylate ester group. The aforementioned three substituents may be identical to or different from each other.

A preferred magenta dye (M-2b) is, for example, a magenta dye (M-2b) wherein, in the general formula (M-2b), at least one of $R_{21}$, $R_{22}$, and $R_{23}$ is an alkyl group, an alkenyl group, an aryl group, an aralkyl group, or a cyclohexyl group substituted by one to four carboxyl group(s) or sulfamoyl group(s).

With respect to the magenta dye (M-2b), the number of sulfo groups, carboxyl groups, and/or these salts contained in its structure is preferably six or less in total, more preferably five or less in total, and much more preferably four or less in total. Furthermore, the magenta dye (M-2b) may be used in a free acid form. However, when the magenta dye (M-2b) is obtained in a salt form at the time of producing, it may be used without conversion or may be converted into a desired salt form. Moreover, with respect to the magenta dye (M-2b), a part of the acid groups may be in a salt form, and both a salt-form dye and a free acid-form dye may be present. Such a salt form includes salts of alkali metals such as Na, Li, K, and the like; salts of ammonium optionally substituted by an alkyl group or a hydroxyalkyl group; salts of organic amines; and the like. The organic amine includes a lower alkylamine, a hydroxy-substituted lower alkylamine, a carboxy-substituted lower alkylamine, a polyamine having 2 to 10 alkyleneimine units each having 2 to 4 carbon atoms, and the like. The number of the types of these salts used is not limited to 1, but a plurality of types of the salts may be present.

Another preferred magenta dye (M-2b) is, for example, a magenta dye (M-2b) wherein, in the general formula (M-2b), r is 0; $R_{18}$ is a carboxyl group, a carbamoyl group, a trifluoromethyl group, or a sulfamoyl group; $R_{19}$, $R_{20}$, and $R_{22}$ each are a hydrogen atom; $R_{21}$ is a phenyl group optionally substituted by a carboxyl group or a sulfamoyl group, or a carboxy alkyl group; and $R_{23}$ is a hydrogen atom or an alkyl group.

Preferred Examples of the magenta dye (M-2b) include compounds represented by the chemical formulae (M-2b-1) to (M-2b-5).

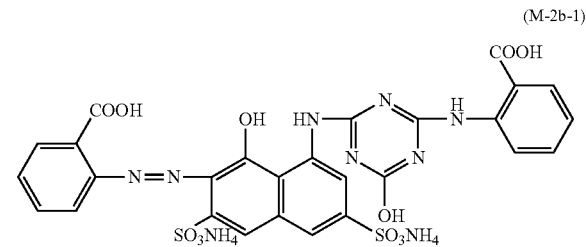

(M-2b-1)

The compound represented by the chemical formula (M-2b-1) is a compound, wherein, in the general formula (M-2b), r is 0; $R_{18}$ is a carboxyl group at the 2-position of a phenyl group bonded to an azo group; $R_{19}$, $R_{20}$ and $R_{22}$ each are a hydrogen atom; $R_{21}$ is a 2-carboxyphenyl group; and $R_{23}$ is a hydrogen atom. In the compound represented by the chemical formula (M-2b-1), sulfonic acids at the 3-position and 6-position of a naphthalene ring are ammonium salts.

(M-2b-2)

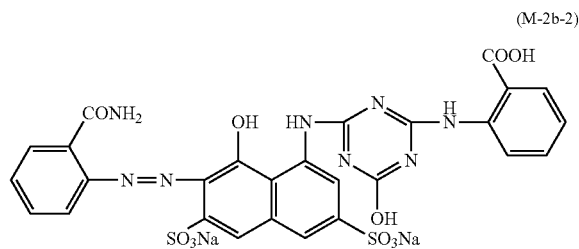

The compound represented by the chemical formula (M-2b-2) is another compound, wherein in the general formula (M-2b), r is 0; $R_{18}$ is a carbamoyl group at the 2-position of a phenyl group bonded to an azo group; $R_{19}$, $R_{20}$ and $R_{22}$ each are a hydrogen atom; $R_{21}$ is a 2-carboxyphenyl group; and $R_{23}$ is a hydrogen atom. In the compound represented by the chemical formula (M-2b-2), sulfonic acids at the 3-position and 6-position of a naphthalene ring are sodium salts.

(M-2b-3)

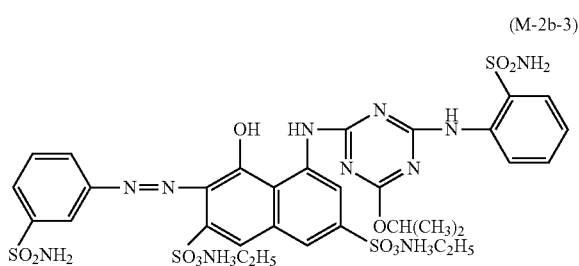

The compound represented by the chemical formula (M-2b-3) is still another compound, wherein, in the general formula (M-2b), r is 0; $R_{18}$ is a sulfamoyl group at the 3-position of a phenyl group bonded to an azo group; $R_{19}$, $R_{20}$ and $R_{22}$ each are a hydrogen atom; $R_{21}$ is a 2-sulfamoylphenyl group; and $R_{23}$ is an isopropyl group. In the compound represented by the chemical formula (M-2b-3), sulfonic acids at the 3-position and 6-position of a naphthalene ring are ethylammonium salts.

(M-2b-4)

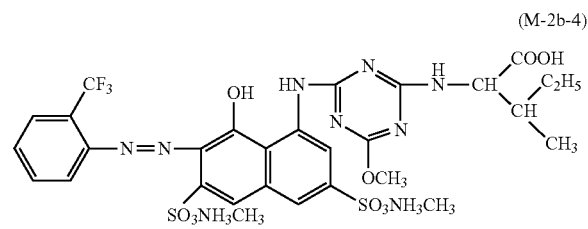

The compound represented by the chemical formula (M-2b-4) is yet another compound, wherein, in the general formula (M-2b), r is 0; $R_{18}$ is a trifluoromethyl group at the 2-position of a phenyl group bonded to an azo group; $R_{19}$, $R_{20}$ and $R_{22}$ each are a hydrogen atom; $R_{21}$ is a 1-carboxy-2-methylbutyl group; and $R_{23}$ is a methyl group. In the compound represented by the chemical formula (M-2b-4), sulfonic acids at the 3-position and 6-position of a naphthalene ring are methylammonium salts.

(M-2b-5)

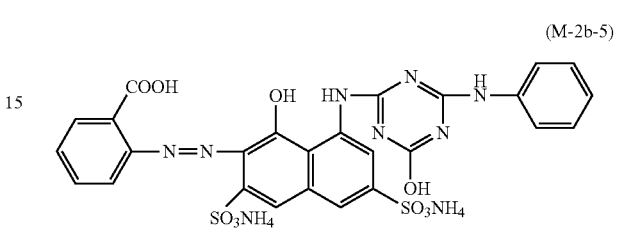

The compound represented by the chemical formula (M-2b-5) is yet another compound, wherein, in the general formula (M-2b), r is 0; $R_{18}$ is a carboxyl group at the 2-position of a phenyl group bonded to an azo group; $R_{19}$, $R_{20}$ and $R_{22}$ each are a hydrogen atom; $R_{21}$ is a phenyl group; and $R_{23}$ is a hydrogen atom. In the compound represented by the chemical formula (M-2b-5), sulfonic acids at the 3-position and 6-position of a naphthalene ring are ammonium salts.

The dye (M-2b) represented by the general formula (M-2b) can be produced according to a conventionally known method. For example, the dye represented by the general formula (M-2b) can be produced according to the following steps (A) to (C).

Step (A)

A monoazo compound is produced from 2-aminobenzoic acid (anthranilic acid) and 1-amino-8-hydroxy-3,6-naphthalenedisulfonic acid (H acid) according to a routine method (see, for example, Yutaka Hosoda, SHIN SENRYO KAGAKU (New Dye Chemistry), pp. 396 to 409, published by Gihodo (Dec. 21, 1973)) through diazotization and coupling reaction.

Step (B)

Next, the resultant monoazo compound is added to a cyanuric chloride suspension and allowed to react for several hours. At this time, the reaction mixture is maintained under conditions in which the pH is from 4 to 6 and the temperature is from 0° C. to 5° C. Subsequent to this reaction, an aqueous solution of 2-aminobenzoic acid (anthranilic acid) is added to the reaction mixture at room temperature in order to prevent the reaction mixture from becoming alkaline, and the reaction mixture is subjected to a condensation reaction for several hours. Subsequently, an aqueous solution of sodium hydroxide of 25% is added to the reaction mixture at a temperature from 50° C. to 60° C. to make the reaction mixture strong alkaline, thereby effecting a hydrolysis reaction. Thus, the reaction is completed.

Step (C)

After completion of the reaction, the reaction mixture is cooled and is subjected to salting out with sodium chloride, and thereby the dye (M-2b) is obtained.

C.I. Acid Red 1 is a dye represented by the structural formula (M-2c).

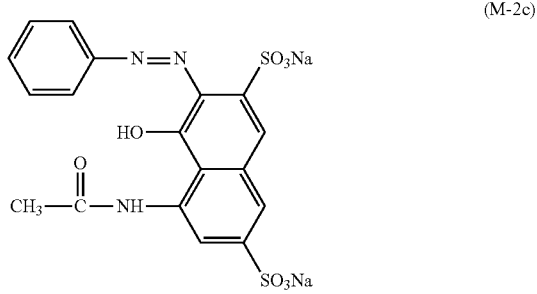

(M-2c)

In a case that the magenta dye (M-2) is at least one dye selected from the group consisting of the magenta dye (M-2b), C.I. Acid Red 1, and C.I. Acid Red 254, ozone resistance and light resistance can be improved by containing the magenta dye (M-1) in the water-based magenta ink, and color vividness or brightness can be improved by containing the magenta dye (M-2) in the water-based magenta ink. The blending amount of the magenta dye (M-1) is not particularly limited, and is, for example, in the range of 0.1% by weight to 10% by weight, preferably in the range of 2.4% by weight to 3.6% by weight, with respect to the entire amount of the water-based magenta ink. The blending amount of the magenta dye (M-2) is not particularly limited, and is, for example, in the range of 0.05% by weight to 5% by weight, preferably in the range of 0.4% by weight to 1.6% by weight with respect to the entire amount of the water-based magenta ink.

In a case that the magenta dye (M-2) is at least one dye selected from the group consisting of the magenta dye (M-2b), C.I. Acid Red 1, and C.I. Acid Red 254, the weight ratio of the magenta dye (M-1) to the magenta dye (M-2) in the water-based magenta ink is preferably in the range of 60:40 to 90:10 (magenta dye (M-1):magenta dye (M-2)), and more preferably in the range of 70:30 to 90:10 (magenta dye (M-1):magenta dye (M-2)). By setting the weight ratio to be in the aforementioned range, color vividness or brightness, ozone resistance, and light resistance can be further improved.

The entire blending amount of the magenta dye (M-1) and the magenta dye (M-2) is not particularly limited, and is preferably in the range of 2% by weight to 6% by weight with respect to the entire amount of the water-based magenta ink.

By setting the entire blending amount to be in the aforementioned range, color vividness or brightness, ozone resistance, light resistance, jetting stability, and storing stability can be further improved, and bleeding between the magenta ink and other inks can be further suppressed.

The magenta colorant may further contain, for example, other dyes and pigments, besides the magenta dye (M-1) and the magenta dye (M-2).

The water and the blending amount of the water are the same as those described for the water-based yellow ink.

The water-soluble organic solvent and the blending amount of the water-soluble organic solvent are also the same as those described for the water-based yellow ink.

The water-based magenta ink may further contain a conventionally known additive as required. The additive is also the same as that described for the water-based yellow ink.

The water-based magenta ink can be prepared, for example, by uniformly mixing a magenta colorant, water, a water-soluble organic solvent with other addition components as required by a conventionally known method, and then removing sediments with a filter etc.

(Water-Based Cyan Ink)

As mentioned above, the water-based cyan ink contains a cyan colorant, water, and a water-soluble organic solvent. The cyan colorant contains the cyan dye (C-1). By containing the cyan dye (C-1) in the water-based cyan ink, it is possible to obtain the water-based cyan ink having superior color vividness or brightness, superior ozone resistance, superior light resistance, and superior jetting stability.

As mentioned above, the cyan dye (C-1) is a dye represented by the general formula (C-1).

A compound represented by the general formula (C-1) may be a compound in which all of rings $A_{31}$, $A_{32}$, and $A_{33}$ are 2,3-pyridine rings or 3,2-pyridine rings; a compound in which two of the same are 2,3-pyridine rings or 3,2-pyridine rings and the other one is a benzene ring; or a compound in which one of the same is a 2,3-pyridine ring or a 3,2-pyridine ring and the other two are benzene rings. The cyan dye (C-1) may be composed of one of the aforementioned compounds or may be a mixture containing two or more of them.

Preferred Examples of the cyan dye (C-1) include compounds represented by the chemical formulae (C-1a) to (C-1f).

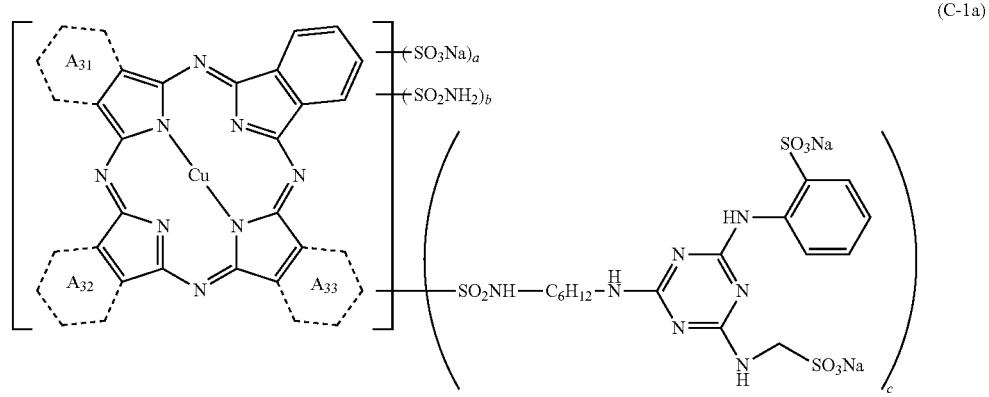

(C-1a)

In the chemical formula (C-1a), rings $A_{31}$, $A_{32}$, and $A_{33}$ each independently represent a 2,3-pyridine ring or a 3,2-pyridine ring; a is 1.0; b is 1.8; c is 1.2; and a, b, and c are average values in a mixture.

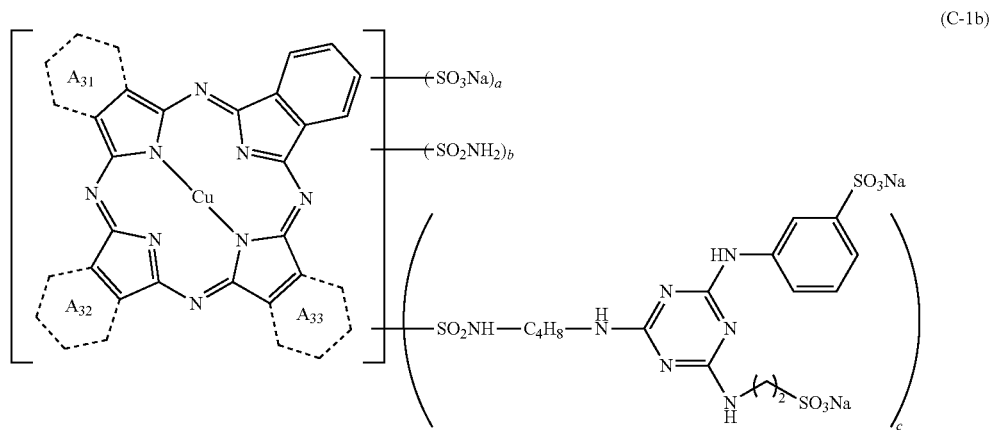

(C-1b)

In the chemical formula (C-1b), rings $A_{31}$ and $A_{32}$ each independently represent a 2,3-pyridine ring or a 3,2-pyridine ring; a ring $A_{33}$ represents a benzene ring; a is 2.4; b is 0.6; c is 1.0; and a, b, and c are average values in a mixture.

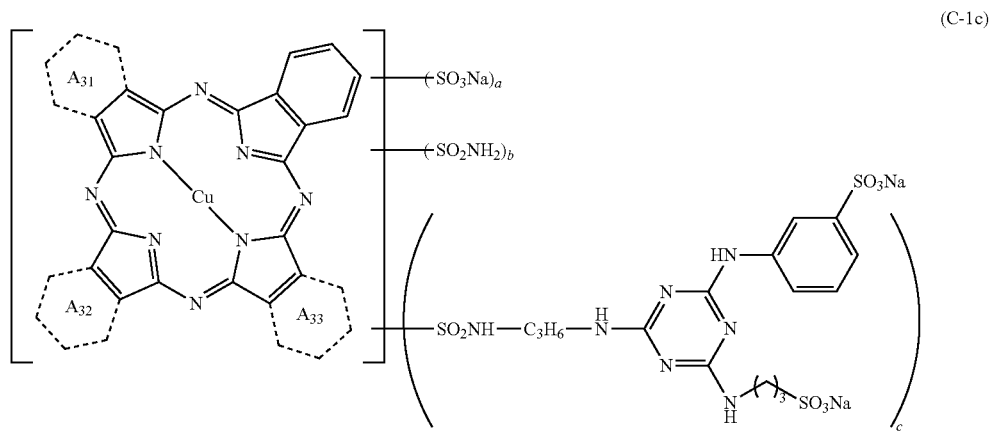

(C-1c)

In the chemical formula (C-1c), rings $A_{31}$, $A_{32}$, and $A_{33}$ each independently represent a 2,3-pyridine ring or a 3,2-pyridine ring; a is 3.0; b is 0.2; c is 0.8; and a, b, and c are average values in a mixture.

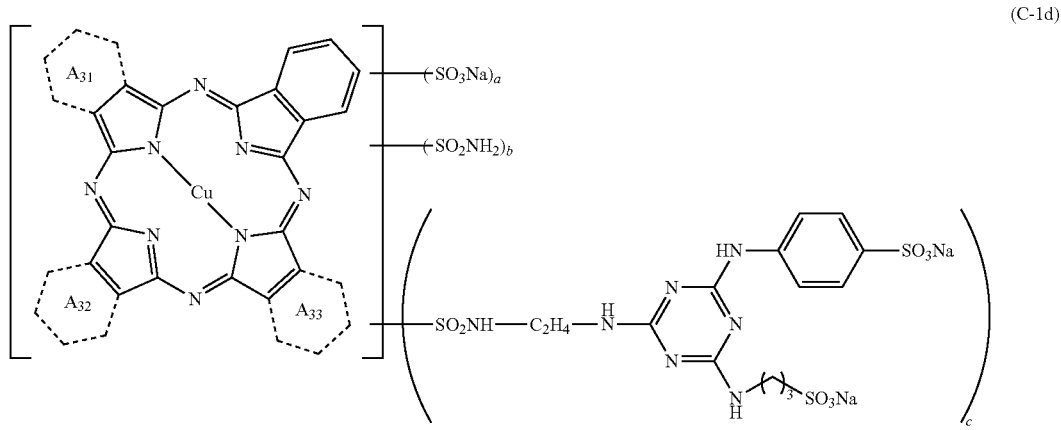
(C-1d)

In the chemical formula (C-1d), a ring $A_{31}$ represents a benzene ring; rings $A_{32}$ and $A_{33}$ each independently represent a 2,3-pyridine ring or a 3,2-pyridine ring; a is 1.8; b is 0.9; c is 1.3; and a, b, and c are average values in a mixture.

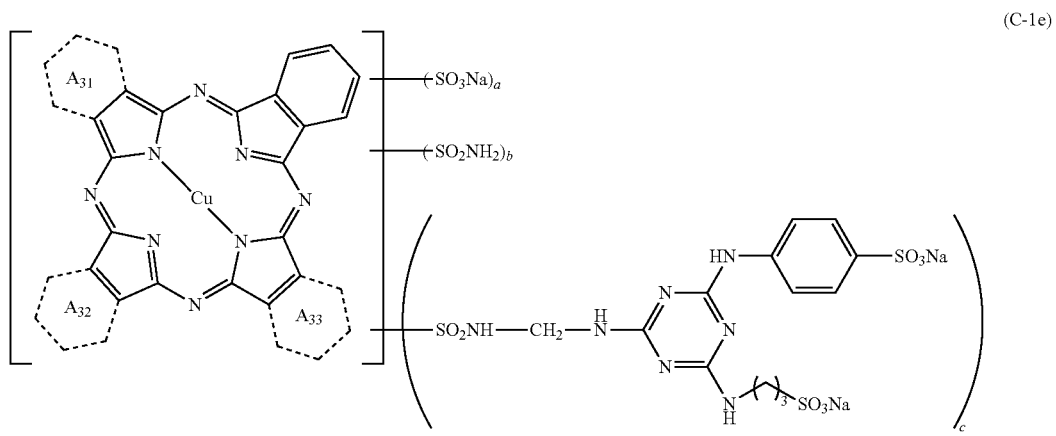
(C-1e)

In the chemical formula (C-1e), rings $A_{31}$, $A_{32}$, and $A_{33}$ each independently represent a 2,3-pyridine ring or a 3,2-pyridine ring; a is 1.1; b is 1.3; c is 1.6; and a, b, and c are average values in a mixture.

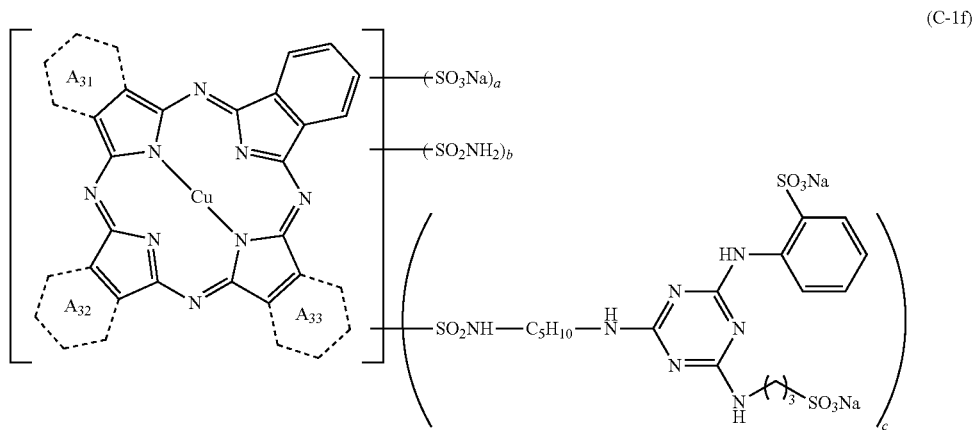
(C-1f)

In the chemical formula (C-1f), rings $A_{31}$ and $A_{33}$ each independently represent a 2,3-pyridine ring or a 3,2-pyridine ring; a ring $A_{32}$ represents a benzene ring; a is 0; b is 1.8; c is 2.2; and a, b, and c are average values in a mixture.

The dye (C-1) can be produced according to a conventionally known method. An example of the method for producing the dye (C-1) is as follows.

That is, first, a copper porphyrazine compound represented by the structural formula (C-1-a) is synthesized. The copper porphyrazine compound represented by the structural formula (C-1-a) is obtained, for example, by reaction of a nitrogen-containing heteroaromatic ring (at least one of a 2,3-pyridine ring and a 3,2-pyridine ring) dicarboxylic acid derivative and a phthalic acid derivative in the presence of a catalyst and a copper compound. By changing the molar ratio in the reaction of the nitrogen-containing heteroaromatic ring dicarboxylic acid derivative and the phthalic acid derivative, it is possible to adjust the number of nitrogen-containing heteroaromatic rings and the number of benzene rings in $A_1$, $A_2$, and $A_3$. As the nitrogen-containing heteroaromatic ring dicarboxylic acid derivative, for example, a 6-membered nitrogen-containing heteroaromatic ring dicarboxylic acid derivative having, at adjacent two positions, carboxyl groups or reactive groups derived therefrom (an acid amide group, an imide group, an acid anhydride group, a carbonitrile group, and the like) is used. The method for synthesizing the copper porphyrazine compound includes, for example, conventionally known methods such as the nitrile method, the Wyler method.

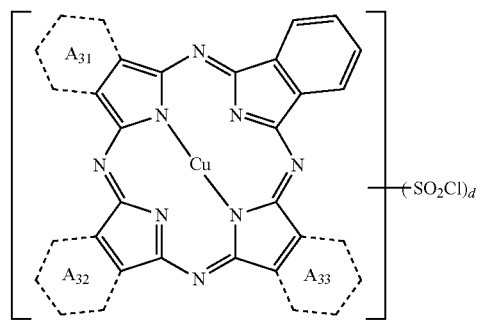

(C-1-b)

Next, the dye (C-1) is obtained by reaction of the obtained copper chlorosulfonylporphyrazine compound and organic amine represented by the structural formula (C-1-c) in the presence of an aminating agent (ammonia or an ammonia generating compound) in an aqueous solvent under reaction conditions in which the pH is from about 8 to about 10, the temperature is from about 5° C. to about 70° C., and the reaction time is from about 1 hour to about 20 hours. As the aminating agent, ammonia or a compound that generates ammonia at the time of the reaction (ammonia generating compound) may be used. The aminating agent includes ammonium salts such as ammonium chloride, ammonium sulfate, and the like; urea; ammonia water; ammonia gas; and the like. In the organic amine represented by the structural formula (C-1-c), X and Y each represent a hydrogen atom or sodium. X and Y each may be ionized in the aqueous solvent to become ions ($H^+$ or $Na^+$). The organic amine can be produced by a conventionally known method.

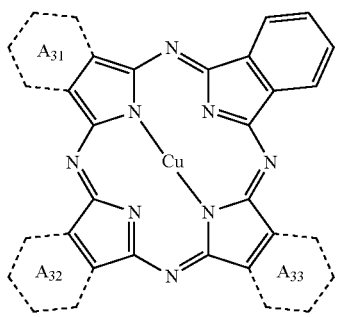

(C-1-a)

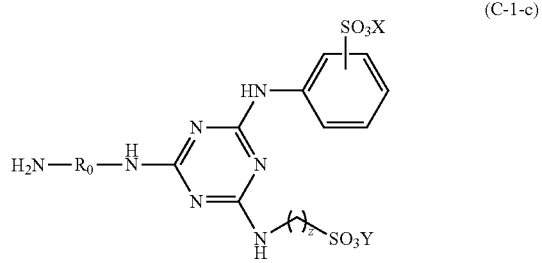

(C-1-c)

The obtained dye (C-1) can be separated by filtration or the like after aciding out or salting out. Salting out is preferably carried out, for example, under acidic to alkali conditions, and more preferably at a pH from 1 to 11. The temperature in salting out is not particularly limited. However, the temperature in salting out is, for example, 40° C. to 80° C., preferably 50° C. to 70° C.

The dye (C-1) synthesized in the manner described above is obtained in a free acid form or a salt form thereof. The free acid form is obtained, for example, by aciding out. The salt form is obtained, for example, by salting out or by applying a typical salt exchange method of adding a desired organic or inorganic base to the free acid form.

Next, a copper chlorosulfonylporphyrazine compound represented by the structural formula (C-1-b) is obtained, for example, by chlorosulfonation of the copper porphyrazine compound represented by the structural formula (C-1-a) in chlorosulfonic acid or by sulfonation of the copper porphyrazine compound represented by the structural formula (C-1-a) in sulfuric acid or fuming sulfuric acid followed by conversion of the sulfo group into a chlorosulfone group with a chlorinating agent.

The cyan colorant may be composed of only the cyan dye (C-1), or may further contain, for example, other dyes and pigments besides the cyan dye (C-1). The other dyes include, for example, the following cyan dye (C-2).

Cyan dye (C-2): at least one dye selected from the group consisting of dyes represented by the general formula (C-2a), dyes represented by the general formula (C-2b), C.I. Direct Blue 199, and C.I. Direct Blue 86

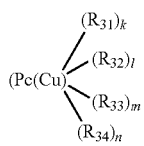
(C-2a)

In the general formula (C-2a),
Pc (Cu) represents a copper phthalocyanine nucleus represented by the general formula (Pc);
$R_{31}$, $R_{32}$, $R_{33}$, and $R_{34}$ each represent a substituent selected from the group consisting of a $-SO_2R_a$, a $-SO_2NR_bR_c$, and a $-CO_2R_a$; $R_{31}$, $R_{32}$, $R_{33}$, and $R_{34}$ are not all identical to each other; at least one of $R_{31}$, $R_{32}$, $R_{33}$, and $R_{34}$ has an ionic hydrophilic group as a substituent; at least one of $R_{31}$, $R_{32}$, $R_{33}$, and $R_{34}$ is present on any of four benzene rings A, B, C, and D of the copper phthalocyanine nucleus represented by the general formula (Pc); $R_a$ represents a substituted or unsubstituted alkyl group; $R_b$ represents a hydrogen atom or a substituted or unsubstituted alkyl group; $R_c$ represents a substituted or unsubstituted alkyl group;
k satisfies $0<k<8$; l satisfies $0<l<8$; m satisfies $0\le m<8$; n satisfies $0\le n<8$; and k, l, m, and n satisfy $4\le k+l+m+n\le 8$.

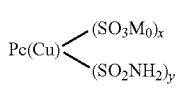
(C-2b)

In the general formula (C-2b),
Pc (Cu) represents a copper phthalocyanine nucleus represented by the following general formula (Pc);
$M_0$ represents any of lithium, sodium, potassium, and ammonium;
x satisfies $0<x<4$; y satisfies $0<y<4$; x and y satisfy $2\le x+y\le 5$; and
a $-SO_3M_0$ and a $-SO_2NH_2$ are present on any of four benzene rings A, B, C, and D of the copper phthalocyanine nucleus represented by the general formula (Pc).

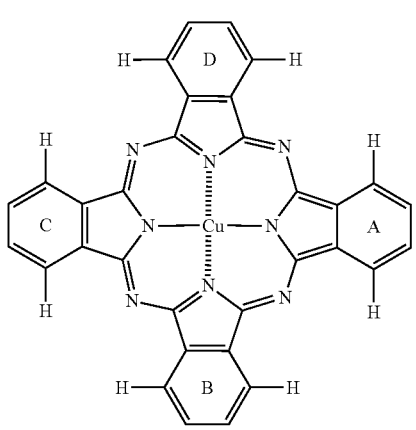
(Pc)

In the general formula (C-2a), the substituted or unsubstituted alkyl group is preferably a straight chain, branched chain or alicyclic alkyl group having 1 to 12 carbon atoms. The alkyl group is preferably the one having a branched chain, and especially preferably the one having an asymmetric carbon atom (in the form of a racemic body) from the view point of improving the solubility of the dye and the stability of the water-based cyan ink. The substituted or unsubstituted alkyl group includes a methyl group, an ethyl group, a n-butyl group, an isopropyl group, a tert-butyl group, a hydroxyethyl group, a methoxyethyl group, a cyanoethyl group, a trifluoromethyl group, a 3-sulfopropyl group, a 4-sulfobutyl group, and the like.

In the general formula (C-2a), a substituent of the substituted alkyl group includes a straight chain or branched chain alkyl group having 1 to 12 carbon atoms, such as a methyl group, an ethyl group, a propyl group, an isopropyl group, a sec-butyl group, a tert-butyl group, a 2-ethylhexyl group, a 2-methylsulfonyl ethyl group, a 3-phenoxy propyl group, a trifluoromethyl group, a cyclopentyl group, or the like; a straight chain or branched chain aralkyl group having 7 to 18 carbon atoms; a straight chain or branched chain alkenyl group having 2 to 12 carbon atoms; a straight chain or branched chain alkynyl group having 2 to 12 carbon atoms; a straight chain or branched chain cycloalkyl group having 3 to 12 carbon atoms; a straight chain or branched chain cycloalkenyl group having 3 to 12 carbon atoms; a halogen atom such as a chlorine atom, a bromine atom, or the like; an aryl group such as a phenyl group, a 4-tert-butylphenyl group, a 2,4-di-tert-aminophenyl group, or the like; a heterocyclic group such as an imidazolyl group, a pyrazolyl group, a triazolyl group, a 2-furil group, a 2-thienyl group, a 2-pyrimidinyl group, a 2-benzothiazolyl group, or the like; a cyano group; a hydroxyl group; a nitro group; a carboxyl group; an amino group; an alkoxy group such as a methoxy group, an ethoxy group, a 2-methoxyethoxy group, a 2-methanesulfonylethoxy group, or the like; an aryloxy group such as a phenoxy group, a 2-methylphenoxy group, a 4-tert-butylphenoxy group, a 3-nitrophenoxy group, a 3-tert-butoxycarbamoylphenoxy group, a 3-methoxycarbamoyl group, or the like; an acylamino group such as an acetamide group, a benzamide group, a 4-(3-tert-butyl-4-hydroxyphenoxy)butanamide group, or the like; an alkylamino group such as a methylamino group, a butylamino group, a diethylamino group, a methylbutylamino group, or the like; an anilino group such as a phenylamino group, a 2-chloroanilino group, or the like; an ureide group such as a phenylureide group, a methylureide group, an N,N-dibutylureide group, or the like; a sulfamoylamino group such as an N,N-dipropylsulfamoylamino group or the like; an alkylthio group such as a methylthio group, an octylthio group, a 2-phenoxyethylthio group, or the like; an arylthio group such as a phenylthio group, a 2-butoxy-5-tert-octylphenylthio group, a 2-carboxyphenylthio group, or the like; an alkoxycarbonylamino group such as a methoxycarbonylamino group or the like; a sulfonamide group such as a methanesulfonamide group, a benzenesulfonamide group, a p-toluenesulfonamide group, or the like; a carbamoyl group such as an N-ethylcarbamoyl group, an N,N-dibutylcarbamoyl group, or the like; a sulfamoyl group such as an N-ethylsulfamoyl group, an N,N-dipropylsulfamoyl group, an N-phenylsulfamoyl group or the like; a sulfonyl group such as a methanesulfonyl group, an octanesulfonyl group, a benzenesulfonyl group, a toluenesulfonyl group, or the like; an alkoxycarbonyl group such as a methoxycarbonyl group, a butoxycarbonyl group, or the like; a heterocyclic oxy group such as a 1-phenyltetrazole-5-oxy group, a 2-tetrahydroxypyranyloxy group, or the like; an azo group such as a phenylazo group, a 4-methoxyphenylazo group, a 4-pivaloylaminophenylazo group, a 2-hydroxy-4-propanoylphenylazo group, or the like; an acyloxy group such as an acetoxy group or the like; a carbamoyloxy group such as an N-methylcarbamoyloxy group, an N-phenylcarbamoyloxy group, or the like; a silyloxy group such as a trimethylsilyloxy group, a dibutylmethylsilyloxy group, or the like; an aryloxycarbonylamino group such as a phenoxycarbonylamino group or the like; an imide group such as an N-succinimide group, an N-phthalimide group, or the like; a heterocyclic thio group such as a 2-benzothiazolylthio group, a 2,4-diphenoxy-1,3,5-triazole-6-thio group, a 2-pyridylthio group, or the like; a sulfinyl group such as a 3-phenoxypropylsulfinyl group or the like; a phosphonyl group such as a phenoxyphosphonyl group, an octyloxyphosphonyl group, a phenylphosphonyl group, or the like; an aryloxycarbonyl group such as a phenoxycarbonyl group or the like; an acyl group such as an acetyl group, a 3-phenylpropanoyl group, a benzoyl group, or the like; an ionic hydrophilic group such as a carboxyl group, a sulfo group, a phosphono group, a quaternary ammonium group, or the like; and the like. The alkyl group, the aralkyl group, the alkenyl group, the alkynyl group, the cycloalkyl group, and the cycloalkenyl group as the substituent of the substituted alkyl group are preferably those having a branched chain, especially preferably those having an asymmetric carbon atom, from the view point of improving the solubility of the dye and the stability of the water-based cyan ink.

A preferred cyan dye (C-2a) is, for example, a cyan dye (C-2a) wherein, in the general formula (C-2a), $R_{31}$, $R_{32}$, $R_{33}$, and $R_{34}$ each represent a —$SO_2R_a$; the respective $R_a$s in $R_{31}$, $R_{32}$, $R_{33}$, and $R_{34}$ are not all identical; and at least one of the $R_a$s is a substituted alkyl group having an ionic hydrophilic group.

A more preferred cyan dye (C-2a) is, for example, a cyan dye (C-2a) wherein, in the general formula (C-2a), k satisfies $0<k<4$, l satisfies $0<l<4$, m satisfies $0\leq m<4$, n satisfies $0\leq n<4$, and k, l, m, and n satisfy $k+l+m+n=4$.

Preferred examples of the cyan dye (C-2a) include compounds represented by the chemical formulae (C-2a-1) to (C-2a-5).

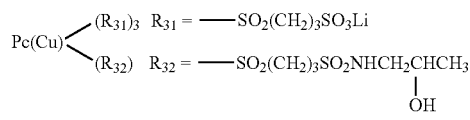
(C-2a-1)

The compound represented by the chemical formula (C-2a-1) is a compound, wherein, in the general formula (C-2a), $R_{31}$ is a lithium sulfonato propylsulfonyl group, $R_{32}$ is an N-(2-hydroxypropyl)sulfamoylpropylsulfonyl group, k is 3, l is 1, and m and n are both 0.

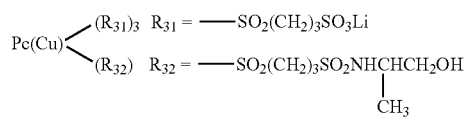
(C-2a-2)

The compound represented by the chemical formula (C-2a-2) is another compound, wherein, in the general formula (C-2a), $R_{31}$ is a lithium sulfonato propylsulfonyl group, $R_{32}$ is an N-(2-hydroxyisopropyl)sulfamoylpropylsulfonyl group, k is 3, l is 1, and m and n are both 0.

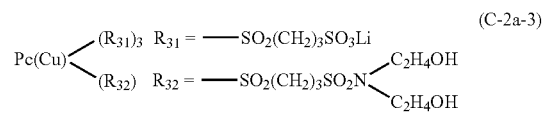
(C-2a-3)

The compound represented by the chemical formula (C-2a-3) is still another compound, wherein, in the general formula (C-2a), $R_{31}$ is a lithium sulfonato propylsulfonyl group, $R_{32}$ is an N,N-(di(2-hydroxyethyl))sulfamoylpropylsulfonyl group, k is 3, l is 1, and m and n are both 0.

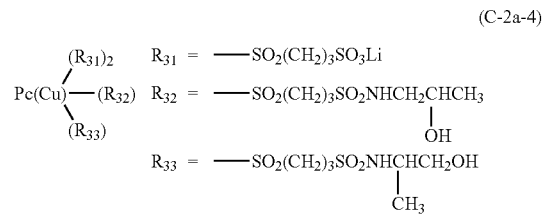
(C-2a-4)

The compound represented by the chemical formula (C-2a-4) is yet another compound, wherein, in the general formula (C-2a), $R_{31}$ is a lithium sulfonato propylsulfonyl group, $R_{32}$ is an N-(2-hydroxypropyl)sulfamoylpropylsulfonyl group, $R_{33}$ is an N-(2-hydroxyisopropyl)sulfamoylpropylsulfonyl group, k is 2, l is 1, m is 1, and n is 0.

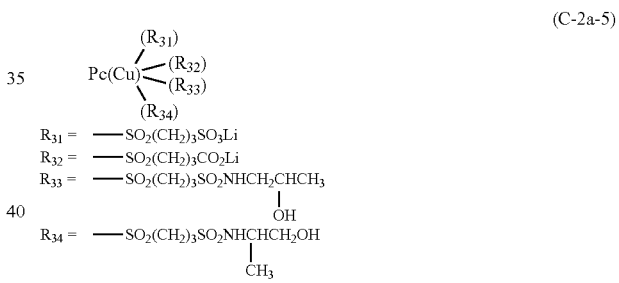
(C-2a-5)

The compound represented by the chemical formula (C-2a-5) is yet another compound, wherein, in the general formula (C-2a), $R_{31}$ is a lithium sulfonato propylsulfonyl group, $R_{32}$ is a lithium carboxylate propylsulfonyl group, $R_{33}$ is an N-(2-hydroxypropyl)sulfamoylpropylsulfonyl group, $R_{34}$ is an N-(2-hydroxyisopropyl)sulfamoylpropylsulfonyl group, and k, l, m, and n are all 1.

Next, a method for producing the dye (C-2a) will be explained. Generally, as described in Published Japanese Translation of PCT International Publication for Patent Application No. 2002-526589 (WO00/17275) etc., when an unsubstituted phthalocyanine compound is sulfonated, a sulfo group can be relatively easily introduced to its phthalocyanine nucleus by sulfonation. In a case that the sulfonated phthalocyanine compound is used as a water-soluble dye, for example, by salt-forming the sulfo group with an alkali metal hydroxide such as a sodium hydroxide, the resulting solfonate may be used as a dye as it is. In this case, there is a possibility that sulfonation occurs at any position of the phthalocyanine nucleus, in addition, the control of the number of sulfo groups to be introduced is difficult. Accordingly, when the sulfonation is carried out under reaction conditions in which the position and number of introduced sulfo groups are not taken into account but only the ease of sulfonation is taken into account, the position and number of the sulfo groups introduced into the product are difficult to identify, and a mixture of compounds different in the number and position of the substituents may be obtained. Therefore, in order to improve the ozone resistance of the dye (C-2a), it is necessary that an ozone resistance-inferior product is prevented from being mixed. Thus, it is necessary to introduce a specific substituent to a phthalic acid derivative in advance and to synthesize copper phthalocyanine from the obtained substituted phthalic acid derivative and a copper derivative such as CuCl$_2$ or the like. A method for synthesizing copper phthalocyanine from a phthalic acid derivative and a copper derivative is described, for example, in Japanese Patent Application Laid-open No. 2000-303009.

The method for producing the dye (C-2a) is, for example, as follows. It is to be noted that the substituted phthalic acid derivative can be produced, for example, by the following reaction scheme.

As a phthalic acid derivative serving as a raw material, for example, substituted phthalonitrile, substituted diiminoisoindoline, substituted phthalic diamide, substituted phthalimide, substituted phthalic acid and salt thereof, substituted phthalic anhydride, and the like can be employed.

A substituent of the substituted phthalic acid derivative is a soluble group or its precursor. The soluble group is a substituent that imparts solubility to a copper phthalocyanine dye. When a soluble group imparts water solubility to a copper phthalocyanine dye, the soluble group is a hydrophilic group. The hydrophilic group includes, for example, an ionic hydrophilic group or a substituent substituted by an ionic hydrophilic group. The precursor of the soluble group is a substituent that is capable of being converted into a soluble group through a reaction after a phthalocyanine ring is formed. As a substituent of the substituted phthalic acid derivative, a substituent selected from the group consisting of —SO$_2$R$_a$, —SO$_2$NR$_b$R$_c$, and —CO$_2$R$_a$ is preferable. R$_a$ represents a substituted or unsubstituted alkyl group, R$_b$ represents a hydrogen atom or a substituted or unsubstituted alkyl group, and R$_c$ represents a substituted or unsubstituted alkyl group.

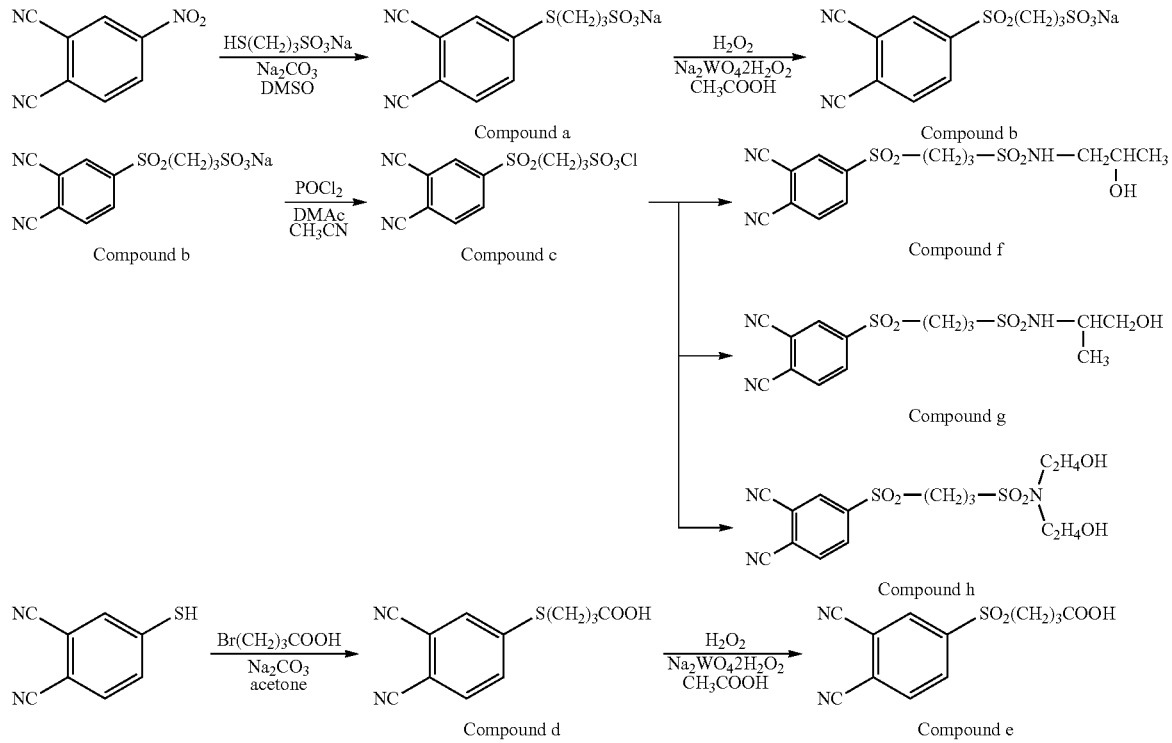

Next, the phthalic acid derivatives typified by the aforementioned compounds a to h and a copper derivative such as CuCl$_2$ or the like are mixed at a molar ratio (copper derivative: phthalic acid derivative) of 3:1 to 6:1, and reacted at a temperature in the range from 80° C. to 300° C. in the presence of an organic solvent having the boiling point of 80° C. or higher, preferably 130° C. or higher. By setting the reaction temperature in the aforementioned range, extreme slow down of a reaction speed and decomposition of the phthalocyanine dye to be obtained are prevented. The time for the reaction is preferably 2 hours to 20 hours. By setting the reaction time in the aforementioned range, large amount of materials are prevented from being unreacted and the phthalocyanine dye is prevented from being decomposed. The reaction can be carried out in the presence of a catalyst such as 1,8-diazabicyclo [5.4.0]-7-undecene (DBU), ammonium molybdate, or the like. Then, an ion-exchange is carried out, for example, according to the following method: the original cation is removed through dialysis; and then a monovalent metal cation is added (for example, an alkali metal hydroxide is added). After completion of the reaction, the reaction product is treated according to an ordinary aftertreatment for an organic synthesis reaction, thereby the dye (C-2a) having higher ozone resistance is obtained.

In the general formula (C-2b), the M$_0$ may be ionized in a water-based cyan ink to become an ion (any of Li$^+$, Na$^+$, K$^+$, and NH$_4^+$). With respect to the water-based cyan ink, in the general formula (C-2b), x and y may satisfy x+y=4.

Preferred examples of the cyan dye (C-2b) include compounds represented by the chemical formulae (C-2b-1) to (C-2b-4).

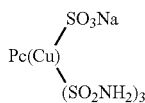
(C-2b-1)

The compound represented by the chemical formula (C-2b-1) is a compound, wherein, in the general formula (C-2b), $M_0$ is sodium, x is 1, y is 3, and a substituent is present on each of the four benzene rings A, B, C, and D of the copper phthalocyanine nucleus represented by the general formula (Pc).

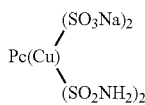
(C-2b-2)

The compound represented by the chemical formula (C-2b-2) is another compound, wherein, in the general formula (C-2b), $M_0$ is sodium, x is 2, y is 2, and a substituent is present on each of the four benzene rings A, B, C, and D of the copper phthalocyanine nucleus represented by the general formula (Pc).

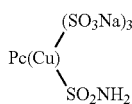
(C-2b-3)

The compound represented by the chemical formula (C-2b-3) is still another compound, wherein, in the general formula (C-2b), $M_0$ is sodium, x is 3, y is 1, and a substituent is present on each of the four benzene rings A, B, C, and D of the copper phthalocyanine nucleus represented by the general formula (Pc).

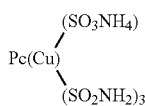
(C-2b-4)

The cyan dye (C-2b) can be produced, for example, by a conventionally known copper phthalocyanine substitution method having, for example, the following steps (A) to (C).
Step (A)
First, a copper phthalocyanine compound is chlorosulfonated with a chlorosulfonating agent. The chlorosulfonating agent includes a mixture of a chlorosulfonic acid and a chlorinating agent (phosphorous oxychloride or phosphorous trichloride); and the like. The molar ratio of the chlorosulfonic acid to the copper phthalocyanine compound (chlorosulfonic acid:copper phthalocyanine compound) is preferably 5:1 to 200:1. The molar ratio of the chlorinating agent to the copper phthalocyanine compound (chlorinating agent:copper phthalocyanine compound) is preferably 0.5:1 to 10:1.

This chlorosulfonation reaction is carried out, for example, at a temperature from 90° C. to 180° C. for 0.5 hours to 16 hours. Generally, the reaction time for the chlorosulfonation depends on the reaction temperature. The reaction time tends to be short as the reaction temperature is increased, and the reaction time tends to be long as the reaction temperature is decreased. The chlorosulfonation reaction is preferably carried out at a temperature from 135° C. to 145° C. for 1.5 hours to 5.0 hours.

The chlorosulfonating agent may contain a sulfuric acid. When the chlorosulfonating agent contains a sulfuric acid, the molar ratio of the sulfuric acid to the copper phthalocyanine compound (sulfuric acid:copper phthalocyanine compound) is preferably 0.3:1 to 2:1.
Step (B)
Next, a compound represented by the structural formula (C-2b-a) is obtained by condensation reaction of the product obtained in the step (A) and ammonia.

(C-2b-a)

This step is carried out at a reaction temperature from 0° C. to 50° C. using 3% by weight to 35% by weight of ammonium hydroxide. Generally, the reaction time depends on the reaction temperature. The reaction time tends to be short as the reaction temperature is increased, and the reaction time tends to be long as the reaction temperature is decreased. The condensation reaction is preferably carried out at a temperature from 0° C. to 45° C. for 0.5 hours to 24 hours.
Step (C)
Then, $NH_4^+$ in the compound represented by the structural formula (C-2b-a) obtained in the step (B) is exchanged with a monovalent metal cation, if necessary. This metal cation exchange reaction can be carried out, for example, by the following method: the product obtained in the step (B) is acidified (for example, $NH_4^+$ is exchanged with $H^+$ using a hydrochloric acid), then the original cation is removed through dialysis, and then a monovalent metal cation is added (for example, an alkali metal hydroxide is added). In this manner, the dye (C-2b) is produced.

The compound represented by the chemical formula (C-2b-4) is yet another compound, wherein, in the general formula (C-2b), $M_0$ is ammonium, x is 1, y is 3, and a substituent is present on each of the four benzene rings A, B, C, and D of the copper phthalocyanine nucleus represented by the general formula (Pc).

C.I. Direct Blue 199 is, for example, a dye represented by the chemical formula (C-2c).

(C-2c)

C.I. Direct Blue 86 is, for example, a dye represented by the chemical formula (C-2d).

Pc(Cu)—(SO₃Na)₂    (C-2d)

Color vividness or brightness can be further improved by using the cyan dye (C-2) besides the cyan dye (C-1). The blending amount of the cyan dye (C-1) is not particularly limited, and is, for example, in the range of 0.1% by weight to 10% by weight, preferably in the range of 1.0% by weight to 7.0% by weight, and more preferably in the range of 1.6% by weight to 4.8% by weight with respect to the entire amount of the water-based cyan ink. The blending amount of the cyan dye (C-2) is not particularly limited, and is, for example, in the range of 0.05% by weight to 5% by weight, preferably in the range of 0.2% by weight to 2.0% by weight, and more preferably in the range of 0.25% by weight to 1.5% by weight with respect to the entire amount of the water-based cyan ink.

In a case that the cyan dye (C-2) is used besides the cyan dye (C-1), the weight ratio of the cyan dye (C-1) to the cyan dye (C-2) in the water-based cyan ink is preferably in the range of 60:40 to 98:2 (cyan dye (C-1):cyan dye (C-2)), and more preferably in the range of 70:30 to 95:5 (cyan dye (C-1):cyan dye (C-2)). By setting the weight ratio to be in the aforementioned range, color vividness or brightness and jetting stability can be further improved.

The entire blending amount of the cyan dye (C-1) and the cyan dye (C-2) is not particularly limited, and is preferably in the range of 2% by weight to 6% by weight with respect to the entire amount of the water-based cyan ink. By setting the entire blending amount to be in the aforementioned range, color vividness or brightness, ozone resistance, light resistance, jetting stability, and storing stability can be further improved, and bleeding between the cyan ink and other inks can be further suppressed.

The water and the blending amount of the water are the same as those described for the water-based yellow ink.

The water-soluble organic solvent and the blending amount of the water-soluble organic solvent are the same as those described for the water-based yellow ink.

The water-based cyan ink may further contain a conventionally known additive as required. The additive is also the same as that described for the water-based yellow ink.

The water-based cyan ink can be prepared, for example, by uniformly mixing a cyan colorant, water, and a water-soluble organic solvent with other addition components as required by a conventionally known method, and then removing sediments with a filter etc.

(Water-Based Black Ink)

As mentioned above, the water-based black ink contains a black colorant, water, and a water-soluble organic solvent. The black colorant contains carbon black. The carbon black includes, for example, furnace black, lamp black, acetylene black, and channel black. The carbon black may be self-dispersible carbon black. The self-dispersible carbon black is dispersible in water without using any dispersing agent, for example, owing to the fact that at least one of hydrophilic functional group and the salt thereof including, for example, carbonyl group, hydroxyl group, carboxyl group, sulfo group, and phosphate group is introduced into the carbon black particles by the chemical bond directly or with any other group intervening therebetween.

A Commercially available product suitable for the carbon black which is usable as the raw material for the self-dispersible carbon black, includes, for example, carbon blacks such as "MA8" and "MA100" produced by Mitsubishi Chemical Corporation and "Color Black FW200" produced by Degussa.

As the self-dispersible carbon black, for example, the commercially available product may be used. The commercially available product, includes, for example, "CAB-O-JET (trade name) 200", "CAB-O-JET (trade name) 250C", "CAB-O-JET (trade name) 260M", "CAB-O-JET (trade name) 270Y", "CAB-O-JET (trade name) 300", "CAB-O-JET (trade name) 400", "CAB-O-JET (trade name) 450C", "CAB-O-JET (trade name) 465M", and "CAB-O-JET (trade name) 470Y" produced by Cabot Specialty Chemicals; "BONJET (trade name) BLACK CW-2" and "BONJET (trade name) BLACK CW-3" produced by Orient Chemical Industries, Ltd.; and "LIOJET (trade name) WD BLACK 002C" produced by Toyo Ink Mfg. Co., Ltd.

The blending amount of the solid content of the carbon black with respect to the entire amount of the water-based black ink (pigment solid content amount) is not particularly limited, and can be appropriately determined depending on desired optical density or color (hue, tint), etc. The pigment solid content amount is, for example, in the range of 0.1% by weight to 20% by weight, preferably in the range of 1% by weight to 10% by weight, and more preferably in the range of 2% by weight to 10% by weight.

The black colorant may further contain, for example, other dyes and pigments, besides the carbon black.

The water and the blending amount of the water are the same as those described for the water-based yellow ink.

The water-soluble organic solvent and the blending amount of the water-soluble organic solvent are also the same as those described for the water-based yellow ink.

The water-based black ink may further contain a conventionally known additive as required. The additive is also the same as that described for the water-based yellow ink.

The water-based black ink can be prepared, for example, by uniformly mixing a black colorant, water, a water-soluble organic solvent with other addition components as required by a conventionally known method, and then removing sediments with a filter etc.

In the water-based ink set for ink-jet recording according to the present teaching, the surface tension of each of the water-based yellow ink, the water-based magenta ink, and the water-based cyan ink is preferably 30 mN/m to 35 mN/m, and the surface tension of the water-based black ink is preferably 30 mN/m to 40 mN/m. By setting the surface tension of each of the inks to be in the aforementioned range, it is possible to obtain the water-based ink set which has much superior jetting stability of each color ink and the black ink and which is capable of avoiding the bleeding between each color ink and the black ink more reliably.

The water-based ink set for the ink jet recording according to the present teaching is applicable to full-color recording when it includes the water-based inks of the aforementioned four colors. The water-based ink set according to the present teaching may be configured of only the water-based inks of the aforementioned four colors, or may further include a water-based ink of a color other than the four colors. The water-based ink of a color other than the four colors includes a water-based red ink, a water-based green ink, a water-based blue ink, water-based light inks with low concentrations of colorant (a water-based light yellow ink, a water-based light magenta ink, a water-based light cyan ink, a water-based light black ink, a water-based light red ink, a water-based light green ink, a water-based light blue ink, and the like), and the like.

The water-based ink set for ink-jet recording of the present teaching has superior vividness or brightness of color inks, superior light resistance/ozone resistance of the color inks, superior jetting stability of each color ink and a black ink, superior storing stability of the color inks, and hardly causes bleeding between each color ink and the black ink. In addition to the five capabilities described above, the water-based ink set for ink-jet recording of the present teaching has superior hues in balance after fading of the color inks.

Next, the water-based ink set for the ink jet recording according to the present teaching can be provided as an ink cartridge. For example, the ink cartridge of the present teaching is an ink cartridge which includes containing portions for a water-based yellow ink, a water-based magenta ink, a water-based cyan ink, and a water-based black ink, respectively. The water-based yellow ink, the water-based magenta ink, the water-based cyan ink, and the water-based black ink are the aforementioned water-based yellow ink, the aforementioned water-based magenta ink, the aforementioned water-based cyan ink, and the aforementioned water-based black ink in the aforementioned water-based ink set for ink-jet recording of the present teaching, respectively. The ink cartridge of the present teaching may further include a containing portion for the water-based ink of a color other than the aforementioned four colors.

The ink cartridge of the present teaching is preferably an ink cartridge assembly obtained by assembling plural ink cartridges each having a containing portion for a water-based ink of each color. However, the present teaching is not limited thereto. The ink cartridge of the present teaching may be an integrated ink cartridge in which the inside is partitioned so that containing portions of water-based inks of the respective colors are formed. As the body of the ink cartridge of the present teaching, for example, a conventionally known body can be used.

Next, explanation will made about the ink-jet recording method and the ink-jet recording apparatus of the present teaching.

The ink-jet recording method of the present teaching is an ink-jet recording method for performing recording by discharging a water-based ink constituting or constructing the water-based ink set onto a recording medium in accordance with an ink-jet system. The water-based ink set is the aforementioned water-based ink set for the ink-jet recording of the present teaching.

The ink-jet recording apparatus of the present teaching is an ink-jet recording apparatus including an ink-set accommodating section and an ink discharge mechanism. The water-based ink set for the ink-jet recording of the present teaching is accommodated in the ink-set accommodating section, and each of the water-based inks of the four colors constituting or constructing the water-based ink set for ink-jet recording is discharged onto the recording medium by the ink discharge mechanism.

The ink-jet recording method of the present teaching can be performed, for example, by using the ink-jet recording apparatus of the present teaching. The recording includes printing text (character, letter), printing image or picture, printing, etc.

FIG. 1 shows an example of the construction of the ink-jet recording apparatus of the present teaching. As shown in FIG. 1, an ink-jet recording apparatus 1 includes four ink cartridges 2, an ink discharging mechanism (ink-jet head) 3, a head unit 4, a carriage 5, a drive unit 6, a platen roller 7, and a purge unit 8 as main components.

The four ink cartridges 2 contain water-based inks of four colors, namely, yellow, magenta, cyan, and black, respectively. The water-based inks of four colors of yellow, magenta, cyan, and black are the water-based yellow ink, the water-based magenta ink, the water-based cyan ink, and the water-based black ink constituting the aforementioned water-based ink set of the present teaching, respectively. The ink-jet head 3 performs recording on a recording medium P such as a recording paper. The head unit 4 is provided with the ink-jet head 3. The four ink cartridges 2 and the head unit 4 are mounted on the carriage 5. The driving unit 6 reciprocates the carriage 5 in a linear direction. As the driving unit 6, it is possible to use, for example, a conventionally known driving unit (see, for example, Japanese Patent Application laid-open No. 2008-246821). The platen roller 7 extends in the reciprocating direction of the carriage 5 and is arranged to face or be opposite to the ink-jet head 3.

The recording medium P is supplied or fed from a paper feeding cassette (not shown) arranged at a side of or at a position below the ink-jet recording apparatus 1. The recording medium P is introduced between the ink-jet head 3 and the platen roller 7. Then, a predetermined recording is performed on the introduced recording medium P with the ink discharged from the ink-jet head 3. Afterwards, the recording medium P is discharged from the ink-jet recording apparatus 1. In FIG. 1, the paper feeding mechanism and discharging mechanism for the recording medium P are omitted.

The purge device 8 sucks unsatisfactory or degraded ink containing air bubbles etc. accumulated in the ink-jet head 3. As the purge device 8, it is possible to use, for example, a conventionally known purge device (for example, see Japanese Patent Application laid-open No. 2008-246821).

A wiper member 20 is provided on the purge device 8, at a position on the side of the platen roller 7 such that the wiper member 20 is adjacent to the purge device 8. The wiper member 20 is formed to have a spatula form, and wipes a nozzle-formation surface of the ink-jet head 3 accompanying with the movement of the carriage 5. In FIG. 1, a cap 18 is provided to cover a plurality of nozzles of the ink-jet head 3 which is returned to the reset position upon completion of the printing, so as to prevent the ink from drying.

In the ink-jet recording apparatus, the four ink cartridges may be provided on a plurality of carriages. Alternatively, the ink cartridges may be arranged and fixed inside the ink-jet recording apparatus, rather than being provided on the carriage(s). In such an aspect, for example, the ink cartridges and the head unit which is provided on the carriage are connected with a tube, etc., and the inks are supplied from the ink cartridges to the head unit via the tube.

EXAMPLES

Next, examples of the present teaching will be explained together with comparative examples. Note that the present teaching is not limited to the examples, the comparative examples which will be described below.

[Preparation of Water-Based Yellow Ink]

Water-based yellow inks Y1 to Y12 and Y13c to Y17c were obtained by mixing their ink components (TABLE 2) uniformly and then filtering the resultant mixtures respectively through a hydrophilic polytetrafluoroethylene (PTFE) type membrane filter (pore diameter: 0.20 μm) manufactured by Toyo Roshi Kaisha, Ltd. In TABLE 2, yellow dyes (Y-1a) to (Y-1e) are compounds represented by the chemical formulae (Y-1a) to (Y-1e), respectively.

[Preparation of Water-Based Magenta Ink]

Water-based magenta inks M1 to M18 and M19c to M27c were obtained by mixing their ink components (TABLE 3) uniformly and then filtering the resultant mixtures respectively through a hydrophilic polytetrafluoroethylene (PTFE) type membrane filter (pore diameter: 0.20 μm) manufactured by Toyo Roshi Kaisha, Ltd. In TABLE 3, magenta dyes (M-1a) to (M-1e) are compounds represented by the magenta dyes (M-1a) to (M-1e) shown in TABLE 1, respectively, magenta dyes (M-2a-1) to (M-2a-5) are compounds represented by the chemical formulae (M-2a-1) to (M-2a-5), respectively, and the magenta dyes (M-2b-2), (M-2b-4), and (M-2b-5) are compounds represented by the chemical formulae (M-2b-2), (M-2b-4), and (M-2b-5), respectively.

[Preparation of Water-Based Cyan Ink]

Water-based cyan inks C1 to C19 and C20c to C27c were obtained by mixing their ink components (TABLE 4) uniformly and then filtering the resultant mixtures respectively through a hydrophilic polytetrafluoroethylene (PTFE) type membrane filter (pore diameter: 0.20 µm) manufactured by Toyo Roshi Kaisha, Ltd. In TABLE 4, cyan dyes (C-1a) to (C-1e) are compounds represented by the chemical formulae (C-1a) to (C-1e), respectively, cyan dyes (C-2a-1), (C-2a-2), and (C-2a-5) are compounds represented by the chemical formulae (C-2a-1), (C-2a-2), and (C-2a-5), respectively, and cyan dyes (C-2b-2) and (C-2b-3) are compounds represented by the chemical formulae (C-2b-2) and (C-2b-3), respectively.

[Preparation of Water-Based Black Ink]

Components except for a water dispersion of the self-dispersible carbon black (self-dispersible carbon black water dispersion), which were included in the water-based black ink composition components (TABLE 5), were mixed uniformly to obtain ink solvents. Subsequently, the ink solvents were each added to the self-dispersible carbon black water dispersion, followed by being mixed uniformly. After that, obtained mixtures were each filtrated through a cellulose acetate membrane filter (pore size 3.00 µm) manufactured by Toyo Roshi Kaisha, Ltd., and thus water-based black inks K1 to K7 were obtained.

TABLE 2

| | | | Water-based yellow ink | | | | |
|---|---|---|---|---|---|---|---|
| | | | Y1 | Y2 | Y3 | Y4 | Y5 |
| Water-based yellow ink composition (wt %) | Yellow dye (Y-1) | Yellow dye (Y-1a) | 3.80 | — | — | — | — |
| | | Yellow dye (Y-1b) | — | 3.20 | — | — | — |
| | | Yellow dye (Y-1c) | — | — | 2.40 | — | — |
| | | Yellow dye (Y-1d) | — | — | — | 2.40 | — |
| | | Yellow dye (Y-1e) | — | — | — | — | 2.40 |
| | Yellow dye (Y-2) | C.I. Direct Yellow 86 | 0.20 | — | — | — | 1.60 |
| | | C.I. Direct Yellow 132 | — | 0.80 | — | 1.60 | — |
| | | C.I. Direct Yellow 142 | — | — | 1.60 | — | — |
| | Comparative dye | C.I. Acid Yellow 23 | — | — | — | — | — |
| | Glycerin | | 18.0 | 18.0 | 18.0 | 18.0 | 18.0 |
| | Polyethyleneglycol #200 | | 10.0 | 10.0 | 10.0 | 10.0 | 10.0 |
| | Triethylenglycol-n-butylether | | 3.0 | 3.0 | 3.0 | 3.0 | 3.0 |
| | SUNNOL (trade mark) NL-1430 (*1) | | 0.20 (0.056) | 0.20 (0.056) | 0.20 (0.056) | 0.20 (0.056) | 0.20 (0.056) |
| | OLFINE (trade mark) E1010 (*2) | | 0.20 | 0.20 | 0.20 | 0.50 | 0.10 |
| | Water | | Balance | Balance | Balance | Balance | Balance |
| | Weight ratio between dyes (dye (Y-1):dye (Y-2)) (*3) | | 95:5 | 80:20 | 60:40 | 60:40 | 60:40 |
| | Entire amount of dye to be blended (wt %) | | 4.0 | 4.0 | 4.0 | 4.0 | 4.0 |

| | | | Water-based yellow ink | | | | |
|---|---|---|---|---|---|---|---|
| | | | Y6 | Y7 | Y8 | Y9 | Y10 |
| Water-based yellow ink composition (wt %) | Yellow dye (Y-1) | Yellow dye (Y-1a) | — | — | — | — | 0.80 |
| | | Yellow dye (Y-1b) | — | — | — | 3.80 | — |
| | | Yellow dye (Y-1c) | 1.60 | — | — | — | — |
| | | Yellow dye (Y-1d) | — | 4.80 | — | — | — |
| | | Yellow dye (Y-1e) | — | — | 3.20 | — | — |
| | Yellow dye (Y-2) | C.I. Direct Yellow 86 | — | 1.20 | — | — | — |
| | | C.I. Direct Yellow 132 | — | — | 0.80 | 0.20 | — |
| | | C.I. Direct Yellow 142 | 0.40 | — | — | — | 0.20 |
| | Comparative dye | C.I. Acid Yellow 23 | — | — | — | — | — |
| | Glycerin | | 21.0 | 16.0 | 16.0 | 19.0 | 21.5 |
| | Polyethyleneglycol #200 | | 10.0 | 10.0 | 10.0 | 10.0 | 10.0 |
| | Triethylenglycol-n-butylether | | 3.0 | 3.0 | 4.0 | 2.0 | 3.0 |
| | SUNNOL (trade mark) NL-1430 (*1) | | 0.20 (0.056) | 0.20 (0.056) | 0.20 (0.056) | 0.20 (0.056) | 0.20 (0.056) |
| | OLFINE (trade mark) E1010 (*2) | | 0.20 | 0.20 | 1.00 | — | 0.20 |
| | Water | | Balance | Balance | Balance | Balance | Balance |
| | Weight ratio between dyes (dye (Y-1):dye (Y-2)) (*3) | | 80:20 | 80:20 | 80:20 | 60:40 | 80:20 |
| | Entire amount of dye to be blended (wt %) | | 2.0 | 6.0 | 4.0 | 4.0 | 1.0 |

| | | | Water-based yellow ink | | | | |
|---|---|---|---|---|---|---|---|
| | | | Y11 | Y12 | Y13c | Y14c | Y15c |
| Water-based yellow ink composition (wt %) | Yellow dye (Y-1) | Yellow dye (Y-1a) | — | 2.00 | 4.00 | — | — |
| | | Yellow dye (Y-1b) | 4.80 | — | — | — | — |
| | | Yellow dye (Y-1c) | — | — | — | — | — |
| | | Yellow dye (Y-1d) | — | — | — | — | — |
| | | Yellow dye (Y-1e) | — | — | — | — | — |
| | Yellow dye (Y-2) | C.I. Direct Yellow 86 | — | 2.00 | — | 3.00 | — |
| | | C.I. Direct Yellow 132 | 3.20 | — | — | — | 4.00 |

TABLE 2-continued

|  |  |  |  |  |  |
|---|---|---|---|---|---|
| Comparative dye C.I. Direct Yellow 142 | — | — | — | — | — |
| C.I. Acid Yellow 23 | — | — | — | — | — |
| Glycerin | 14.0 | 18.0 | 18.0 | 19.0 | 18.0 |
| Polyethyleneglycol #200 | 10.0 | 10.0 | 10.0 | 10.0 | 10.0 |
| Triethylenglycol-n-butylether | 3.0 | 3.0 | 3.0 | 3.0 | 3.0 |
| SUNNOL (trade mark) NL-1430 (*1) | 0.20 (0.056) | 0.20 (0.056) | 0.20 (0.056) | 0.20 (0.056) | 0.20 (0.056) |
| OLFINE (trade mark) E1010 (*2) | 0.20 | 0.15 | 0.20 | 0.10 | 1.00 |
| Water | Balance | Balance | Balance | Balance | Balance |
| Weight ratio between dyes (dye (Y-1):dye (Y-2)) (*3) | 60:40 | 50:50 | 100:0 | 100:0 | 100:0 |
| Entire amount of dye to be blended (wt %) | 8.0 | 4.0 | 4.0 | 3.0 | 4.0 |

|  |  |  | Water-based yellow ink | |
|---|---|---|---|---|
|  |  |  | Y16c | Y17c |
| Water-based yellow ink composition (wt %) | Yellow dye (Y-1) | Yellow dye (Y-1a) | 3.00 | — |
|  |  | Yellow dye (Y-1b) | — | — |
|  |  | Yellow dye (Y-1c) | — | — |
|  |  | Yellow dye (Y-1d) | — | — |
|  |  | Yellow dye (Y-1e) | — | — |
|  | Yellow dye (Y-2) | C.I. Direct Yellow 86 | — | — |
|  |  | C.I. Direct Yellow 132 | — | 3.00 |
|  |  | C.I. Direct Yellow 142 | — | — |
|  | Comparative dye | C.I. Acid Yellow 23 | 1.00 | 1.00 |
|  | Glycerin |  | 18.0 | 18.0 |
|  | Polyethyleneglycol #200 |  | 10.0 | 10.0 |
|  | Triethylenglycol-n-butylether |  | 1.0 | 3.0 |
|  | SUNNOL (trade mark) NL-1430 (*1) |  | 0.20 (0.056) | 0.20 (0.056) |
|  | OLFINE (trade mark) E1010 (*2) |  | — | 0.20 |
|  | Water |  | Balance | Balance |
|  | Weight ratio between dyes (dye (Y-1):dye (Y-2)) (*3) |  | 75:25 | 75:25 |
|  | Entire amount of dye to be blended (wt %) |  | 4.0 | 4.0 |

(*1): sodium polyoxyethylene alkyl (C = 12, 13) ether sulfate (3EO), produced by Lion Corporation, active content amount: 28% by weight, number in parenthesis indicates active content amount
(*2): Acetylene glycol surfactant (ethylene oxide (10 mol) adduct of diol, produced by Nissin Chemical Co., Ltd.)
(*3): In some of water-based yellow inks, the weight ratio of a dye (Y-1) or a dye (Y-2) to a comparative dye is shown

TABLE 3

|  |  |  | Water-based magenta ink | | | | |
|---|---|---|---|---|---|---|---|
|  |  |  | M1 | M2 | M3 | M4 | M5 |
| Water-based magenta ink composition (wt %) | Magenta dye (M-1) | Magenta dye (M-1a) | 2.4 | — | — | — | 3.5 |
|  |  | Magenta dye (M-1b) | — | 1.6 | — | — | — |
|  |  | Magenta dye (M-1c) | — | — | 0.8 | — | — |
|  |  | Magenta dye (M-1d) | — | — | — | — | — |
|  |  | Magenta dye (M-1e) | — | — | — | 0.5 | — |
|  | Magenta dye (M-2) | Magenta dye (M-2a-1) | 1.6 | — | — | — | 3.5 |
|  |  | Magenta dye (M-2a-2) | — | 2.4 | — | — | — |
|  |  | Magenta dye (M-2a-3) | — | — | 3.2 | — | — |
|  |  | Magenta dye (M-2a-4) | — | — | — | — | — |
|  |  | Magenta dye (M-2a-5) | — | — | — | 0.5 | — |
|  |  | Magenta dye (M-2b-2) | — | — | — | — | — |
|  |  | Magenta dye (M-2b-4) | — | — | — | — | — |
|  |  | Magenta dye (M-2b-5) | — | — | — | — | — |
|  |  | C.I. Acid Red 1 | — | — | — | — | — |
|  |  | C.I. Acid Red 254 | — | — | — | — | — |
|  | Comparative dye | C.I. Acid Red 52 | — | — | — | — | — |
|  |  | C.I. Acid Red 289 | — | — | — | — | — |
|  | Glycerin |  | 27.00 | 25.00 | 23.00 | 27.00 | 27.00 |
|  | Dipropyleneglycol-n-propyl ether |  | 2.00 | 2.00 | 5.00 | 2.00 | 2.00 |
|  | SUNNOL (trade mark) NL-1430 (*1) |  | 0.20 (0.056) | 0.20 (0.056) | 0.20 (0.056) | 0.20 (0.056) | 0.20 (0.056) |
|  | OLFINE (trade mark) E1010 (*2) |  | 0.50 | 0.80 | 1.00 | 0.25 | 0.15 |
|  | Water |  | Balance | Balance | Balance | Balance | Balance |
|  | Weight ratio between dyes (dye (M-1):dye (M-2)) (*3) |  | 60:40 | 40:60 | 20:80 | 50:50 | 50:50 |
|  | Entire amount of dye to be blended (wt %) |  | 4.0 | 4.0 | 4.0 | 1.0 | 7.0 |

TABLE 3-continued

|  |  |  | Water-based magenta ink | | | | |
|---|---|---|---|---|---|---|---|
|  |  |  | M6 | M7 | M8 | M9 | M10 |
| Water-based magenta ink composition (wt %) | Magenta dye (M-1) | Magenta dye (M-1a) | — | — | — | — | — |
|  |  | Magenta dye (M-1b) | — | — | 2.4 | — | — |
|  |  | Magenta dye (M-1c) | 1.0 | — | — | 1.6 | — |
|  |  | Magenta dye (M-1d) | — | 3.0 | — | — | — |
|  |  | Magenta dye (M-1e) | — | — | — | — | 2.4 |
|  | Magenta dye (M-2) | Magenta dye (M-2a-1) | — | — | — | — | — |
|  |  | Magenta dye (M-2a-2) | — | — | 1.6 | — | — |
|  |  | Magenta dye (M-2a-3) | 1.0 | — | — | 2.4 | — |
|  |  | Magenta dye (M-2a-4) | — | 3.0 | — | — | — |
|  |  | Magenta dye (M-2a-5) | — | — | — | — | 1.6 |
|  |  | Magenta dye (M-2b-2) | — | — | — | — | — |
|  |  | Magenta dye (M-2b-4) | — | — | — | — | — |
|  |  | Magenta dye (M-2b-5) | — | — | — | — | — |
|  |  | C.I. Acid Red 1 | — | — | — | — | — |
|  |  | C.I. Acid Red 254 | — | — | — | — | — |
|  | Comparative dye | C.I. Acid Red 52 | — | — | — | — | — |
|  |  | C.I. Acid Red 289 | — | — | — | — | — |
|  | Glycerin |  | 27.00 | 27.00 | 27.00 | 27.00 | 27.00 |
|  | Dipropyleneglycol-n-propyl ether |  | 2.00 | 2.00 | 3.00 | 2.00 | 2.00 |
|  | SUNNOL (trade mark) NL-1430 (*1) |  | 0.20 (0.056) | 0.20 (0.056) | 0.20 (0.056) | 0.20 (0.056) | 0.20 (0.056) |
|  | OLFINE (trade mark) E1010 (*2) |  | 0.20 | 0.20 | 3.00 | 0.10 | 1.50 |
|  | Water |  | Balance | Balance | Balance | Balance | Balance |
| Weight ratio between dyes (dye (M-1):dye (M-2)) (*3) |  |  | 50:50 | 50:50 | 60:40 | 40:60 | 60:40 |
| Entire amount of dye to be blended (wt %) |  |  | 2.0 | 6.0 | 4.0 | 4.0 | 4.0 |

|  |  |  | Water-based magenta ink | | | | |
|---|---|---|---|---|---|---|---|
|  |  |  | M11 | M12 | M13 | M14 | M15 |
| Water-based magenta ink composition (wt %) | Magenta dye (M-1) | Magenta dye (M-1a) | — | — | — | — | — |
|  |  | Magenta dye (M-1b) | — | — | — | 3.6 | — |
|  |  | Magenta dye (M-1c) | — | 2.8 | — | — | — |
|  |  | Magenta dye (M-1d) | — | — | — | — | 2.8 |
|  |  | Magenta dye (M-1e) | 2.4 | — | 0.4 | — | — |
|  | Magenta dye (M-2) | Magenta dye (M-2a-1) | — | — | 3.6 | — | — |
|  |  | Magenta dye (M-2a-2) | — | 1.2 | — | — | — |
|  |  | Magenta dye (M-2a-3) | — | — | — | — | — |
|  |  | Magenta dye (M-2a-4) | — | — | — | — | — |
|  |  | Magenta dye (M-2a-5) | 1.6 | — | — | — | — |
|  |  | Magenta dye (M-2b-2) | — | — | — | 0.4 | — |
|  |  | Magenta dye (M-2b-4) | — | — | — | — | 1.2 |
|  |  | Magenta dye (M-2b-5) | — | — | — | — | — |
|  |  | C.I. Acid Red 1 | — | — | — | — | — |
|  |  | C.I. Acid Red 254 | — | — | — | — | — |
|  | Comparative dye | C.I. Acid Red 52 | — | — | — | — | — |
|  |  | C.I. Acid Red 289 | — | — | — | — | — |
|  | Glycerin |  | 27.00 | 27.00 | 27.00 | 27.00 | 27.00 |
|  | Dipropyleneglycol-n-propyl ether |  | 2.00 | 2.00 | 2.00 | 2.00 | 2.00 |
|  | SUNNOL (trade mark) NL-1430 (*1) |  | 0.20 (0.056) | 0.20 (0.056) | 0.20 (0.056) | 0.20 (0.056) | 0.20 (0.056) |
|  | OLFINE (trade mark) E1010 (*2) |  | 0.20 | 0.20 | 0.15 | 0.20 | 0.20 |
|  | Water |  | Balance | Balance | Balance | Balance | Balance |
| Weight ratio between dyes (dye (M-1):dye (M-2)) (*3) |  |  | 60:40 | 70:30 | 10:90 | 90:10 | 70:30 |
| Entire amount of dye to be blended (wt %) |  |  | 4.0 | 4.0 | 4.0 | 4.0 | 4.0 |

|  |  |  | Water-based magenta ink | | | | |
|---|---|---|---|---|---|---|---|
|  |  |  | M16 | M17 | M18 | M19c | M20c |
| Water-based magenta ink composition (wt %) | Magenta dye (M-1) | Magenta dye (M-1a) | 2.4 | — | — | 4.0 | — |
|  |  | Magenta dye (M-1b) | — | 2.8 | — | — | — |
|  |  | Magenta dye (M-1c) | — | — | 2.4 | — | — |
|  |  | Magenta dye (M-1d) | — | — | — | — | — |
|  |  | Magenta dye (M-1e) | — | — | — | — | — |
|  | Magenta dye (M-2) | Magenta dye (M-2a-1) | — | — | — | — | 4.0 |
|  |  | Magenta dye (M-2a-2) | — | — | — | — | — |
|  |  | Magenta dye (M-2a-3) | — | — | — | — | — |
|  |  | Magenta dye (M-2a-4) | — | — | — | — | — |
|  |  | Magenta dye (M-2a-5) | — | — | — | — | — |
|  |  | Magenta dye (M-2b-2) | — | — | — | — | — |
|  |  | Magenta dye (M-2b-4) | — | — | — | — | — |
|  |  | Magenta dye (M-2b-5) | 1.6 | — | — | — | — |
|  |  | C.I. Acid Red 1 | — | 1.2 | — | — | — |

TABLE 3-continued

|  |  |  |  |  |  |  |  |
|---|---|---|---|---|---|---|---|
|  | Comparative dye | C.I. Acid Red 254 | — | — | 1.6 | — | — |
|  |  | C.I. Acid Red 52 | — | — | — | — | — |
|  |  | C.I. Acid Red 289 | — | — | — | — | — |
|  | Glycerin |  | 27.00 | 27.00 | 27.00 | 29.00 | 27.00 |
|  | Dipropyleneglycol-n-propyl ether |  | 2.00 | 2.00 | 2.00 | 2.00 | 2.00 |
|  | SUNNOL (trade mark) NL-1430 (*1) |  | 0.20 (0.056) | 0.20 (0.056) | 0.20 (0.056) | 0.20 (0.056) | 0.20 (0.056) |
|  | OLFINE (trade mark) E1010 (*2) |  | 0.20 | 0.20 | 0.20 | 0.20 | 0.20 |
|  | Water |  | Balance | Balance | Balance | Balance | Balance |
|  | Weight ratio between dyes (dye (M-1):dye (M-2)) (*3) |  | 60:40 | 70:30 | 60:40 | 100:0 | 100:0 |
|  | Entire amount of dye to be blended (wt %) |  | 4.0 | 4.0 | 4.0 | 4.0 | 4.0 |

|  |  |  | Water-based magenta ink |  |  |  |  |
|---|---|---|---|---|---|---|---|
|  |  |  | M21c | M22c | M23c | M24c | M25c |
| Water-based magenta ink composition (wt %) | Magenta dye (M-1) | Magenta dye (M-1a) | — | — | — | — | — |
|  |  | Magenta dye (M-1b) | — | — | — | — | — |
|  |  | Magenta dye (M-1c) | — | — | — | — | — |
|  |  | Magenta dye (M-1d) | — | — | — | — | — |
|  |  | Magenta dye (M-1e) | 2.0 | — | — | — | — |
|  | Magenta dye (M-2) | Magenta dye (M-2a-1) | — | — | — | — | — |
|  |  | Magenta dye (M-2a-2) | — | — | — | — | — |
|  |  | Magenta dye (M-2a-3) | — | 2.0 | — | — | — |
|  |  | Magenta dye (M-2a-4) | — | — | — | — | — |
|  |  | Magenta dye (M-2a-5) | — | — | — | — | — |
|  |  | Magenta dye (M-2b-2) | — | — | 4.0 | — | — |
|  |  | Magenta dye (M-2b-4) | — | — | — | — | — |
|  |  | Magenta dye (M-2b-5) | — | — | — | — | — |
|  |  | C.I. Acid Red 1 | — | — | — | 4.0 | — |
|  |  | C.I. Acid Red 254 | — | — | — | — | 4.0 |
|  | Comparative dye | C.I. Acid Red 52 | 2.0 | — | — | — | — |
|  |  | C.I. Acid Red 289 | — | 2.0 | — | — | — |
|  | Glycerin |  | 27.00 | 27.00 | 27.00 | 27.00 | 27.00 |
|  | Dipropyleneglycol-n-propyl ether |  | 2.00 | 2.00 | 2.00 | 2.00 | 2.00 |
|  | SUNNOL (trade mark) NL-1430 (*1) |  | 0.20 (0.056) | 0.20 (0.056) | 0.20 (0.056) | 0.20 (0.056) | 0.20 (0.056) |
|  | OLFINE (trade mark) E1010 (*2) |  | 0.20 | 0.50 | 0.20 | 0.50 | 0.20 |
|  | Water |  | Balance | Balance | Balance | Balance | Balance |
|  | Weight ratio between dyes (dye (M-1):dye (M-2)) (*3) |  | 50:50 | 50:50 | 100:0 | 100:0 | 100:0 |
|  | Entire amount of dye to be blended (wt %) |  | 4.0 | 4.0 | 4.0 | 4.0 | 4.0 |

|  |  |  | Water-based magenta ink |  |
|---|---|---|---|---|
|  |  |  | M26c | M27c |
| Water-based magenta ink composition (wt %) | Magenta dye (M-1) | Magenta dye (M-1a) | — | — |
|  |  | Magenta dye (M-1b) | — | — |
|  |  | Magenta dye (M-1c) | — | — |
|  |  | Magenta dye (M-1d) | — | — |
|  |  | Magenta dye (M-1e) | — | — |
|  | Magenta dye (M-2) | Magenta dye (M-2a-1) | — | — |
|  |  | Magenta dye (M-2a-2) | — | — |
|  |  | Magenta dye (M-2a-3) | — | — |
|  |  | Magenta dye (M-2a-4) | — | — |
|  |  | Magenta dye (M-2a-5) | — | — |
|  |  | Magenta dye (M-2b-2) | — | — |
|  |  | Magenta dye (M-2b-4) | — | — |
|  |  | Magenta dye (M-2b-5) | — | — |
|  |  | C.I. Acid Red 1 | — | — |
|  |  | C.I. Acid Red 254 | — | — |
|  | Comparative dye | C.I. Acid Red 52 | 4.0 | — |
|  |  | C.I. Acid Red 289 | — | 4.0 |
|  | Glycerin |  | 27.00 | 28.00 |
|  | Dipropyleneglycol-n-propyl ether |  | 2.00 | 2.00 |
|  | SUNNOL (trade mark) NL-1430 (*1) |  | 0.20 (0.056) | 0.20 (0.056) |
|  | OLFINE (trade mark) E1010 (*2) |  | 0.20 | 0.20 |
|  | Water |  | Balance | Balance |
|  | Weight ratio between dyes (dye (M-1):dye (M-2)) (*3) |  | 0:100 | 0:100 |
|  | Entire amount of dye to be blended (wt %) |  | 4.0 | 4.0 |

(*1): sodium polyoxyethylene alkyl (C = 12, 13) ether sulfate (3EO), produced by Lion Corporation, active content amount: 28% by weight, number in parenthesis indicates active content amount
(*2): Acetylene glycol surfactant (ethylene oxide (10 mol) adduct of diol, produced by Nissin Chemical Co., Ltd.)
(*3): In some of water-based magenta inks, the weight ratio of a dye (M-1) or a dye (M-2) to a comparative dye is shown

TABLE 4

| | | | Water-based cyan ink | | | | |
|---|---|---|---|---|---|---|---|
| | | | C1 | C2 | C3 | C4 | C5 |
| Water-based cyan ink composition (wt %) | Cyan dye (C-1) | Cyan dye (C-1a) | 4.0 | — | — | — | — |
| | | Cyan dye (C-1b) | — | 4.75 | — | — | — |
| | | Cyan dye (C-1c) | — | — | 3.5 | — | — |
| | | Cyan dye (C-1d) | — | — | — | 3.5 | — |
| | | Cyan dye (C-1e) | — | — | — | — | 4.0 |
| | Cyan dye (C-2) | Cyan dye (C-2a-1) | 1.0 | — | — | — | — |
| | | Cyan dye (C-2a-2) | — | 0.25 | — | — | — |
| | | Cyan dye (C-2a-5) | — | — | 1.5 | — | — |
| | | Cyan dye (C-2b-2) | — | — | — | 1.5 | — |
| | | Cyan dye (C-2b-3) | — | — | — | — | — |
| | | C.I. Direct Blue 199 | — | — | — | — | 1.0 |
| | | C.I. Direct Blue 86 | — | — | — | — | — |
| | Comparative dye | C.I. Acid Blue 9 | — | — | — | — | — |
| | | C.I. Acid Blue 74 | — | — | — | — | — |
| | Glycerin | | 15.00 | 15.00 | 15.00 | 15.00 | 15.00 |
| | Polyethyleneglycol #200 | | 10.00 | 10.00 | 10.00 | 10.00 | 10.00 |
| | Triethylenglycol-n-butylether | | 3.00 | 3.00 | 3.00 | 3.00 | 3.00 |
| | SUNNOL (trade mark) NL-1430 (*1) | | 0.20 (0.056) | 0.20 (0.056) | 0.20 (0.056) | 0.20 (0.056) | 0.20 (0.056) |
| | OLFINE (trade mark) E1010 (*2) | | 0.20 | 0.20 | 0.20 | 0.30 | 0.10 |
| | Water | | Balance | Balance | Balance | Balance | Balance |
| Weight ratio between dyes (dye (C-1):dye (C-2)) (*3) | | | 80:20 | 95:5 | 70:30 | 70:30 | 80:20 |
| Entire amount of dye to be blended (wt %) | | | 5.0 | 5.0 | 5.0 | 5.0 | 5.0 |

| | | | Water-based cyan ink | | | | |
|---|---|---|---|---|---|---|---|
| | | | C6 | C7 | C8 | C9 | C10 |
| Water-based cyan ink composition (wt %) | Cyan dye (C-1) | Cyan dye (C-1a) | — | — | — | — | 1.6 |
| | | Cyan dye (C-1b) | 3.5 | 3.5 | — | — | — |
| | | Cyan dye (C-1c) | — | — | 3.5 | — | — |
| | | Cyan dye (C-1d) | — | — | — | 3.5 | — |
| | | Cyan dye (C-1e) | — | — | — | — | — |
| | Cyan dye (C-2) | Cyan dye (C-2a-1) | — | — | — | — | 0.4 |
| | | Cyan dye (C-2a-2) | — | — | — | — | — |
| | | Cyan dye (C-2a-5) | — | — | — | — | — |
| | | Cyan dye (C-2b-2) | 1.5 | — | — | — | — |
| | | Cyan dye (C-2b-3) | — | 1.5 | — | — | — |
| | | C.I. Direct Blue 199 | — | — | 1.5 | — | — |
| | | C.I. Direct Blue 86 | — | — | — | 1.5 | — |
| | Comparative dye | C.I. Acid Blue 9 | — | — | — | — | — |
| | | C.I. Acid Blue 74 | — | — | — | — | — |
| | Glycerin | | 15.00 | 15.00 | 18.00 | 18.00 | 19.00 |
| | Polyethyleneglycol #200 | | 10.00 | 10.00 | 10.00 | 10.00 | 10.00 |
| | Triethylenglycol-n-butylether | | 3.00 | 3.00 | 4.00 | 3.00 | 3.00 |
| | SUNNOL (trade mark) NL-1430 (*1) | | 0.20 (0.056) | 0.20 (0.056) | 0.20 (0.056) | 0.20 (0.056) | 0.20 (0.056) |
| | OLFINE (trade mark) E1010 (*2) | | 0.50 | 0.05 | 1.00 | — | 0.20 |
| | Water | | Balance | Balance | Balance | Balance | Balance |
| Weight ratio between dyes (dye (C-1):dye (C-2)) (*3) | | | 70:30 | 70:30 | 70:30 | 70:30 | 80:20 |
| Entire amount of dye to be blended (wt %) | | | 5.0 | 5.0 | 5.0 | 5.0 | 2.0 |

| | | | Water-based cyan ink | | | | |
|---|---|---|---|---|---|---|---|
| | | | C11 | C12 | C13 | C14 | C15 |
| Water-based cyan ink composition (wt %) | Cyan dye (C-1) | Cyan dye (C-1a) | — | 0.8 | — | — | — |
| | | Cyan dye (C-1b) | — | — | — | 3.0 | 1.0 |
| | | Cyan dye (C-1c) | 4.8 | — | — | — | — |
| | | Cyan dye (C-1d) | — | — | 5.6 | — | — |
| | | Cyan dye (C-1e) | — | — | — | — | — |
| | Cyan dye (C-2) | Cyan dye (C-2a-1) | — | 0.2 | 1.4 | — | — |
| | | Cyan dye (C-2a-2) | 1.2 | — | — | 2.0 | — |
| | | Cyan dye (C-2a-5) | — | — | — | — | — |
| | | Cyan dye (C-2b-2) | — | — | — | — | — |
| | | Cyan dye (C-2b-3) | — | — | — | — | — |
| | | C.I. Direct Blue 199 | — | — | — | — | — |
| | | C.I. Direct Blue 86 | — | — | — | — | — |
| | Comparative dye | C.I. Acid Blue 9 | — | — | — | — | — |
| | | C.I. Acid Blue 74 | — | — | — | — | — |
| | Glycerin | | 13.00 | 20.00 | 12.00 | 15.00 | 20.00 |
| | Polyethyleneglycol #200 | | 10.00 | 10.00 | 10.00 | 10.00 | 10.00 |
| | Triethylenglycol-n-butylether | | 3.00 | 3.00 | 3.00 | 3.00 | 3.00 |
| | SUNNOL (trade mark) NL-1430 (*1) | | 0.20 | 0.20 | 0.20 | 0.20 | 0.20 |

TABLE 4-continued

|  |  |  |  |  |  |  |  |
|---|---|---|---|---|---|---|---|
|  |  |  |  | (0.056) | (0.056) | (0.056) | (0.056) | (0.056) |
|  | OLFINE (trade mark) E1010 (*2) |  | 0.20 | 0.10 | 0.10 | 0.20 | 0.20 |
|  | Water |  | Balance | Balance | Balance | Balance | Balance |
|  | Weight ratio between dyes (dye (C-1):dye (C-2)) (*3) |  | 80:20 | 80:20 | 80:20 | 60:40 | 100:0 |
|  | Entire amount of dye to be blended (wt %) |  | 6.0 | 1.0 | 7.0 | 5.0 | 1.0 |

|  |  |  | Water-based cyan ink | | | | |
|---|---|---|---|---|---|---|---|
|  |  |  | C16 | C17 | C18 | C19 | C20c |
| Water-based cyan ink composition (wt %) | Cyan dye (C-1) | Cyan dye (C-1a) | — | 5.0 | — | — | — |
|  |  | Cyan dye (C-1b) | — | — | — | — | — |
|  |  | Cyan dye (C-1c) | 2.0 | — | — | — | — |
|  |  | Cyan dye (C-1d) | — | — | 6.0 | — | — |
|  |  | Cyan dye (C-1e) | — | — | — | 7.0 | — |
|  | Cyan dye (C-2) | Cyan dye (C-2a-1) | — | — | — | — | 5.0 |
|  |  | Cyan dye (C-2a-2) | — | — | — | — | — |
|  |  | Cyan dye (C-2a-5) | — | — | — | — | — |
|  |  | Cyan dye (C-2b-2) | — | — | — | — | — |
|  |  | Cyan dye (C-2b-3) | — | — | — | — | — |
|  |  | C.I. Direct Blue 199 | — | — | — | — | — |
|  |  | C.I. Direct Blue 86 | — | — | — | — | — |
|  | Comparative dye | C.I. Acid Blue 9 | — | — | — | — | — |
|  |  | C.I. Acid Blue 74 | — | — | — | — | — |
|  | Glycerin |  | 20.00 | 15.00 | 13.00 | 12.00 | 17.00 |
|  | Polyethyleneglycol #200 |  | 10.00 | 10.00 | 10.00 | 10.00 | 10.00 |
|  | Triethylenglycol-n-butylether |  | 3.00 | 3.00 | 3.00 | 3.00 | 3.00 |
|  | SUNNOL (trade mark) NL-1430 (*1) |  | 0.20 (0.056) | 0.20 (0.056) | 0.20 (0.056) | 0.20 (0.056) | 0.20 (0.056) |
|  | OLFINE (trade mark) E1010 (*2) |  | 0.20 | 0.20 | 0.20 | 0.20 | 0.20 |
|  | Water |  | Balance | Balance | Balance | Balance | Balance |
|  | Weight ratio between dyes (dye (C-1):dye (C-2)) (*3) |  | 100:0 | 100:0 | 100:0 | 100:0 | 100:0 |
|  | Entire amount of dye to be blended (wt %) |  | 2.0 | 5.0 | 6.0 | 7.0 | 5.0 |

|  |  |  | Water-based cyan ink | | | | |
|---|---|---|---|---|---|---|---|
|  |  |  | C21c | C22c | C23c | C24c | C25c |
| Water-based cyan ink composition (wt %) | Cyan dye (C-1) | Cyan dye (C-1a) | 4.0 | — | — | — | — |
|  |  | Cyan dye (C-1b) | — | — | — | — | — |
|  |  | Cyan dye (C-1c) | — | — | — | — | — |
|  |  | Cyan dye (C-1d) | — | — | — | — | — |
|  |  | Cyan dye (C-1e) | — | — | — | — | — |
|  | Cyan dye (C-2) | Cyan dye (C-2a-1) | — | — | — | — | — |
|  |  | Cyan dye (C-2a-2) | — | 4.0 | — | — | — |
|  |  | Cyan dye (C-2a-5) | — | — | — | — | — |
|  |  | Cyan dye (C-2b-2) | — | — | 5.0 | — | — |
|  |  | Cyan dye (C-2b-3) | — | — | — | — | — |
|  |  | C.I. Direct Blue 199 | — | — | — | 5.0 | — |
|  |  | C.I. Direct Blue 86 | — | — | — | — | 5.0 |
|  | Comparative dye | C.I. Acid Blue 9 | 1.0 | — | — | — | — |
|  |  | C.I. Acid Blue 74 | — | 1.0 | — | — | — |
|  | Glycerin |  | 15.00 | 15.00 | 15.00 | 15.00 | 15.00 |
|  | Polyethyleneglycol #200 |  | 10.00 | 10.00 | 10.00 | 10.00 | 10.00 |
|  | Triethylenglycol-n-butylether |  | 3.00 | 3.00 | 3.00 | 3.00 | 3.00 |
|  | SUNNOL (trade mark) NL-1430 (*1) |  | 0.20 (0.056) | 0.20 (0.056) | 0.20 (0.056) | 0.20 (0.056) | 0.20 (0.056) |
|  | OLFINE (trade mark) E1010 (*2) |  | 0.20 | 0.20 | 0.20 | 0.20 | 2.00 |
|  | Water |  | Balance | Balance | Balance | Balance | Balance |
|  | Weight ratio between dyes (dye (C-1):dye (C-2)) (*3) |  | 80:20 | 80:20 | 100:0 | 100:0 | 100:0 |
|  | Entire amount of dye to be blended (wt %) |  | 5.0 | 5.0 | 5.0 | 5.0 | 5.0 |

|  |  |  | Water-based cyan ink | |
|---|---|---|---|---|
|  |  |  | C26c | C27c |
| Water-based cyan ink composition (wt %) | Cyan dye (C-1) | Cyan dye (C-1a) | — | — |
|  |  | Cyan dye (C-1b) | — | — |
|  |  | Cyan dye (C-1c) | — | — |
|  |  | Cyan dye (C-1d) | — | — |
|  |  | Cyan dye (C-1e) | — | — |
|  | Cyan dye (C-2) | Cyan dye (C-2a-1) | — | — |
|  |  | Cyan dye (C-2a-2) | — | — |
|  |  | Cyan dye (C-2a-5) | — | — |
|  |  | Cyan dye (C-2b-2) | — | — |
|  |  | Cyan dye (C-2b-3) | — | — |

TABLE 4-continued

|  |  |  |  |
|---|---|---|---|
| Comparative dye | C.I. Direct Blue 199 | — | — |
|  | C.I. Direct Blue 86 | — | — |
|  | C.I. Acid Blue 9 | 5.0 | — |
|  | C.I. Acid Blue 74 | — | 5.0 |
| Glycerin |  | 15.00 | 15.00 |
| Polyethyleneglycol #200 |  | 10.00 | 10.00 |
| Triethylenglycol-n-butylether |  | 3.00 | 3.00 |
| SUNNOL (trade mark) NL-1430 (*1) |  | 0.20 (0.056) | 0.20 (0.056) |
| OLFINE (trade mark) E1010 (*2) |  | 0.20 | 0.20 |
| Water |  | Balance | Balance |
| Weight ratio between dyes (dye (C-1):dye (C-2)) (*3) |  | 0:100 | 0:100 |
| Entire amount of dye to be blended (wt %) |  | 5.0 | 5.0 |

(*1): sodium polyoxyethylene alkyl (C = 12, 13) ether sulfate (3EO), produced by Lion Corporation, active content amount: 28% by weight, number in parenthesis indicates active content amount
(*2): Acetylene glycol surfactant (ethylene oxide (10 mol) adduct of diol, produced by Nissin Chemical Co., Ltd.)
(*3): In some of water-based cyan inks, the weight ratio of a dye (C-1) or a dye (C-2) to a comparative dye is shown

TABLE 5

|  |  | Water-based black ink |  |  |  |  |
|---|---|---|---|---|---|---|
|  |  | K1 | K2 | K3 | K4 | K5 |
| Water-based black ink composition (wt %) | CAB-O-JET (trade mark) 300 (*1) | 26.7 (4.00) | 26.7 (4.00) | — | 26.7 (4.00) | 20.0 (3.00) |
|  | CAB-O-JET (trade mark) 200 (*2) | — | — | 15.0 (3.00) | — | — |
|  | Glycerin | 31.0 | 32.0 | 34.0 | 30.0 | 34.0 |
|  | Dipropyleneglycol-n-propyl ether | 2.50 | 1.00 | 1.00 | 3.00 | 1.00 |
|  | SUNNOL (trade mark) NL-1430 (*3) | 0.20 (0.056) | 0.20 (0.056) | 0.20 (0.056) | 0.20 (0.056) | 0.20 (0.056) |
|  | OLFINE (trade mark) E1010 (*4) | 0.20 | 0.20 | 0.05 | 0.50 | 0.08 |
|  | Water | Balance | Balance | Balance | Balance | Balance |

|  |  | Water-based black ink |  |
|---|---|---|---|
|  |  | K6 | K7 |
| Water-based black ink composition (wt %) | CAB-O-JET (trade mark) 300 (*1) | — | 26.7 (4.00) |
|  | CAB-O-JET (trade mark) 200 (*2) | 15.0 (3.00) | — |
|  | Glycerin | 31.0 | 35.0 |
|  | Dipropyleneglycol-n-propyl ether | 3.00 | 1.00 |
|  | SUNNOL (trade mark) NL-1430 (*3) | 0.20 (0.056) | 0.20 (0.056) |
|  | OLFINE (trade mark) E1010 (*4) | 1.00 | — |
|  | Water | Balance | Balance |

(*1): Water dispersion of self-dispersible carbon black, produced by Cabot Specialty Chemicals; carbon black concentration: 15% by weight, number in parenthesis indicates pigment solid content amount
(*2): Water dispersion of self-dispersible carbon black, produced by Cabot Specialty Chemicals; carbon black concentration: 20% by weight, number in parenthesis indicates pigment solid content amount
(*3): sodium polyoxyethylene alkyl (C = 12, 13) ether sulfate (3EO), produced by Lion Corporation, active content amount: 28% by weight, number in parenthesis indicates active content amount
(*4): Acetylene glycol surfactant (ethylene oxide (10 mol) adduct of diol, produced by Nissin Chemical Co., Ltd.)

Examples 1 to 20 and Comparative Examples 1 to 9

Configuration of Water-Based Ink Set for Ink-Jet Recording

As shown in Tables 6 and 7, water-based ink sets for ink-jet recording were configured by combining a water-based yellow ink, a water-based magenta ink, a water-based cyan ink, and a water-based black ink.

[Evaluation of Water-Based Ink Set for Ink Jet Recording]

With respect to the water-based ink sets of examples and comparative examples, (a) storing stability evaluation of color inks, (b) color vividness or brightness evaluation (color developing properties evaluation) of the color inks, (c) ozone resistance evaluation of the color inks, (d) light resistance evaluation of the color inks, (e) jetting stability evaluation of each color ink and a black ink, (f) bleeding evaluation between the black ink and each color ink, and (g) comprehensive evaluation were conducted by the following methods. Samples used for (c) ozone resistance evaluation and (d) light resistance evaluation were prepared as follows.

[Preparation of Samples]

First, ink cartridges were filled with the water-based yellow ink, the water-based magenta ink, and the water-based cyan ink which configure the respective water-based ink sets of examples and comparative examples. Next, each of the ink cartridges was attached to a digital multi-function center DCP-385C carried with an ink-jet printer, manufactured by Brother Industries, Ltd. Then, a single color gradation sample of each of the water-based inks was printed on a glossy photo paper BP71GA manufactured by Brother Industries, Ltd., and a single color patch of each of the colors having an initial OD value of 1.0 was thereby obtained. The OD value was measured with a spectrophotometer, Spectrolino (light source: $D_{65}$; observer: 2°; and status A), manufactured by GretagMacbeth.

(a) Evaluation of Storing Stability

An absorbance at a wavelength of maximum absorption peak of a diluent, which was obtained by diluting 1600 times each of the water-based inks constituting the respective water-based ink sets of examples and comparative examples with pure water, was measured using an UV-VIS-NIR spectrophotometer UV 3600 manufactured by Shimadzu corporation. A measuring cell having a cell length of 10 mm was used for the measurement of the absorbance. Then, the water-based inks were poured in airtight containers, respectively, and the airtight containers were stored for 2 weeks at 60° C. An absorbance of a diluent that was obtained by diluting 1600 times each of the water-based inks after the storage with pure water was measured in the same manner as that before the storage. Then, an absorbance decrease rate (%) was determined based on the following equation (I), and storing stability of the water-based ink set was evaluated according to the following evaluation criteria. Storing stability was superior as the absorbance decrease rate was small.

$$\text{Absorbance decrease rate (\%)} = \{(X-Y)/X\} \times 100 \qquad (I)$$

X: Absorbance before storage
Y: Absorbance after storage
Criteria for Evaluation of Storing Stability
AA: all of the water-based inks had an absorbance decrease rate of less than 5%
A: at least one of the water-based inks had an absorbance decrease rate of 5% or more and less than 10%, and the others had an absorbance decrease rate of less than 5%
C: at least one of the water-based inks had an absorbance decrease rate of 10% or more (b) Evaluation of Color Developing Properties (Evaluation of Color Vividness or Brightness)

Ink cartridges were filled with the water-based yellow ink, the water-based magenta ink, and the water-based cyan ink constituting the respective water-based ink sets of examples and comparative examples. Next, each of the ink cartridges was attached to the digital multi-function center DCP-385C carried with the ink-jet printer. Then, a natural image sample (JIS SCID No. 2) was printed on the glossy photo paper BP71GA. Whether or not the respective single colors and colors obtained by combining the respective colors are sufficiently expressed was evaluated according to the following criteria by observing this natural image sample by visual check.

Criteria for Evaluation of Color Developing Properties
AA: the respective single colors and colors obtained by combining the respective colors were expressed sufficiently
A: the respective single colors were expressed sufficiently
C: the respective single colors and colors obtained by combining the respective colors were not expressed sufficiently (c) Evaluation of Ozone Resistance Using an ozone weather meter, OMS-H, manufactured by SUGA TEST INSTRUMENTS CO., LTD, a single color patch of each of the colors was allowed to leave 40 hours under the conditions that the ozone concentration was 1 ppm, the temperature in the chamber was 24° C., and the relative humidity in the chamber was 60%. Next, the OD value of the single color patch after being allowed to leave was measured in the same manner as described above. Then, the OD value decrease rate (%) was determined according to the following equation (II), and the ozone resistance was evaluated according to the following evaluation criteria. The smaller the OD value decrease rate, the less the deterioration in image quality, which means the ozone resistance of the water-based ink is higher.

$$\text{OD value decrease rate (\%)} = \{(X-Y)/X\} \times 100 \qquad (II)$$

X: 1.0 (initial OD value)
Y: OD value after being allowed to leave
Criteria for Evaluation of Ozone Resistance
AA: all of the water-based inks had an OD value decrease rate of less than 20%, and the maximum difference between OD value decrease rates of the respective water-based inks was less than 20%
A: all of the water-based inks had an OD value decrease rate of 20% or more and less than 30%, and the maximum difference between OD value decrease rates of the respective water-based inks was less than 20%
C: at least one of the water-based inks had an OD value decrease rate of 30% or more, or the maximum difference between OD value decrease rates of any of the water-based inks was 20% or more (d) Evaluation of Light Resistance Using a super xenon weather meter, SX75, manufactured by SUGA TEST INSTRUMENTS CO., LTD, a single color patch of each of the colors was irradiated with light from a xenon lamp for 100 hours under the conditions that the temperature in the chamber was 23° C., the relative humidity in the chamber was 50%, and the illuminance was 81 klx. Next, the OD value of the single color patch after irradiation was measured in the same manner as described above. Then, the OD value decrease rate (%) was determined according to the following equation (III), and the light resistance was evaluated according to the following evaluation criteria. The smaller the OD value decrease rate, the less the deterioration in image quality, which means the light resistance of the water-based ink is higher.

$$\text{OD value decrease rate (\%)} = \{(X-Y)/X\} \times 100 \qquad (III)$$

X: 1.0 (initial OD value)
Y: OD value after irradiation
Criteria for Evaluation of Light Resistance
AA: all of the water-based inks had an OD value decrease rate of less than 20%, and the maximum difference between OD value decrease rates of the respective water-based inks was less than 20%
A: all of the water-based inks had an OD value decrease rate of 20% or more and less than 30%, and the maximum difference between OD value decrease rates of the respective water-based inks was less than 20%.
C: at least one of the water-based inks had an OD value decrease rate of 30% or more, or the maximum difference between OD value decrease rates of any of the water-based inks was 20% or more.

(e) Evaluation of Jetting Stability

With respect to each of the water-based yellow ink, the water-based magenta ink, the water-based cyan ink, and the water-based black ink constituting the respective water-based ink sets of examples and comparative examples, continuous recording of 100 million dots (approximately 30,000 sheets) was carried out on office paper W (recording paper) manufactured by FUJITSU CoWor Co LIMITED using the digital multi-function center DCP-385C carried with the ink-jet printer. The result of the continuous recording was evaluated according to the following evaluation criteria. The term "non-ejection" denotes a state that the nozzle of the ink-jet head is clogged and the water-based ink is not ejected. The term "a bending of jetting (a deflection in direction of jetting)" denotes a state that the nozzle of the ink-jet head is partially clogged and thereby the water-based ink is jetted not perpendicularly to the recording paper but obliquely thereto.

Criteria for Evaluation of Jetting Stability

AA: Neither non-ejection nor the bending of jetting of all of the water-based inks occurred during the continuous recording.

A: Non-ejection and/or the bending of jetting of at least one of the water-based inks occurred to a small extent during the continuous recording, but the non-ejection and/or the bending of jetting was restored by five purges or fewer.

C: Non-ejection and/or the bending of jetting of at least one of the water-based inks occurred to a large extent during the continuous recording, and the non-ejection and/or the bending of jetting was not restored by five purges.

(f) Evaluation of Bleeding

Evaluation samples were prepared as follows. That is, two red portions which are mixed color portions formed by mixing the water-based yellow ink with the water-based magenta ink, two green portions which are mixed color portions formed by mixing the water-based yellow ink with the water-based cyan ink, and two blue portions which are mixed color portions formed by mixing the water-based magenta ink with the water-based cyan ink, each of the water-based inks constituting the respective water-based ink sets of examples and comparative examples, were formed on three types of regular paper sheets (Rey Copy paper manufactured by International Paper, Business manufactured by XEROX, and Recycled Supreme manufactured by XEROX), by using the digital multi-function center DCP-385C carried with the ink-jet printer. Subsequently, a black line using one of the water-based black inks constituting the respective water-based ink sets of examples and comparative examples was formed at a boundary portion of each of the mixed color portions. With respect to the bleeding in the evaluation samples, Raggedness was measured by the handheld image analysis system "PIAS (trade name)-II" manufactured by Quality Engineering Associates Inc. (QEA) and was evaluated according to the following evaluation criteria. The measurement of Raggedness was performed three times per each regular paper sheet in conformity with ISO-13660. As for the measurement result of each regular paper sheet, an average value of values obtained by three times measurements was rounded off all fractions. Further, "an average (Raggedness) of the three types of regular paper sheets" described in the following criteria for evaluation of bleeding was obtained as follows. That is, the respective average values of the three types of regular paper sheets (value before being rounded) were summed up; the summed value was divided three to obtain an average value of the measurement results of the three types of regular paper sheets; and the average value was rounded off all fractions.

Criteria for Evaluation of Bleeding

AA: Average Raggedness of the three types of regular paper sheets was less than 27 μm A: Average Raggedness of the three types of regular paper sheets was 27 μm or more and less than 32 μm C: Average Raggedness of the three types of regular paper sheets was 32 μm or more (g) Comprehensive Evaluation With respect to the respective water-based ink sets, a comprehensive evaluation was made according to the following evaluation criteria based on the results of the evaluations (a) to (f).

Criteria for Comprehensive Evaluation

G: There was no C for evaluation results

NG: There was a C for any of evaluation results

The configurations, the evaluation results, and the surface tension results of the respective water-based inks, of the respective water-based ink sets of examples are shown in Table 6. Further, the configurations, the evaluation results, and the surface tension results of the respective water-based inks, of the respective water-based ink sets of comparative examples are shown in Table 7.

TABLE 6

|  |  | Ex. 1 | Ex. 2 | Ex. 3 | Ex. 4 | Ex. 5 |
|---|---|---|---|---|---|---|
| Water-based ink set | Water-based yellow ink | Y1 | Y2 | Y3 | Y4 | Y5 |
|  | Surface tension (mN/m) | 32.0 | 32.4 | 32.0 | 30.2 | 34.6 |
|  | Water-based magenta ink | M1 | M2 | M3 | M4 | M5 |
|  | Surface tension (mN/m) | 32.9 | 33.2 | 32.9 | 33.5 | 36.5 |
|  | Water-based cyan ink | C1 | C2 | C3 | C4 | C5 |
|  | Surface tension (mN/m) | 33.2 | 33.1 | 31.8 | 32.5 | 34.2 |
|  | Water-based black ink | K1 | K2 | K7 | K4 | K5 |
|  | Surface tension (mN/m) | 32.7 | 35.3 | 42.8 | 30.1 | 39.8 |
| Evaluation | Storing stability evaluation | AA | AA | AA | AA | A |
|  | Color developing properties evaluation | AA | AA | AA | AA | AA |
|  | Ozone resistance evaluation | AA | AA | AA | A | AA |
|  | Light resistance evaluation | AA | AA | AA | A | AA |
|  | Jetting stability evaluation | AA | AA | AA | AA | A |
|  | Bleeding evaluation | AA | AA | A | AA | A |
|  | Comprehensive evaluation | G | G | G | G | G |

|  |  | Ex. 6 | Ex. 7 | Ex. 8 | Ex. 9 | Ex. 10 |
|---|---|---|---|---|---|---|
| Water-based ink set | Water-based yellow ink | Y6 | Y7 | Y8 | Y9 | Y10 |
|  | Surface tension (mN/m) | 33.6 | 31.8 | 28.8 | 35.4 | 33.2 |
|  | Water-based magenta ink | M6 | M7 | M8 | M9 | M10 |
|  | Surface tension (mN/m) | 34.6 | 32.4 | 29.4 | 36.5 | 30.1 |
|  | Water-based cyan ink | C6 | C7 | C8 | C9 | C10 |
|  | Surface tension (mN/m) | 30.2 | 34.8 | 28.9 | 35.4 | 32.6 |
|  | Water-based black ink | K1 | K2 | K1 | K5 | K3 |
|  | Surface tension (mN/m) | 32.7 | 35.3 | 32.7 | 39.8 | 34.4 |
| Evaluation | Storing stability evaluation | AA | AA | AA | AA | AA |
|  | Color developing properties evaluation | AA | AA | AA | AA | A |
|  | Ozone resistance evaluation | AA | AA | AA | AA | A |
|  | Light resistance evaluation | AA | AA | AA | AA | A |
|  | Jetting stability evaluation | AA | AA | A | AA | AA |
|  | Bleeding evaluation | AA | AA | AA | A | AA |

TABLE 6-continued

|  |  | Comprehensive evaluation | G | G | G | G | G |
|---|---|---|---|---|---|---|---|
|  |  |  | Ex. 11 | Ex. 12 | Ex. 13 | Ex. 14 | Ex. 15 |
| Water-based ink set | Water-based yellow ink | | Y11 | Y12 | Y3 | Y4 | Y5 |
|  | Surface tension (mN/m) | | 31.9 | 33.1 | 32.0 | 30.2 | 34.6 |
|  | Water-based magenta ink | | M11 | M12 | M13 | M14 | M15 |
|  | Surface tension (mN/m) | | 34.8 | 33.0 | 37.0 | 30.9 | 30.6 |
|  | Water-based cyan ink | | C11 | C12 | C13 | C14 | C14 |
|  | Surface tension (mN/m) | | 32.3 | 34.3 | 33.4 | 32.3 | 32.3 |
|  | Water-based black ink | | K1 | K4 | K6 | K1 | K1 |
|  | Surface tension (mN/m) | | 32.7 | 30.1 | 28.9 | 32.7 | 32.7 |
| Evaluation | Storing stability evaluation | | A | AA | A | AA | AA |
|  | Color developing properties evaluation | | AA | A | AA | AA | AA |
|  | Ozone resistance evaluation | | A | A | AA | AA | AA |
|  | Light resistance evaluation | | AA | A | AA | AA | AA |
|  | Jetting stability evaluation | | A | AA | A | A | A |
|  | Bleeding evaluation | | AA | AA | A | AA | AA |
|  | Comprehensive evaluation | | G | G | G | G | G |
|  |  |  | Ex. 16 | Ex. 17 | Ex. 18 | Ex. 19 | Ex. 20 |
| Water-based ink set | Water-based yellow ink | | Y6 | Y3 | Y4 | Y5 | Y6 |
|  | Surface tension (mN/m) | | 33.6 | 32.0 | 30.2 | 34.6 | 33.6 |
|  | Water-based magenta ink | | M16 | M17 | M18 | M1 | M2 |
|  | Surface tension (mN/m) | | 30.5 | 30.6 | 31.7 | 32.9 | 33.2 |
|  | Water-based cyan ink | | C15 | C16 | C17 | C18 | C19 |
|  | Surface tension (mN/m) | | 32.5 | 32.4 | 32.3 | 32.1 | 32.0 |
|  | Water-based black ink | | K3 | K1 | K2 | K4 | K2 |
|  | Surface tension (mN/m) | | 34.4 | 32.7 | 35.3 | 30.1 | 35.3 |
| Evaluation | Storing stability evaluation | | AA | AA | AA | AA | A |
|  | Color developing properties evaluation | | A | A | A | A | A |
|  | Ozone resistance evaluation | | A | AA | A | AA | AA |
|  | Light resistance evaluation | | A | AA | A | AA | AA |
|  | Jetting stability evaluation | | AA | AA | AA | AA | AA |
|  | Bleeding evaluation | | AA | AA | AA | AA | AA |
|  | Comprehensive evaluation | | G | G | G | G | G |

TABLE 7

|  |  | Comparative Ex. 1 | Comparative Ex. 2 | Comparative Ex. 3 |
|---|---|---|---|---|
| Water-based ink set | Water-based yellow ink | Y13c | Y14c | Y15c |
|  | Surface tension (mN/m) | 32.3 | 32.5 | 29.6 |
|  | Water-based magenta ink | M19c | M20c | M21c |
|  | Surface tension (mN/m) | 31.6 | 39.3 | 31.6 |
|  | Water-based cyan ink | C20c | C21c | C22c |
|  | Surface tension (mN/m) | 33.2 | 32.8 | 32.8 |
|  | Water-based black ink | K7 | K5 | K1 |
|  | Surface tension (mN/m) | 42.8 | 39.8 | 32.7 |
| Evaluation | Storing stability evaluation | C | AA | AA |
|  | Color developing properties evaluation | C | C | A |
|  | Ozone resistance evaluation | AA | C | C |
|  | Light resistance evaluation | AA | C | C |
|  | Jetting stability evaluation | C | C | C |
|  | Bleeding evaluation | C | C | AA |
|  | Comprehensive evaluation | NG | NG | NG |
|  |  | Comparative Ex. 4 | Comparative Ex. 5 | Comparative Ex. 6 |
| Water-based ink set | Water-based yellow ink | Y16c | Y17c | Y2 |
|  | Surface tension (mN/m) | 35.4 | 33.5 | 32.4 |
|  | Water-based magenta ink | M22c | M23c | M24c |
|  | Surface tension (mN/m) | 34.3 | 30.4 | 28.6 |
|  | Water-based cyan ink | C23c | C24c | C25c |
|  | Surface tension (mN/m) | 32.9 | 31.4 | 29.6 |
|  | Water-based black ink | K2 | K4 | K1 |
|  | Surface tension (mN/m) | 35.3 | 30.1 | 32.7 |
| Evaluation | Storing stability evaluation | AA | AA | AA |
|  | Color developing properties evaluation | AA | AA | AA |
|  | Ozone resistance evaluation | C | C | C |
|  | Light resistance evaluation | C | C | C |
|  | Jetting stability evaluation | AA | AA | A |
|  | Bleeding evaluation | A | AA | AA |
|  | Comprehensive evaluation | NG | NG | NG |
|  |  | Comparative Ex. 7 | Comparative Ex. 8 | Comparative Ex. 9 |
| Water-based ink set | Water-based yellow ink | Y4 | Y6 | Y1 |
|  | Surface tension (mN/m) | 30.2 | 33.6 | 32.0 |
|  | Water-based magenta ink | M25c | M26c | M27c |
|  | Surface tension (mN/m) | 31.7 | 31.7 | 32.5 |
|  | Water-based cyan ink | C26c | C27c | C1 |
|  | Surface tension (mN/m) | 31.9 | 32.0 | 33.2 |
|  | Water-based black ink | K3 | K2 | K3 |
|  | Surface tension (mN/m) | 34.4 | 35.3 | 34.4 |
| Evaluation | Storing stability evaluation | AA | AA | AA |
|  | Color developing properties evaluation | AA | C | AA |
|  | Ozone resistance evaluation | C | C | C |
|  | Light resistance evaluation | C | C | C |
|  | Jetting stability evaluation | AA | AA | AA |
|  | Bleeding evaluation | AA | AA | C |
|  | Comprehensive evaluation | NG | NG | NG |

As shown in Table 6, water-based ink sets of Examples 1 to 20 showed favorable results in all of the storing stability evaluation, the color developing properties evaluation, the ozone resistance evaluation, the light resistance evaluation, jetting stability evaluation of the black ink and each color ink, and the bleeding evaluation between the black ink and each color ink. Further, a color balance after fading of colors was also favorable in each of the water-based inks of Examples 1 to 20.

In particular, both the jetting stability evaluation and the bleeding evaluation result were excellent ("AA") in each of Examples 1, 2, 4, 6, 7, 10, 12, and 16 to 20 in which the surface tension of each of the water-based yellow ink, the water-based magenta ink, and the water-based cyan ink was 30 mN/m to 35 mN/m and the surface tension of the water-based black ink was 30 mN/m to 40 mN/m. On the other hand, at least one of the bleeding evaluation and the jetting stability evaluation was "A" in each of Examples 3, 5, 8, 9, and 13 in which the surface tension of any one of the water-based yellow ink, the water-based magenta ink, the water-based cyan ink, and the water-based black ink deviated from the aforementioned ranges. According to this result, the following fact has been revealed. That is, by setting the surface tension of each of the inks to be in each of the aforementioned ranges, it is possible to obtain the water-based ink set which has much superior jetting stability and is capable of avoiding bleeding more reliably.

In each of Examples 11, 14, and 15, although the surface tension of each of the inks including the color inks and the black ink was in each of the aforementioned ranges, the jetting stability evaluation was "A" and was somewhat or slightly inferior to the result ("AA") in each of Examples 1, 2, 4, 6, 7, 10, 12, and 16 to 20. The reason thereof is considered that the entire blending amount of the dye of the water-based yellow ink Y11 was 8.00% by weight (4.80+3.20=8.00) in the Example 11 and deviated from the range (2% by weight to 6% by weight) of a preferred entire blending amount of the yellow dye. Further, in each of Examples 14 and 15, the weight ratio of the cyan dye (C-1) to the cyan dye (C-2) in the water-based cyan ink C14 was 3.0:2.0 (i.e. 60:40). This was a boundary value of a preferred range (60:40 to 98:2) of the weight ratio of the cyan dye (C-1) to the cyan dye (C-2), but deviated from the more preferred range (70:30 to 98:5) of the weight ratio of the cyan dye (C-1) to the cyan dye (C-2). Therefore, it is considered that the jetting stability evaluation in each of Examples 14 and 15 was somewhat or slightly inferior, and was "A" instead of "AA". In view of the above, in each of Examples 11, 14 and 15, it is considered that the jetting stability was affected by a factor other than the surface tension of each of the inks.

On the other hand, in the water-based ink set of Comparative Example 1, the storing stability evaluation of the water-based yellow ink was inferior. Thus, as shown in Table 7, the storing stability evaluation of the water-based ink set in Comparative Example 1 was "C". Further, the bleeding evaluation of the water-based ink set was also "C". The reason thereof is considered that the water-based yellow ink did not contain the yellow dye (Y-2). Further, the result of the color developing properties evaluation of the water-based magenta ink was inferior. Thus, the result of the color developing properties evaluation of the water-based ink set in Comparative Example 1 was "C". The reason thereof is considered that the water-based magenta ink did not contain the magenta dye (M-2). Furthermore, the result of the jetting stability evaluation of the water-based cyan ink was inferior. Thus, the result of the jetting stability evaluation of the water-based ink set in Comparative Example 1 was "C". The reason thereof is considered that the water-based cyan ink did not contain the cyan dye (C-1).

In the water-based ink set of Comparative Example 2, the results of the color developing properties evaluation, the ozone resistance evaluation, and the light resistance evaluation of the water-based yellow ink were inferior, and the result of the jetting stability evaluation of the water-based magenta ink was inferior. Further, there were large differences in OD value decrease rates between the water-based yellow ink and the water-based magenta ink, between the water-based yellow ink and the water-based cyan ink, and between the water-based magenta ink and the water-based cyan ink in the ozone resistance evaluation and the light resistance evaluation. Hues in balance after fading of the colors were unsatisfactory. Thus, the results of the color developing properties evaluation, the ozone resistance evaluation, the light resistance evaluation and jetting stability evaluation of the water-based ink set in Comparative Example 2 were "C". The reason thereof is considered that the water-based yellow ink did not contain the yellow dye (Y-1) and that the water-based magenta ink did not contain the magenta dye (M-1). Further, the result of the bleeding evaluation of the water-based ink set in Comparative Example 2 was also "C". The reason thereof is considered that the water-based magenta ink did not contain the magenta dye (M-1).

In the water-based ink set of Comparative Example 3, the results of the ozone resistance evaluation and the light resistance evaluation of the water-based yellow ink and the water-based magenta ink were inferior, and the results of jetting stability evaluation, the ozone resistance evaluation, and the light resistance evaluation of the water-based cyan ink were inferior. Further, there were large differences in OD value decrease rates between the water-based yellow ink and the water-based magenta ink and between the water-based yellow ink and the water-based cyan ink in the ozone resistance evaluation and the light resistance evaluation. Hues in balance after fading of the colors were unsatisfactory. Thus, the results of the ozone resistance evaluation, the light resistance evaluation, and jetting stability evaluation of the water-based ink set in Comparative Example 3 were "C". The reason thereof is considered that the water-based yellow ink did not contain the yellow dye (Y-1), that the water-based magenta ink contained C.I. Acid red 52 other than the magenta dye (M-2), and that the water-based cyan ink did not contain the cyan dye (C-1).

In the water-based ink set of Comparative Example 4, the results of the ozone resistance evaluation and the light resistance evaluation of the water-based yellow ink and the water-based magenta ink were inferior, and the result of the ozone resistance evaluation of the water-based cyan ink was inferior. Further, there were large differences in OD value decrease rates between the water-based yellow ink and the water-based magenta ink and between the water-based yellow ink and the water-based cyan ink in the ozone resistance evaluation and the light resistance evaluation. Hues in balance after fading of the colors were unsatisfactory. Thus, the results of the ozone resistance evaluation and the light resistance evaluation of the water-based ink set in Comparative Example 4 were "C". The reason thereof is considered that the water-based yellow ink contained C.I. Acid yellow 23 other than the yellow dye (Y-2), that the water-based magenta ink contained C.I. Acid red 289 other than the magenta dye (M-1), and that the water-based cyan ink did not contain the cyan dye (C-1).

In the water-based ink set of Comparative Example 5, the results of the ozone resistance evaluation and the light resistance evaluation of the water-based yellow ink and the water-based magenta ink were inferior, and the result of the ozone resistance evaluation of the water-based cyan ink was significantly inferior. Further, there were large differences in OD value decrease rates between the water-based yellow ink and the water-based magenta ink and between the water-based yellow ink and the water-based cyan ink in the ozone resistance evaluation and the light resistance evaluation. Hues in balance after fading of the colors were unsatisfactory. Thus, the results of the ozone resistance evaluation and the light resistance evaluation of the water-based ink set in Comparative Example 5 were "C". The reason thereof is considered that the water-based yellow ink contained C.I. Acid yellow 23 other than the yellow dye (Y-1), that the water-based magenta ink did not contain the magenta dye (M-1), and that the water-based cyan ink did not contain the cyan dye (C-1).

In the water-based ink set of Comparative Example 6, the ozone resistance evaluation results of the water-based magenta ink and the water-based cyan ink were inferior. Further, there were large differences in OD value decrease rates between the water-based yellow ink and the water-based magenta ink and between the water-based magenta ink and the water-based cyan ink in the ozone resistance evaluation and the light resistance evaluation, and there were large differences in OD value decrease rates between the water-based yellow ink and the water-based cyan ink in the ozone resistance evaluation. Hues in balance after fading of the colors were unsatisfactory. Thus, the results of the ozone resistance evaluation and the light resistance evaluation of the water-based ink set in Comparative Example 6 were "C". The reason thereof is considered that the water-based magenta ink did not contain the magenta dye (M-1), and the water-based cyan ink did not contain the cyan dye (C-1).

In the water-based ink set of Comparative Example 7, the results of the ozone resistance evaluation and the light resistance evaluation of the water-based magenta ink and the water-based cyan ink were inferior. Further, there were large differences in OD value decrease rates between the water-based yellow ink and the water-based magenta ink in the ozone resistance evaluation and the light resistance evaluation, between the water-based yellow ink and the water-based cyan ink in the ozone resistance evaluation, and between the water-based magenta ink and the water-based cyan ink in the light resistance evaluation. Hues in balance after fading of the colors were unsatisfactory. Thus, the results of the ozone resistance evaluation and the light resistance evaluation of the water-based ink set in Comparative Example 7 were "C". The reason thereof is considered that the water-based magenta ink did not contain the magenta dye (M-1), and the water-based cyan ink did not contain the cyan dye (C-1).

In the water-based ink set of Comparative Example 8, the results of the ozone resistance evaluation and the light resistance evaluation of the water-based magenta ink were significantly inferior, and the results of the color developing properties evaluation, the ozone resistance evaluation, and the light resistance evaluation of the water-based cyan ink were inferior. Further, there were large differences in OD value decrease rates between the water-based yellow ink and the water-based magenta ink and between the water-based yellow ink and the water-based cyan ink in the ozone resistance evaluation and the light resistance evaluation. Hues in balance after fading of the colors were unsatisfactory. Thus, the results of the color developing properties evaluation, the ozone resistance evaluation and the light resistance evaluation of the water-based ink set in Comparative Example 8 were "C". The reason thereof is considered that the water-based magenta ink did not contain the magenta dye (M-1) and the magenta dye (M-2), and the water-based cyan ink did not contain the cyan dye (C-1).

In the water-based ink set of Comparative Example 9, the results of the ozone resistance evaluation and the light resistance evaluation of the water-based magenta ink were inferior. Further, there were large differences in OD value decrease rates between the water-based yellow ink and the water-based magenta ink and between the water-based magenta ink and the water-based cyan ink in the ozone resistance evaluation and the light resistance evaluation. Hues in balance after fading of the colors were unsatisfactory. Thus, the results of the ozone resistance evaluation, and the light resistance evaluation of the water-based ink set in Comparative Example 9 were "C". Further, the result of the bleeding evaluation of the water-based ink set in Comparative Example 9 was also "C". The reason thereof is considered that the water-based magenta ink did not contain the magenta dye (M-1) and the magenta dye (M-2).

As described above, the water-based ink set of the present teaching is excellent in the color developing properties (vividness or brightness of color inks), light resistance/ozone resistance of the color inks, jetting stability of each color ink and a black ink, and storing stability of the color inks. The water-based ink set of the present teaching hardly causes bleeding between each color ink and the black ink, and is excellent in hues in balance after fading of the color inks. The usage of the water-based ink set of the present teaching is not specifically limited, and the water-based ink set of the present teaching is widely applicable to a variety of kinds of ink-jet recording.

What is claimed is:

1. A water-based ink set for ink-jet recording, comprising:
 a water-based yellow ink which contains water, a water-soluble organic solvent and a yellow colorant containing a yellow dye (Y-1) and a yellow dye (Y-2) indicated below;
 a water-based magenta ink which contains water, a water-soluble organic solvent and a magenta colorant containing a magenta dye (M-1) and a magenta dye (M-2) indicated below;
 a water-based cyan ink which contains water, a water-soluble organic solvent and a cyan colorant containing a cyan dye (C-1) indicated below; and
 a water-based black ink which contains water, a water-soluble organic solvent and a black colorant containing carbon black, wherein;
 the yellow dye (Y-1) is a dye represented by the general formula (Y-1);
 the yellow dye (Y-2) is at least one dye selected from the group consisting of C.I. Direct Yellow 86, C.I. Direct Yellow 132, and C.I. Direct Yellow 142;
 the magenta dye (M-1) is a dye represented by the general formula (M-1);
 the magenta dye (M-2) is at least one dye selected from the group consisting of dyes represented by the general formula (M-2a), dyes represented as the general formula (M-2b) or a salt thereof, C.I. Acid Red 1, and C.I. Acid Red 254; and
 the cyan dye (C-1) is a dye represented by the general formula (C-1);

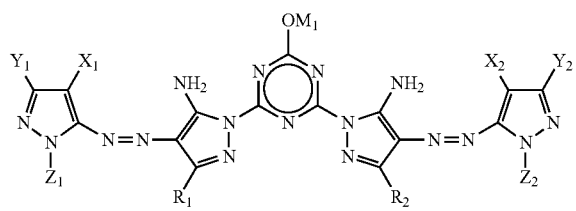

(Y-1)

in the general formula (Y-1),
$R_1$, $R_2$, $Y_1$, and $Y_2$ each represent a monovalent group, and are identical to or different from each other;
$X_1$ and $X_2$ each represent an electron attractive group, and are identical to or different from each other;
$Z_1$ and $Z_2$ each represent a hydrogen atom, a substituted or unsubstituted alkyl group, a substituted or unsubstituted alkenyl group, a substituted or unsubstituted alkynyl group, a substituted or unsubstituted aralkyl group, a substituted or unsubstituted aryl group, or a substituted or unsubstituted heterocyclic group, and are identical to or different from each other; and M₁ represents a hydrogen atom or a cation,

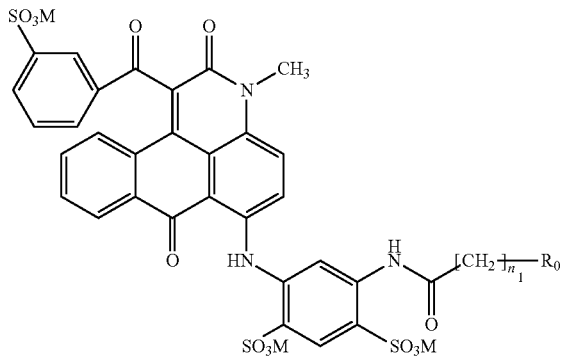

(M-1)

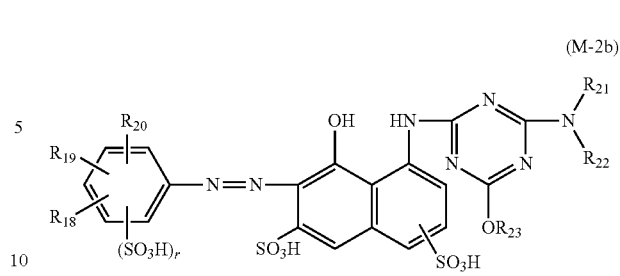

(M-2b)

in the general formula (M-2b), r is 0, 1, or 2;

R$_{18}$, R$_{19}$, and R$_{20}$ each represent a substituted or unsubstituted alkyl group, a substituted or unsubstituted alkoxy group, a halogen atom, a hydrogen atom, a hydroxyl group, a substituted or unsubstituted carbamoyl group, a substituted or unsubstituted sulfamoyl group, a substituted or unsubstituted amino group, a nitro group, a sulfonic acid ester group, a substituted or unsubstituted alkylsulfonyl group, a substituted or unsubstituted arylsulfonyl group, a carboxyl group, or a carboxylic acid ester group, and are identical to or different from each other; and R$_{21}$, R$_{22}$, and R$_{23}$ each represent a hydrogen atom, a substituted or unsubstituted alkyl group, a substituted or unsubstituted alkenyl group, a substituted or unsubstituted aryl group, a substituted or unsubstituted aralkyl group, a substituted or unsubstituted alicyclic group, or a substituted or unsubstituted heterocyclic group, and are identical to or different from each other, in the general formula (M-1), n₁ is 1 or 2;

Ms each represent sodium or ammonium, and are identical to or different from each other; and R₀ represents a monoalkylamino group having 1 to 8 carbon atoms, substituted with a carboxyl group,

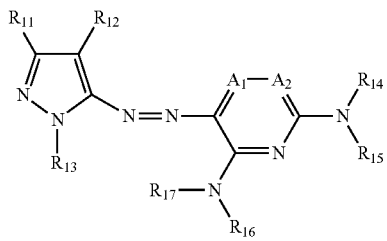

(M-2a)

in the general formula (M-2a),

R$_{11}$ represents a hydrogen atom, a substituted or unsubstituted alkyl group, or a substituted or unsubstituted aryl group;

R$_{12}$ represents a hydrogen atom, a halogen atom, or a cyano group;

R$_{13}$ represents a hydrogen atom, a substituted or unsubstituted alkyl group, a substituted or unsubstituted aryl group, or a substituted or unsubstituted heterocyclic group;

R$_{14}$, R$_{15}$, R$_{16}$, and R$_{17}$ each represent a hydrogen atom, a substituted or unsubstituted alkyl group, a substituted or unsubstituted aryl group, a substituted or unsubstituted heterocyclic group, a substituted or unsubstituted sulfonyl group, or a substituted or unsubstituted acyl group, and are identical to or different from each other, not both of R$_{14}$ and R$_{15}$ are hydrogen atoms, and not both of R$_{16}$ and R$_{17}$ are hydrogen atoms; and A₁ and A₂ are both substituted or unsubstituted carbon atoms, or one of A₁ and A₂ is a substituted or unsubstituted carbon atom and the other is a nitrogen atom,

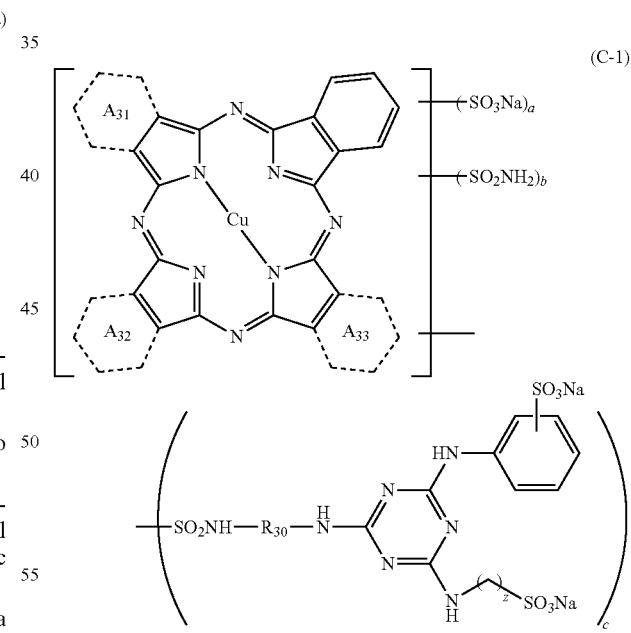

(C-1)

in the general formula (C-1), rings A$_{31}$, A$_{32}$, and A$_{33}$ each represent any of a benzene ring, a 2,3-pyridine ring, and a 3,2-pyridine ring; at least one of rings A$_{31}$, A$_{32}$, and A$_{33}$ represents a 2,3-pyridine ring or a 3,2-pyridine ring; and the rings A$_{31}$, A$_{32}$, and A$_{33}$ are identical to or different from each other;

a satisfies 0≤a≤4; b satisfies 0≤b≤4; c satisfies 0≤c≤4; a, b, and c satisfy 0≤a+b+c≤4;

z is an integer satisfying 1≤z≤3; and $R_{30}$ represents a straight chain alkyl group having 1 to 6 carbon atoms.

2. The water-based ink set for ink-jet recording according to claim 1, wherein, in the general formula (M-2a), $R_{11}$ is an alkyl group; $R_{12}$ is a cyano group; $R_{13}$ is a hydrogen atom, or a substituted or unsubstituted heterocyclic group; $R_{14}$ is a hydrogen atom, a substituted or unsubstituted heterocyclic group, or a substituted aryl group; $R_{15}$ and $R_{16}$ each are a substituted heterocyclic group or a substituted aryl group; $R_{17}$ is a hydrogen atom; $A_1$ is a substituted carbon atom; and $A_2$ is a substituted or unsubstituted carbon atom.

3. The water-based ink set for ink-jet recording according to claim 2, wherein, in the general formula (M-2a), $R_{11}$ is a tert-butyl group; $R_{13}$ is a hydrogen atom, or a benzothiazolyl group optionally substituted by a sulfo group or by an alkali metal sulfonate group; $R_{14}$ is a hydrogen atom, a benzothiazolyl group optionally substituted by a sulfo group or by an alkali metal sulfonate group, or a trialkylphenyl group substituted by a sulfo group or by an alkali metal sulfonate group; $R_{15}$ and $R_{16}$ each are a monoalkylphenyl group, a dialkylphenyl group, a trialkylphenyl group, or a benzothiazolyl group substituted by a sulfo group or by an alkali metal sulfonate group, the monoalkylphenyl group, the dialkylphenyl group, and the trialkylphenyl group being optionally substituted by a sulfo group or by an alkali metal sulfonate group; $A_1$ is a carbon atom substituted by an alkyl group; and $A_2$ is a carbon atom optionally substituted by a cyano group.

4. The water-based ink set for ink-jet recording according to claim 3, wherein, in the general formula (M-2a), $R_{13}$ is a hydrogen atom, or a benzothiazole-2-yl group optionally substituted by a sulfo group or by an alkali metal sulfonate group; $R_{14}$ is a hydrogen atom, a benzothiazole-2-yl group optionally substituted by a sulfo group or by an alkali metal sulfonate group, or a mesityl group substituted by a sulfo group or by an alkali metal sulfonate group; $R_{15}$ and $R_{16}$ each are a p-octylphenyl group or a mesityl group optionally substituted by a sulfo group or by an alkali metal sulfonate group, or a benzothiazole-2-yl group substituted by a sulfo group or by an alkali metal sulfonate group; $A_1$ is a carbon atom substituted by a methyl group; and $A_2$ is a carbon atom optionally substituted by a cyano group.

5. The water-based ink set for ink-jet recording according to claim 1, wherein, in the general formula (M-2b), r is 0; $R_{18}$ is a carboxyl group, a carbamoyl group, a trifluoromethyl group, or a sulfamoyl group; $R_{19}$ and $R_{20}$ each are a hydrogen atom; $R_{21}$ is a phenyl group optionally substituted by a carboxyl group or by a sulfamoyl group, or a carboxy alkyl group; $R_{22}$ is a hydrogen atom; and $R_{23}$ is a hydrogen atom or an alkyl group.

6. The water-based ink set for ink-jet recording according to claim 1, wherein the carbon black is a self-dispersible carbon black.

7. The water-based ink set for ink-jet recording according to claim 1, wherein a surface tension of each of the water-based yellow ink, the water-based magenta ink, and the water-based cyan ink is 30 mN/m to 35 mN/m, and a surface tension of the water-based black ink is 30 mN/m to 40 mN/m.

8. The water-based ink set for ink-jet recording according to claim 1, wherein a weight ratio of the yellow dye (Y-1) to the yellow dye (Y-2) in the water-based yellow ink is in a range of 60:40 to 95:5 (yellow dye (Y-1):yellow dye (Y-2)).

9. The water-based ink set for ink-jet recording according to claim 1, wherein the magenta dye (M-2) is a dye represented by the general formula (M-2a), and a weight ratio of the magenta dye (M-1) to the magenta dye (M-2) in the water-based magenta ink is in a range of 60:40 to 20:80 (magenta dye (M-1):magenta dye (M-2)).

10. The water-based ink set for ink-jet recording according to claim 1, wherein the magenta dye (M-2) is at least one dye selected from the group consisting of dyes represented by the general formula (M-2b), C.I. Acid Red 1, and C.I. Acid Red 254, and a weight ratio of the magenta dye (M-1) to the magenta dye (M-2) in the water-based magenta ink is in a range of 70:30 to 90:10 (magenta dye (M-1):magenta dye (M-2)).

11. The water-based ink set for ink-jet recording according to claim 1, wherein the cyan colorant further contains a cyan dye (C-2) indicated below, a weight ratio of the cyan dye (C-1) to the cyan dye (C-2) in the water-based cyan ink is in a range of 70:30 to 95:5 (cyan dye (C-1):cyan dye (C-2)) and, the cyan dye (C-2) is at least one dye selected from the group consisting of dyes represented by the general formula (C-2a), dyes represented by the general formula (C-2b), C.I. Direct Blue 199, and C.I. Direct Blue 86

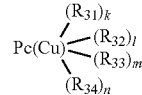

(C-2a)

in the general formula (C-2a),

Pc (Cu) represents a copper phthalocyanine nucleus represented by the general formula (Pc);

$R_{31}$, $R_{32}$, $R_{33}$, and $R_{34}$ each represent a substituent selected from the group consisting of a $-SO_2R_a$, a $-SO_2NR_bR_c$, and a $-CO_2R_a$; $R_{31}$, $R_{32}$, $R_{33}$, and $R_{34}$ are not all identical to each other; at least one of $R_{31}$, $R_{32}$, $R_{33}$, and $R_{34}$ has an ionic hydrophilic group as a substituent; at least one of $R_{31}$, $R_{32}$, $R_{33}$, and $R_{34}$ is present on any of four benzene rings A, B, C, and D of the copper phthalocyanine nucleus represented by the general formula (Pc); $R_a$ represents a substituted or unsubstituted alkyl group; $R_b$ represents a hydrogen atom or a substituted or unsubstituted alkyl group; $R_c$ represents a substituted or unsubstituted alkyl group;

k satisfies 0<k<8; l satisfies 0<l<8; m satisfies 0≤m<8: n satisfies 0≤n<8; and k, l, m, and n satisfy 4≤k+l+m+n≤8,

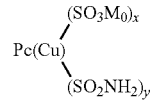

(C-2b)

in the general formula (C-2b),

Pc (Cu) represents a copper phthalocyanine nucleus represented by the general formula (Pc);

$M_0$ represents any of lithium, sodium, potassium, and ammonium;

x satisfies 0<x<4; y satisfies 0<y<4; x and y satisfy 2≤x+y≤5; and a —$SO_3M_0$ and a —$SO_2NH_2$ are present on any of four benzene rings A, B, C, and D of the copper phthalocyanine nucleus represented by the general formula (Pc)

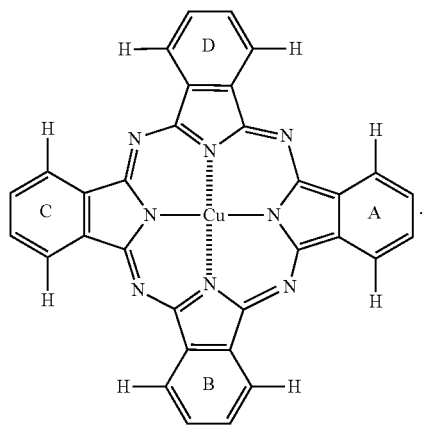

(Pc)

12. The water-based ink set for ink-jet recording according to claim 11, wherein, in the general formula (C-2a), $R_{31}$, $R_{32}$, $R_{33}$, and $R_{34}$ each represent a —$SO_2R_a$; the respective $R_a$s in $R_{31}$, $R_{32}$, $R_{33}$, and $R_{34}$ are not all identical; and at least one of the $R_a$s is a substituted alkyl group having an ionic hydrophilic group.

13. The water-based ink set for ink-jet recording according to claim 11, wherein, in the general formula (C-2a), k satisfies $0<k<4$, l satisfies $0<l<4$, m satisfies $0\leq m<4$, n satisfies $0\leq n<4$, and k, l, m, and n satisfy $k+l+m+n=4$.

14. The water-based ink set for ink-jet recording according to claim 11, wherein, in the general formula (C-2b), x and y satisfy $x+y=4$.

15. The water-based ink set for ink-jet recording according to claim 1, wherein
    the yellow colorant is contained at 2% by weight to 6% by weight in the water-based yellow ink;
    the magenta colorant is contained at 2% by weight to 6% by weight in the water-based magenta ink;
    the cyan colorant is contained at 2% by weight to 6% by weight in the water-based cyan ink; and
    the black colorant is contained at 2% by weight to 10% by weight in the water-based black ink.

16. An ink-jet recording method for performing recording on a recording medium comprising discharging, onto the recording medium, the water-based yellow ink, the water-based magenta ink, the water-based cyan ink and the water-based black ink of the water-based ink set for ink-jet recording as defined in claim 1.

17. An ink-jet recording apparatus which performs recording on a recording medium comprising:
    an ink-set accommodating section which accommodates the water-based ink set for ink-jet recording as defined in claim 1; and
    an ink discharge mechanism which discharges, onto the recording medium, each of the water-based yellow ink, the water-based magenta ink, the water-based cyan ink and the water-based black ink of the water-based ink set for ink-jet recording.

* * * * *